US010115242B2

(12) United States Patent
Hedley et al.

(10) Patent No.: US 10,115,242 B2
(45) Date of Patent: *Oct. 30, 2018

(54) ELECTRONIC TOLL MANAGEMENT

(71) Applicant: Accenture Global Services Limited, Dublin (IE)

(72) Inventors: Jay E. Hedley, Arlington, VA (US); Neal Patrick Thornburg, Charlotte, NC (US)

(73) Assignee: Accenture Global Services Limited, Dublin (IE)

(*) Notice: Subject to any disclaimer, the term of this patent is extended or adjusted under 35 U.S.C. 154(b) by 627 days.

This patent is subject to a terminal disclaimer.

(21) Appl. No.: 14/925,102

(22) Filed: Oct. 28, 2015

(65) Prior Publication Data
US 2016/0049015 A1 Feb. 18, 2016

Related U.S. Application Data

(60) Division of application No. 14/024,736, filed on Sep. 12, 2013, now Pat. No. 9,240,078, which is a
(Continued)

(51) Int. Cl.
*G07B 15/06* (2011.01)
*G08G 1/017* (2006.01)
(Continued)

(52) U.S. Cl.
CPC ....... *G07B 15/063* (2013.01); *G06K 9/00771* (2013.01); *G06K 9/00785* (2013.01);
(Continued)

(58) Field of Classification Search
CPC ...... G07B 15/00; G07B 15/06; G07B 15/063; G06Q 50/30; G06Q 2240/00; G07F 17/24; G08G 1/0175
See application file for complete search history.

(56) References Cited

U.S. PATENT DOCUMENTS 3,825,778 A 7/1974 Ahmed
4,242,661 A 12/1980 Henoch et al.
(Continued)

FOREIGN PATENT DOCUMENTS

CA 2163872 12/1994
CA 2422187 3/2002
(Continued)

OTHER PUBLICATIONS

Oral Proceeding Pursuant for European Application No. 04712519.0, dated Mar. 8, 2017, 9 pages.
(Continued)

*Primary Examiner* — Daniel Vetter
(74) *Attorney, Agent, or Firm* — Fish & Richardson P.C.

(57) ABSTRACT

Identifying a vehicle in a toll system includes accessing a set of toll transaction entries. Each entry in the set designates a toll transaction between a vehicle and the toll system and includes a transaction descriptor and a transaction time stamp. A series of toll transaction pictures is accessed. The series includes a plurality of pictures, each of which is associated with a picture time stamp. A toll transaction entry is identified from the set as a violation transaction entry based on the transaction descriptor. A toll transaction picture is selected from the series. The transaction time stamp of the violation transaction is compared, using a processing device, with the picture time stamp of the selected toll transaction picture. The selected toll transaction picture is identified as a violation picture corresponding to the violation transaction entry based on a result of the comparison.

18 Claims, 21 Drawing Sheets

Related U.S. Application Data continuation of application No. 12/719,668, filed on Mar. 8, 2010, now Pat. No. 8,548,845, which is a division of application No. 11/423,690, filed on Jun. 12, 2006, now Pat. No. 7,676,392.

(60) Provisional application No. 60/689,050, filed on Jun. 10, 2005.

(51) Int. Cl.

| | | |
|---|---|---|
| *G07B 15/00* | (2011.01) | |
| *G06K 9/00* | (2006.01) | |
| *G06K 9/32* | (2006.01) | |
| *G06K 9/78* | (2006.01) | |
| *H04N 7/18* | (2006.01) | |
| *G06Q 50/30* | (2012.01) | |

(52) U.S. Cl.
CPC ......... *G06K 9/00798* (2013.01); *G06K 9/325* (2013.01); *G06K 9/3258* (2013.01); *G06K 9/78* (2013.01); *G07B 15/00* (2013.01); *G07B 15/06* (2013.01); *G08G 1/0175* (2013.01); *H04N 7/188* (2013.01); *G06K 2209/15* (2013.01); *G06Q 50/30* (2013.01); *G06Q 2240/00* (2013.01)

(56) References Cited

U.S. PATENT DOCUMENTS

| | | | |
|---|---|---|---|
| 4,963,723 | A | 10/1990 | Masada |
| 5,349,674 | A | 9/1994 | Calvert |
| 5,392,034 | A | 2/1995 | Kuwagaki |
| 5,638,302 | A | 6/1997 | Gerber |
| 5,740,230 | A | 4/1998 | Vaudreuil |
| 5,745,052 | A | 4/1998 | Matsuyama et al. |
| 5,809,480 | A | 9/1998 | Chasek |
| 5,819,234 | A | 10/1998 | Slavin et al. |
| 5,912,634 | A | 6/1999 | Bunnen et al. |
| 5,920,338 | A | 7/1999 | Katz |
| 5,948,038 | A | 9/1999 | Daly et al. |
| 6,042,008 | A | 3/2000 | Ando et al. |
| 6,052,068 | A | 4/2000 | Price et al. |
| 6,064,318 | A | 5/2000 | Kirchner et al. |
| 6,081,206 | A | 6/2000 | Kielland |
| 6,121,898 | A | 9/2000 | Moetteli |
| 6,167,333 | A | 12/2000 | Gehlot |
| 6,177,885 | B1 | 1/2001 | Weil et al. |
| 6,396,418 | B2 | 5/2002 | Naito |
| 6,538,580 | B2 | 3/2003 | Bostrom |
| 6,747,687 | B1 | 6/2004 | Alves |
| 6,892,942 | B1 | 5/2005 | Widl et al. |
| 6,922,156 | B2 | 7/2005 | Kavner |
| 6,959,869 | B2 | 11/2005 | Tsikos |
| 6,966,489 | B2 | 11/2005 | Grant |
| 6,987,528 | B1 | 1/2006 | Nagahisa et al. |
| 6,999,886 | B2 | 2/2006 | Hilliard |
| 7,119,674 | B2 | 10/2006 | Sefton |
| 7,215,833 | B1 | 5/2007 | Tepera et al. |
| 7,232,064 | B1 | 6/2007 | Toohey |
| 7,236,690 | B2 | 6/2007 | Matsukawa |
| 7,407,097 | B2 | 8/2008 | Robinson |
| 7,676,392 | B2 | 3/2010 | Hedley et al. |
| 7,970,644 | B2 | 6/2011 | Hedley et al. |
| 8,265,988 | B2 | 9/2012 | Hedley et al. |
| 8,463,642 | B2 | 6/2013 | Hedley et al. |
| 8,504,415 | B2 | 8/2013 | Hedley |
| 8,548,845 | B2 | 10/2013 | Hedley et al. |
| 8,587,454 | B1 | 11/2013 | Dearworth |
| 8,660,890 | B2 | 2/2014 | Hedley |
| 8,768,755 | B2 | 7/2014 | Hedley |
| 8,775,235 | B2 | 7/2014 | Hedley et al. |
| 8,775,236 | B2 | 7/2014 | Hedley et al. |
| 9,240,078 | B2 | 1/2016 | Hedley |
| 2001/0015756 | A1 | 8/2001 | Wilcock et al. |
| 2001/0026228 | A1 | 10/2001 | Naito |
| 2002/0044690 | A1 | 4/2002 | Burgess |
| 2002/0072963 | A1 | 6/2002 | Jonge |
| 2002/0080013 | A1 | 6/2002 | Anderson, III et al. |
| 2002/0097178 | A1 | 7/2002 | Thomas et al. |
| 2002/0105440 | A1 | 8/2002 | Bostrom |
| 2002/0140577 | A1 | 10/2002 | Kavner |
| 2002/0140579 | A1 | 10/2002 | Kavner |
| 2002/0140924 | A1 | 10/2002 | Wangler |
| 2002/0141618 | A1 | 10/2002 | Ciolli et al. |
| 2002/0145541 | A1 | 10/2002 | Matsui |
| 2002/0198641 | A1 | 12/2002 | Halle |
| 2002/0198767 | A1 | 12/2002 | Kim |
| 2003/0011492 | A1 | 1/2003 | Owen |
| 2003/0014357 | A1 | 1/2003 | Chrisekos et al. |
| 2003/0042304 | A1 | 3/2003 | Knowles |
| 2003/0067396 | A1 | 4/2003 | Hassett |
| 2003/0189500 | A1 | 10/2003 | Lim |
| 2004/0008368 | A1 | 1/2004 | Plunkett et al. |
| 2004/0008514 | A1 | 1/2004 | Lee et al. |
| 2004/0075752 | A1 | 4/2004 | Valleriano et al. |
| 2004/0080615 | A1 | 4/2004 | Klein et al. |
| 2004/0095258 | A1 | 5/2004 | Bosch |
| 2004/0167861 | A1 | 8/2004 | Hedley |
| 2004/0174272 | A1 | 9/2004 | Lin |
| 2004/0181495 | A1 | 9/2004 | Grush |
| 2004/0233036 | A1 | 11/2004 | Sefton |
| 2005/0197976 | A1 | 9/2005 | Tuton et al. |
| 2006/0056658 | A1 | 3/2006 | Kavner |
| 2006/0064345 | A1 | 3/2006 | Biet |
| 2006/0258367 | A1 | 11/2006 | Chiang |
| 2006/0278705 | A1 | 12/2006 | Hedley et al. |
| 2007/0008179 | A1 | 1/2007 | Hedley et al. |
| 2007/0124198 | A1 | 5/2007 | Robinson et al. |
| 2007/0252678 | A1 | 11/2007 | Garcia et al. |
| 2007/0299721 | A1 | 12/2007 | Robinson et al. |
| 2008/0040210 | A1 | 2/2008 | Hedley |
| 2008/0208479 | A1 | 8/2008 | Roes |
| 2009/0146845 | A1 | 6/2009 | Hedley et al. |
| 2009/0313096 | A1 | 12/2009 | Kaga |
| 2010/0030628 | A1 | 2/2010 | Renshaw-Smith |
| 2010/0228607 | A1 | 9/2010 | Hedley et al. |
| 2010/0228608 | A1 | 9/2010 | Hedley et al. |
| 2011/0128381 | A1 | 6/2011 | Bianco |
| 2011/0288909 | A1 | 11/2011 | Hedley et al. |
| 2012/0155712 | A1 | 6/2012 | Paul |
| 2013/0058531 | A1 | 3/2013 | Hedley et al. |
| 2013/0262194 | A1 | 10/2013 | Hedley |
| 2013/0346165 | A1 | 12/2013 | Hedley et al. |
| 2014/0355837 | A1 | 3/2014 | Hedley et al. |
| 2014/0074567 | A1 | 12/2014 | Hedley et al. |

FOREIGN PATENT DOCUMENTS

| | | |
|---|---|---|
| CA | 2434704 | 8/2002 |
| CA | 2516675 | 9/2004 |
| DE | 101 04 502 | 8/2002 |
| EP | 2034451 | 3/2009 |
| GB | 2 344 205 | 5/2000 |
| JP | 2004-213569 | 7/2004 |
| WO | WO 1998/014925 | 4/1998 |
| WO | WO 1999/066455 | 12/1999 |
| WO | WO 2000/046068 | 8/2000 |
| WO | WO 2002/063570 | 8/2002 |
| WO | WO 2003/003314 | 1/2003 |
| WO | WO 2004/042673 | 5/2004 |
| WO | WO 2004/075121 | 9/2004 |
| WO | WO 2005/041071 | 5/2005 |
| WO | WO 2007/030446 | 3/2007 |

OTHER PUBLICATIONS

Canadian Office Action for Application No. 2909279, dated Oct. 20, 2016, 3 pages.

U.S. Office Action issued in U.S. Appl. No. 14/306,431, dated May 31, 2018, 40 pages.

(56) References Cited

OTHER PUBLICATIONS

"Perle and MFS Network Technologies Partner to Provide Connectivity for New Jersey Toll Road Consortium E-ZPass Project", Business Wire, Jan. 17, 2000.
Hultgren, L. et al., "San Diego's interstate 15 high-occupancy/toll lane facility using value pricing", Institute of Transportation Engineers. ITE Journal, Jun. 1999, vol. 69, issue 6; p. 22, 6 pgs, 18 pages.
Levinson, et al., A model for optimizing electronic toll collection systems, Transportation Research Part A: Policy and Practice 37.4, 2003, pp. 293-314.
McLeod, J., "Automatic highways going the right way?", Electronics, Nov. 28, 1994, 67, 22, 1 page.
N. Freed et al., "Multipurpose Internet Mail Extensions (MIME) Part One: Format of Internet Message Bodies," Network Working Group, Request for Comments: 2045, Nov. 1996, pp. 1-31.
Smith, L. Intelligent Transportation Systems—Electronic Toll Collection [online], Jan. 3, 2002 [retrieved on Jul. 11, 2006]. Retrieved from the Internet:<URL: http://www.calccit.org/itsdecision/serv_and_tech/Electronic_collection/electronic_toll_collection_rep_print.html >.
Tetsusaki, High security electronic toll and traffic management and road pricing system using encrypted messages and personal identity number, Vehicle Navigation and Information Systems Conference Proceedings, IEEE, 1994, pp. 695-698.
Zarrillo, et al., Modeling traffic operations at electronic toll collection and traffic management systems, Computers & Industrial Engineering vol. 33, Iss. 3-4, Dec. 1997, pp. 857-860.
Australian Patent Office Examiner's First Report on Application No. 2006257287 dated Mar. 3, 2011, 3 pages.
Canadian Office Action for Application No. 2611637 dated Mar. 10, 2014, 5 pages.
Canadian Office Action for Application No. 2611637 dated Mar. 22, 2013, 4 pages.
Canadian Office Action for Application No. 2611637 dated Mar. 25, 2015, 5 pages.
Canadian Office Action of Application No. 2,516,675, dated Jun. 19, 2008, 4 pages.
Canadian Office Action of Application No. 2,516,675, dated Mar. 31, 2009, 6 pages.
China First Office Action for Application No. 200910265725.2 dated Apr. 29, 2011, 10 pages.
China First Office Action for Application No. 201010214910.1 dated May 12, 2011, 13 pages.
China Office Action of Application No. 200680027002.3 dated Jun. 26, 2009, 10 pages.
China Office Action of Application No. 200910265725.2 (w/English translation) dated Feb. 28, 2012, 19 pages.
European Office Action in Application No. 0608926.7, dated Mar. 23, 2010, 6 pages.
European Patent Office Examination Report for Application No. 06795421.4-1229 dated Jun. 15, 2011, 5 pages.
European Patent Office Search Report for Application No. 12161598.3-1229 dated May 23, 2012, 5 pages.
India First Examination Report for Indian Ref No. 2348/CHENP/2005-CAN dated Jul. 25, 2006.
Intellectual Property Office of Singapore Search Report for Application No. 201100074-2 dated Jul. 13, 2012, 9 pages.
International Preliminary Examination Report and Written Opinion for International Application No. PCT/EP2004/001644 dated Sep. 14, 2005.
International Search and Written Opinion, PCT/IB2006/002738, dated Mar. 12, 2007, 11 pages.
Republic of China Office Action of Application No. 200480010404.3 dated Aug. 1, 2008, 27 pages.
Search Report and Written Opinion of Application No. SG200718336-1 dated Sep. 4, 2009, 8 pages.
Search Report and Written Opinion of Application No. SG200718365-0 dated Jul. 23, 2009, 9 pages.
U.S. Final Office Action for U.S. Appl. No. 12/719,652 dated Nov. 9, 2012, 41 pages.
U.S. Final Office Action for U.S. Appl. No. 12/719,652 dated Oct. 24, 2013, 21 pages.
U.S. Final Office Action for U.S. Appl. No. 12/719,668 dated Feb. 21, 2013, 15 pages.
U.S. Final Office Action for U.S. Appl. No. 12/719,668 dated Nov. 14, 2012, 22 pages.
U.S. Non-Final Office Action for U.S. Appl. No. 12/719,652 dated May 10, 2012, 61 pages.
U.S. Non-Final Office Action for U.S. Appl. No. 12/719,668 dated May 11, 2012, 32 pages.
U.S. Notice of Allowance for U.S. Appl. No. 11/423,683 dated Jan. 27, 2011 (9 pages).
U.S. Notice of Allowance for U.S. Appl. No. 12/719,652 dated Feb. 21, 2014, 5 pages.
Canadian Office Action for Application No. 2611637, dated Dec. 6, 2016, 7 pages.
European Office Action in Application No. 04712519.0, dated Jan. 30, 2018, 13 pages.
Canadian Office Action for Application No. 2611379, dated Apr. 1, 2016, 6 pages.
Brazil Office Action for Application No. PI0613569-2, dated Oct. 6, 2017, 6 pages.
Australia Office Action for Application No. 2015201514 dated Mar. 10, 2016, 15 pages.
Canadian Office Action for Application No. 2611637, dated Jan. 28, 2016, 5 pages.
Canadian Office Action for Application No. 2516675, dated Apr. 4, 2016, 10 pages.

| 1110a | 1110b | 1110c | 1110d | 1110e | 1110f | 1110g | 1110h | 1110i | 1110j |
|---|---|---|---|---|---|---|---|---|---|
| Paid Transaction | 115 | 06/08/2006 | 16:30:39 | 2 axles | $3.50 | $3.50 | Credit Card | VISA | 1234567890123456 |
| Paid Transaction | 115 | 06/08/2006 | 16:30:48 | 2 axles | $3.50 | $3.50 | Transponder | VA | 789012 |
| Unpaid Transaction | 115 | 06/08/2006 | 16:30:52 | 2 axles | $3.50 | $3.50 | Transponder | MD | 890123 |
| Paid Transaction | 115 | 06/08/2006 | 16:30:56 | 2 axles | $3.50 | $3.50 | Cash | - | - |
| Paid Transaction | 115 | 06/08/2006 | 16:31:00 | 2 axles | $3.50 | $3.50 | Transponder | VA | 901234 |
| Violation | 115 | 06/08/2006 | 16:30:59 | 2 axles | $3.50 | - | None | - | - |
| Paid Transaction | 115 | 06/08/2006 | 16:31:04 | 2 axles | $3.50 | $3.50 | Credit Card | MasterCard | 2345678901234567 |
| Paid Transaction | 115 | 06/08/2006 | 16:31:06 | 2 axles | $3.50 | $3.50 | Transponder | VA | 012345 |
| Paid Transaction | 115 | 06/08/2006 | 16:31:10 | 2 axles | $3.50 | $3.50 | Transponder | VA | 123456 |
| Paid Transaction | 115 | 06/08/2006 | 16:31:19 | 2 axles | $3.50 | $3.50 | Transponder | VA | 234567 |

FIG. 11

ELECTRONIC TOLL MANAGEMENT

CROSS-REFERENCE TO RELATED APPLICATIONS

This application is a divisional (and claims the benefit of priority under 35 USC 120) of U.S. application Ser. No. 14/024,736, filed Sep. 12, 2013, which is a continuation of U.S. application Ser. No. 12/719,668, filed Mar. 8, 2010, now U.S. Pat. No. 8,548,845, issued Oct. 1, 2013, which is a divisional of U.S. application Ser. No. 11/423,690, filed Jun. 12, 2006, now U.S. Pat. No. 7,676,392, issued Mar. 9, 2010, and claims priority to U.S. Provisional Application No. 60/689,050, filed on Jun. 10, 2005, and titled ELECTRONIC TOLL MANAGEMENT. All of these prior applications are incorporated by reference in their entirety for all purposes.

TECHNICAL FIELD

This document relates to electronic toll management.

BACKGROUND

Transportation facilities such as roads, bridges, and tunnels produce tolls often representing a major source of income for many states and municipalities. The large number of automobiles, trucks, and buses stopping at tollbooths to pay a toll daily can cause significant problems. For example, such facilities may restrict the flow of traffic causing traffic backups and lane changing, often increasing the likelihood of accidents and even more bottlenecks. In addition, many people may be delayed from reaching their destinations, and goods may be delayed from getting to market and millions of gallons of fuel may be wasted as vehicles idle. Environments may experience an increase in pollution as idling and slow moving vehicles emit pollutants (particularly carbon dioxide and carbon monoxide), which may pose a significant health hazard to motorists as well as to tollbooth operators.

Some tollbooth systems may have a program requiring that a motorist rent and then attach to the windshield of the vehicle a radio transponder that communicates via radio frequency with receiver units at tollbooth plazas. However, such programs require drivers to seek out the program and to register for the program. These programs may make it mandatory for a motorist to make a credit card deposit and create an automatic debit account arrangement, which may effectively eliminate drivers with credit problems. These programs also may bill participants based on a minimum amount of travel regardless of the actual amount of travel. Thus, many motorists who travel infrequently travel through the toll road may receive little benefit after investing time and money to participate in the program.

Tollbooth systems typically include a lane transaction system that records each vehicle transaction with the toll facility and an imaging system that takes pictures of each vehicle that passes the toll facility. If the lane transaction system detects a violation, the lane transaction system typically sends a "violation" signal to the imaging system. The imaging system may respond to the "violation" signal by sending the picture associated with the violation transaction to a backend system for vehicle identification and processing. If no "violation" signal is received by the imaging system from the lane transaction system after a picture of a vehicle is taken, the imaging system typically discards the picture. Accordingly, the backend system only receives pictures of vehicles that commit violations. Once a violating vehicle is identified, the backend system typically refers the vehicle to law enforcement and/or attempts to bill or otherwise collect the unpaid toll fees.

In some cases, a tolling system may include a lane transaction system, but not an imaging system. In such cases, it may be undesirable or impractical to integrate an imaging system directly with the lane system. Integration may put the lane system at risk due to increased demand for system resources (especially real-time or near-real-time messaging to the imaging system). System modifications may reduce reliability of a proven system. The cost of integration to a legacy system may be high.

SUMMARY

In one implementation, a toll system enables electronic handling of payment of tolls by vehicles passing a toll facility without requiring the toll system's lane transaction system to directly communicate with the toll system's imaging system (i.e., the lane transaction system is independent from the imaging system and need not send any signals, including "violation" signals, to the imaging system). Accordingly, the toll system is configured to decouple the imaging system from the lane transaction system, and, thereby, minimize or eliminate the need to modify the lane transaction system when installing a new imaging system.

In one general aspect, identifying a vehicle in a toll system includes accessing a set of toll transaction entries. Each entry in the set designates a toll transaction between a vehicle and the toll system and includes a transaction descriptor and a transaction time stamp. A series of toll transaction pictures is accessed. The series includes a plurality of pictures, each of which is associated with a picture time stamp. A toll transaction entry is identified from the set as a violation transaction entry based on the transaction descriptor. A toll transaction picture is selected from the series. The transaction time stamp of the violation transaction is compared, using a processing device, with the picture time stamp of the selected toll transaction picture. The selected toll transaction picture is identified as a violation picture corresponding to the violation transaction entry based on a result of the comparison.

Implementations may include one or more of the following features. For example, the transaction time stamps included in the set of toll transaction entries and the picture time stamps associated with the plurality of pictures may be based on independent clocks.

Accessing the set of toll transaction entries may include receiving the set of toll transaction entries from a lane transaction system. Accessing the series of toll transaction pictures may include receiving the series of toll transaction pictures from an imaging system that is independent from the lane transaction system. The imaging system being independent from the lane transaction system may include the imaging system not receiving signals from the lane transaction system. The imaging system being independent from the lane transaction system may include the imaging system having an internal clock that is independent from an internal clock of the lane transaction system. The transaction time stamps included in the set of toll transaction entries may be generated based on the internal clock of the lane transaction system, and the picture time stamps associated with the plurality of pictures may be generated based on the internal clock of the imaging system.

Receiving the set of toll transaction entries from the lane transaction system may include receiving the set of toll transaction entries in an e-mail.

In another general aspect, identifying a vehicle in a toll system includes accessing a set of toll transaction entries. Each entry in the set designates a toll transaction between a vehicle and the toll system and includes a transaction descriptor and a transaction time stamp. A series of toll transaction pictures is accessed. The series includes a plurality of pictures, each of which is associated with a picture time stamp. A toll transaction entry from the set is identified as a violation transaction entry based on the transaction descriptor. A group of toll transaction entries is selected from among the set of toll transaction entries based on the time stamp of the violation transaction entry. A group of toll transaction pictures is selected from the series of toll transaction pictures based on the selected group of toll transaction entries. A toll transaction picture is identified from the group of toll transaction pictures as a violation picture corresponding to the violation transaction entry by associating the group of toll transaction entries with the group of toll transaction pictures.

Implementations may include one or more of the following features. For example, selecting the group of toll transaction entries from among the set of toll transaction entries may include identifying a first time gap having a predetermined duration of time between the transaction time stamps of chronologically sequential toll transaction entries of the set of toll transaction entries, the chronologically sequential toll transaction entries occurring before the identified violation transaction entry. Selecting the group of toll transaction entries from among the set of toll transaction entries may additionally include adding a toll transaction entry to the group of toll transaction entries if the toll transaction entry includes a transaction time stamp falling within a window of time beginning at a time corresponding to a time stamp of a transaction entry immediately following the identified first time gap and ending at a time corresponding to the transaction time stamp of the identified violation transaction entry. The predetermined duration of time of the first time gap may include a duration of time between six and ten seconds.

Selecting the group of toll transaction entries from among the set of toll transaction entries may further include adding a toll transaction entry to the group of toll transaction entries if the toll transaction entry includes a transaction time stamp falling within a window of time beginning at a time corresponding to the transaction time stamp of the identified violation transaction entry and ending at a time corresponding to a predetermined amount of time after the transaction time stamp of the identified violation transaction entry. The predetermined amount of time after the transaction time stamp of the identified violation transaction entry may be a time between thirty seconds and one minute.

Selecting the group of toll transaction pictures may include selecting from the series of toll transaction pictures a toll transaction picture corresponding to the transaction entry immediately following the identified first time gap. A toll transaction picture may be added to the group of toll transaction pictures if the toll transaction picture is associated with a picture time stamp falling within a window of time beginning at a time corresponding to the picture time stamp associated with the selected toll transaction picture and ending at the predetermined time following the transaction time stamp of the identified violation transaction entry.

Selecting the group of toll transaction entries from among the set of toll transaction entries may further include identifying a second time gap having a predetermined duration of time between the transaction time stamps of chronologically sequential toll transaction entries of the set of toll transaction entries, the chronologically sequential toll transaction entries occurring after the identified violation transaction entry. A toll transaction entry may be added to the group of toll transaction entries if the toll transaction entry includes a transaction time stamp falling within a window of time beginning at a time corresponding to the transaction time stamp of the identified violation transaction entry and ending at a time corresponding to a time stamp of a transaction entry immediately preceding the identified second time gap.

Selecting the group of toll transaction pictures may include selecting from the series of toll transaction pictures a first toll transaction picture corresponding to the transaction entry immediately following the identified first time gap. A second toll transaction picture corresponding to the transaction entry immediately preceding the identified second time gap is selected from the series of toll transaction pictures. A toll transaction picture may be added to the group of toll transaction pictures if the toll transaction picture is associated with a picture time stamp falling within a window of time beginning at a time corresponding to the picture time stamp associated with the selected first toll transaction picture and ending at a time corresponding to the picture time stamp associated with the selected second toll transaction picture.

Selecting the group of toll transaction entries from among the set of toll transaction entries may include selecting from the set of toll transaction entries a toll transaction entry designating a toll transaction between the toll system and a vehicle that has been positively identified, the selected toll transaction entry including a transaction time stamp that is earlier in time than the transaction time stamp included in the identified violation transaction entry. A toll transaction entry may be added to the group of toll transaction entries if the toll transaction entry includes a transaction time stamp falling within a window of time beginning at a time corresponding to the time stamp of the selected toll transaction and ending at a time corresponding to the transaction time stamp of the identified violation transaction entry.

Selecting the group of toll transaction entries from among the set of toll transaction entries may further comprise adding a toll transaction entry to the group of toll transaction entries if the toll transaction entry includes a transaction time stamp falling within a window of time beginning at a time corresponding to the transaction time stamp of the identified violation transaction entry and ending at a predetermined time following the transaction time stamp of the identified violation transaction entry.

Identifying a toll transaction picture from the group of toll transaction pictures as a violation picture may include associating on a one-to-one basis each toll transaction picture in the group of toll transaction pictures with each toll transaction entry in the group of toll transaction entries. Associating on a one-to-one basis each toll transaction picture with each toll transaction entry may include ordering, in sequential chronological order, the toll transaction entries in the group of toll transaction entries based on the toll transaction time stamps and ordering, in sequential chronological order, the toll transaction pictures in the group of toll transaction pictures based on the picture time stamps. Each toll transaction entry may be associated with a place in the toll transaction entry order and each toll transaction picture may be associated with a place in the toll transaction picture order. A toll transaction entry may be selected and the selected toll transaction entry may be associated with a toll transaction picture conditioned on the toll transaction entry being associated with a place in the toll transaction entry order that corresponds to the place in the toll transaction picture order associated with the toll transaction picture.

Additional toll transaction entries may be inserted in the group of toll transaction entries if the number of toll transaction entries in the group of toll transaction entries is less than the number of toll transaction pictures in the group of toll transaction pictures. Additional toll transaction pictures may be inserted in the group of toll transaction pictures if the number of toll transaction pictures in the group of toll transaction pictures is less than the number of toll transaction entries in the group of toll transaction entries.

The selected toll transaction entry and the associated toll transaction picture may be designated as improperly matched conditioned on a difference between the transaction time stamp of the selected toll transaction entry and the picture time stamp of the associated toll transaction picture being greater than a predetermined value. The predetermined value may be one second.

An interval of time between two transactions may be calculated based on the toll transaction time stamps of two chronologically sequential toll transaction entries. A corresponding interval of time between the two transactions based on the picture time stamps of two chronologically sequential toll pictures also may be calculated, the two chronologically sequential toll pictures being associated with the two chronologically sequential toll transaction entries. The two chronologically sequential toll pictures and the two chronologically sequential toll transaction entries may be designated as improperly matched conditioned on a difference between the interval of time and the corresponding interval of time being greater than a predetermined value. The predetermined value may be four seconds.

Identifying a toll transaction picture from the group of toll transaction pictures as a violation picture may include designating as the violation picture a toll transaction picture associated with a place in the toll transaction picture order that corresponds to a place in the toll transaction entry order associated with the violation transaction entry.

The details of one or more implementations are set forth in the accompanying drawings and the description below. Other features will be apparent from the description and drawings, and from the claims.

BRIEF DESCRIPTION OF THE DRAWINGS

FIG. 11 is a group of transaction entries generated by a lane transaction system.

Like reference symbols in the various drawings indicate like elements.

DETAILED DESCRIPTION

Figure 1:
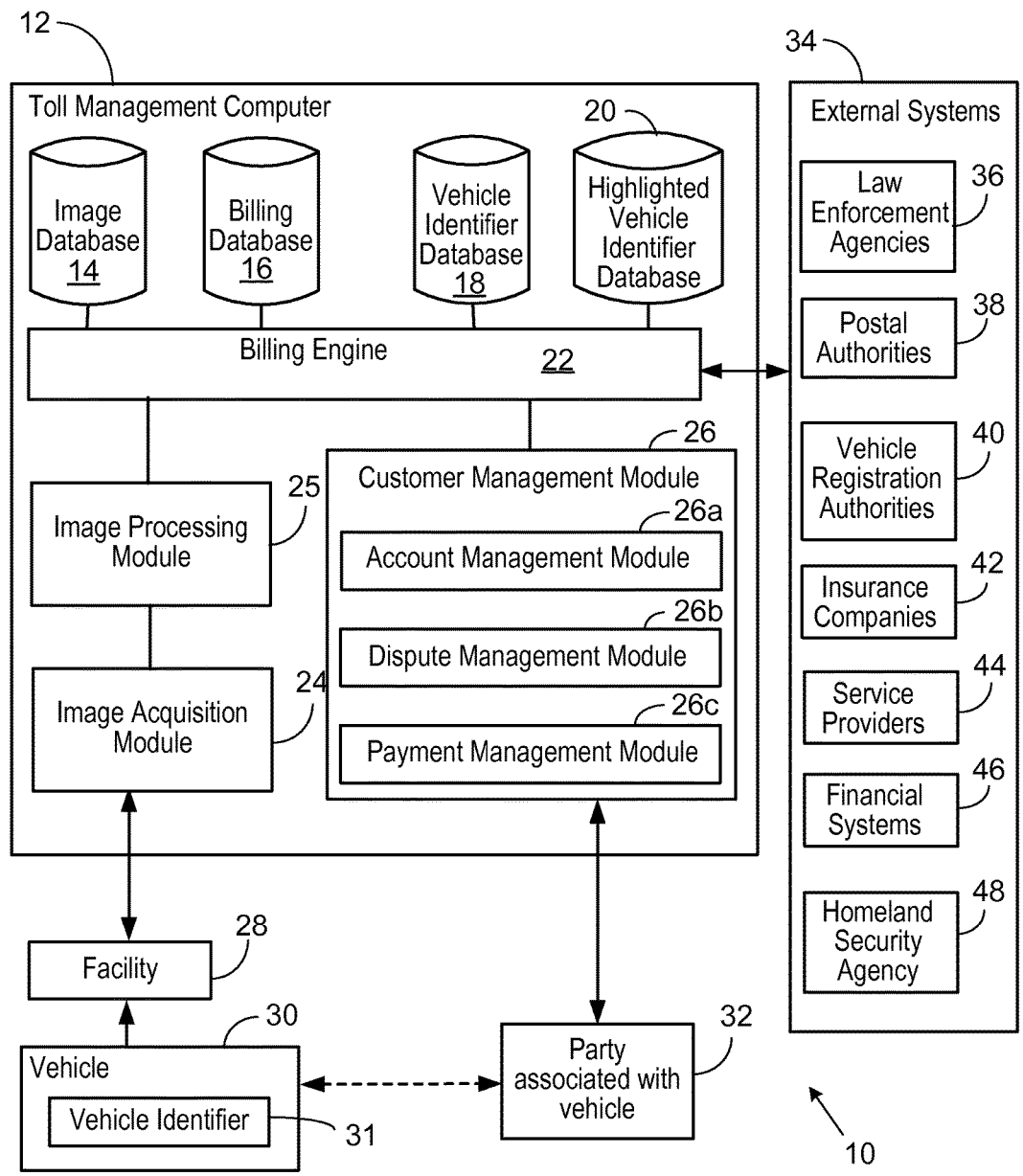
FIG. 1 is a block diagram of an implementation of an electronic toll management system.

In one implementation, a toll system enables electronic handling of payment of tolls by vehicles passing a toll facility without requiring the toll system's lane transaction system to directly communicate with the toll system's imaging system Accordingly, the toll system is configured to decouple the imaging system from the lane transaction system, and, thereby, minimize or eliminate the need to modify the lane transaction system when installing a new imaging system.

The above toll system includes a toll management computer system having an image and lane transaction data acquisition module (ILDM). The ILDM includes a lane transaction system, an image acquisition module, and a video server.

The lane transaction system is configured to capture transaction-related data for each vehicle that passes through or otherwise transacts with the toll facility. The transaction-related data may include, for example, the type of transaction, the time of the transaction (e.g., the transaction time stamp), vehicle classification data (e.g. the number of axles of the vehicle), the transponder information, if applicable, of the vehicle, and the fare charged. The lane transaction system may be an existing or a conventional lane transaction system. Accordingly, while the lane transaction system may have the ability to send "violation" signals to an imaging system, this ability need not be used. The imaging system or image acquisition module may operate independently from the lane transaction system and, accordingly, need not receive any signals from the lane transaction system or directly from the lane transaction system.

The lane transaction system is configured to periodically generate and send a lane activity report to the video server. The lane activity report includes lane transaction data for vehicles that have passed through the toll facility during a given window of time (e.g., a day). The lane activity report typically includes a chronological list of lane transaction entries, each of which corresponds to a single vehicle transaction with the toll facility. Alternatively, the lane transaction system may make available a database of transaction data or a copy of such data.

The image acquisition module uses sensors, such as, for example, laser sensors, to detect passing vehicles typically as they enter or otherwise begin passing through the toll facility. The laser sensors trigger cameras and optionally other sensors, which are configured to capture image/sensor data for each passing vehicle detected by the laser sensors. Notably, unlike conventional toll systems, the image acquisition module need not receive "violation" signals directly from the lane transaction system and need not discard pictures in response to lack of receipt of such signals.

The image acquisition module may send to the video server an image/sensor file for each vehicle that passes through or transacts with the toll facility. Each image/sensor file may include data corresponding to at least one image or picture of the transacting vehicle (e.g., a picture of the back of the vehicle), may optionally include sensor data, and also may include a time stamp indicating when the image and optional sensor data was captured.

The video server may receive the lane activity report from the lane transaction system and may receive the image/sensor files from the image acquisition module. The video server synchronizes or matches each lane transaction entry in the lane activity report with a single image/sensor file received from the image acquisition module. Accordingly, the video server determines a one-to-one correspondence between the lane transaction entries in the lane activity report and the image/sensor files.

The video server typically determines the one-to-one correspondence between the lane transaction entries and the image/sensor files by first parsing the lane activity report into groups of chronologically sequential transaction entries separated by, or bracketed by, transaction entries corresponding to "landmark transactions." A landmark transaction is a transaction having a transaction entry that typically may be easily related to a readily identifiable captured picture or image. For example, a landmark transaction may be a transaction involving a multi-axle vehicle (i.e., a vehicle having three or more axles). If a lane transaction entry indicates that a transacting vehicle has three or more axles, the corresponding image of the vehicle may be easily selected from among the captured images because typically the majority of the captured images are of cars, which have only two axles.

Accordingly, the lane transaction data may be parsed into groups of chronologically sequential transaction entries bracketed by landmark transaction entries, and the image/sensor files may be parsed into corresponding groups of chronologically sequential image/sensor files bracketed by image/sensor files having landmark transaction images (i.e., the easily identifiable images that correspond to the landmark transactions.)

Once the groups of transaction entries and the corresponding groups of image/sensor files have been identified, the video server may match each transaction entry of a given group of transaction entries with an image/sensor file of a corresponding group of image/sensor files. The transaction entry to sensor/file matching may use the landmark transactions as a reference point and may match, in order, each transaction entry following a landmark transaction entry with each image/sensor file that follows the image/sensor file having the corresponding landmark transaction image. Because of the lack of synchronicity between the lane transaction system and the image acquisition module and the imperfect process of capturing transaction-related data and images, the matching process typically includes adding placeholder transaction entries and/or placeholder image/sensor files to ensure that the number of transaction entries in a group is the same as the number of image/sensor files in the corresponding group.

The video server may be configured to confirm whether the matching process was successful by checking whether the differences between the time stamps of the transaction entries and the time stamps of the matching image/sensor files are within a predetermined tolerance level. The video server also may be configured to check whether the differences between the intervals of time between transactions as determined from transaction entry time stamps and the corresponding intervals of time as determined from the matching image/sensor file time stamps are also within a predetermined tolerance level.

The video server may send the matched image/sensor files and transaction entries to an image processing module of the toll management computer system. The image processing module processes the image/sensor files to extract vehicle identification data. The toll management computer uses the vehicle identification data to identify the vehicles. After the vehicles have been identified, the toll management computer accesses the matched transaction data entries for the identified vehicles and bills or otherwise enables receipt of payment for the transaction from an individual or entity associated with the identified vehicle.

FIG. 1 is a block diagram of an implementation of an electronic toll management system 10. The system 10 is configured to capture a vehicle identifier 31 of vehicle 30 interacting with a facility 28 and to notify external systems 34 of such interaction. For example, the system 10 may allow a toll road authority to capture a vehicle identifier 31, such as license plate information, from a vehicle 30 traveling through the toll road and then to notify law enforcement whether the captured vehicle identifier matches a license plate previously highlighted by law enforcement.

The toll management system 10 also can manage payment from a party associated with the vehicle 32 based on the interaction between the vehicle 30 and the facility 28. For example, the system 10 can capture license plate information from a vehicle 30 and identify the registered owner of the vehicle. The system would then provide to the owner, over a communications channel such as the Internet, an account for making payment or disputing payment. The toll management system 10 can send a bill requesting payment from the party 32 using a mailing address that has been verified against one or more mailing address sources. The system 10 is capable of automatically capturing an image of the vehicle 30 triggered by the vehicle interacting with the facility. Such image capturing can be accomplished using image-processing technology without having to install a radio transponder (e.g., RFID device) in a vehicle.

The electronic toll management system 10 includes a toll management computer 12 which can be configured in a distributed or a centralized manner. Although one computer 12 is shown, one or more computers can be configured to implement the disclosed techniques. The computer 12 is coupled to a facility 28 that may charge a fee for interacting with the facility. Examples of a facility 28 include a toll facility (managed by toll authorities) such as toll road, a toll bridge, a tunnel, parking facility, or other facility. The fee may be based on the interaction between the vehicle 30 and the facility 28. Examples of interactions that may involve a fee include a distance traveled by the vehicle through the facility, a time period the vehicle is present in a facility, the type of vehicle interacting with the facility, the speed at which the vehicle passes through the facility, and the type of interaction between the vehicle and the facility.

The facility 28 can process vehicles including automobiles, a truck, buses, or other vehicles. For ease of explanation, the system 10 shows a single facility 28 interacting with a single vehicle 30 and a party associated with the vehicle 32. However, in other implementations, the disclosed techniques could be configured to operate with one or more vehicles interacting with one or more facilities spanning different geographic locations.

The toll management computer 12 includes an image acquisition module 24 configured to detect the presence of a vehicle, acquire one or more images of the vehicle, and forward the image(s) to an image-processing module 25 for further processing. The module 24 may include image acquisition equipment based on the physical environment in which it is used. For example, for open-road applications, image acquisition equipment may be mounted above the roadway, on existing structures or on purpose-built gantries. Some open-road applications may use equipment mounted in or beside the roadway as well. Lane-based (or tollbooth-style) applications may use equipment mounted on physical structures beside each lane, instead of or in addition to equipment mounted overhead or in the roadway.

The image acquisition module 24 may include imaging components such as vehicle sensors, cameras, digitizing systems, or other components. Vehicle sensors can detect the presence of a vehicle and provide a signal that triggers a camera to capture one or more images of the vehicle. Vehicle sensors may include one or more of the following:

(1) Laser/sonic/microwave devices—these devices, commonly used in Intelligent Transportation Systems (ITS) applications, can recognize the presence of a vehicle and provide information regarding the vehicle's size, classification, and/or speed. These sensors may be configured to provide additional information about the vehicle which can be used in identify the vehicle and its use of the toll facility, including trip time and compliance with traffic laws.

(2) Loops—these sensors can detect the presence and the vehicle type by recognizing the presence of metal masses using a wire loop embedded in the road. Loops can be used as a backup to more sophisticated sensors. Loops can also be used as a primary source of data to detect vehicles, classify vehicles, trigger cameras, and provide vehicle signature data (e.g., based on use of an array of loops with a smart loop control program such as Diamond Consulting's IDRIS® system of Buckinghamshire, United Kingdom).

(3) Through-beam sensors—these sensors may emit a continuous beam across the roadway, and detect the presence of a vehicle based upon interruptions in the beam. This type of sensor may be used in installations where traffic is channeled into tollbooth-style lanes.

(4) Optical sensors—vehicle may be recognized using cameras to continuously monitor images of the roadway for changes indicating the presence of a vehicle. These cameras also can be used to record images for vehicle identification.

Cameras can be used to capture images of vehicles and their identifying characteristics. For example, they can be used to generate a vehicle identifier such as a vehicle license number based on an image of a license plate. Cameras may be analog or digital, and may capture one or more images of each vehicle.

Digitizing systems convert images into digital form. If analog cameras are used, the cameras can be connected to separate digitizing hardware. This hardware may include a dedicated processing device for analog-to-digital conversion or may be based on an input device installed in a general-purpose computer, which may perform additional functions such as image processing. Lighting can be employed to provide adequate and consistent conditions for image acquisition. The lighting may include strobes or continuous illumination, and may emit light of light in the visible spectrum or in the infrared spectrum. If strobes are used, they may be triggered by inputs from the vehicle sensor(s). Other sensors such as light sensors may be required to control the image acquisition module 24 and provide consistent results.

Once the image acquisition module 24 has captured images of the vehicles, the images may be forwarded to an image-processing module 25. The image-processing module 25 may be located in the same location as the image acquisition module 24 and the image computer 12, in a remote location, or a combination of these locations. The module 25 can process a single image for each vehicle or multiple images of each vehicle, depending on the functionality of the image acquisition module 24 and/or business requirements (e.g., accuracy, jurisdictional requirements). If multiple images are used, each image may be processed, and the results may be compared or combined to enhance the accuracy of the process. For example, more than one image of a rear license plate, or images of both front and rear license plates, may be processed and the results compared to determine the most likely registration number and/or confidence level. Image processing may include identifying the distinguishing features of a vehicle (e.g., the license plate of a vehicle) within the image, and analyzing those features. Analysis may include optical character recognition (OCR), template matching, or other analysis techniques.

The toll management system 10 may include other systems capable of substantially real-time processing located at the site where images are acquired to reduce data communication requirements. In an implementation of local image processing, the results may be compared to a list of authorized vehicles. If a vehicle is recognized as authorized, images and/or data may be discarded rather than forwarded for further processing.

Images and data can be forwarded to a central processing facility such as the image database 14 operating in conjunction with the billing engine 22. This process may involve a computer network, but may also include physical media from another computer located at the image acquisition site (i.e., facility 28). Generally, information can be temporarily stored on a computer at the image acquisition site in the event the network is unavailable.

Images received at the central site may not have been processed. Any unprocessed images can be handled as described above. The data resulting from image processing (remote or central) may be separated into two categories. Data that meets application-specific or jurisdiction-specific criteria for confidence may be sent directly to the billing engine 22. On the other hand, data results not meeting required confidence levels may be flagged for additional processing. Additional processing may include, for example, determining whether multiple images of a vehicle are available and independently processing the images and comparing the results. This may include character-by-character comparisons of the results of optical character recognition (OCR) on the license plate image. In another example, the image(s) may be processed by one or more specialized algorithms for recognizing license plates of certain types or styles (such as plates from a particular jurisdiction). These algorithms may consider the validity of characters for each position on the license plate, the anticipated effect of certain design features (such as background images), or other style-specific criteria. The processed image may be forwarded based on preliminary processing results, or may include processing by all available algorithms to determine the highest confidence level.

Preliminary data may be compared to other data available to increase the confidence level. Such techniques include:

(1) Comparing OCR processed license plate data against lists of valid license plate numbers within the billing system or at the appropriate jurisdiction's motor vehicle registration authority.

(2) Comparing other data obtained from sensors at the imaging location (such as vehicle size) to known characteristics of the vehicle registered under the registration number recognized by the system, in the recognized jurisdiction or in multiple jurisdictions.

(3) Comparing the registration and other data to records from other sites (e.g., records of the same or similar vehicle using other facilities on the same day, or using the same facility at other times).

(4) Comparing vehicle fingerprint data against stored lists of vehicle fingerprint data. The use of vehicle fingerprint data for vehicle identification is described in more detail below.

(5) Manually viewing the images or data to confirm or override the results of automated processing.

If additional processing provides a result with a particular confidence level, the resulting data then can be forwarded to the billing engine 22. If the required confidence level cannot be attained, the data may be kept for future reference or discarded.

The billing engine 22 processes the information captured during the interaction between the vehicle and the toll facility, including the vehicle identifier as determined by the image processing module 25 to create a transaction event corresponding to an interaction between the vehicle and the facility. The engine 22 can store the transaction event in a billing database 16 for subsequent payment processing. For example, the billing engine 22, alone or in combination with a customer management module 26 (described below), produces payment requests based on the transaction events. The transaction event data may include individual charges based on a vehicle's presence at specific points or facilities, or trip charges based on a vehicle's origin and destination involving a facility. These transaction events can be compiled and billed, for example, by one or more of the following methods:

(1) Deducting payment from an account established by the vehicle owner or operator. For example, the billing database 20 can be used to store an account record for each vehicle owner. In turn, each account record can include a reference to one more transaction events. A paper or electronic payment statement may be issued and sent to the registered owner of the vehicle.

(2) Generating a paper bill and sending it to the owner of the vehicle using a mailing address derived from a vehicle registration record.

(3) Presenting an electronic bill to a predefined account for the vehicle owner, hosted either by the computer 12 or a third party.

(4) Submitting a bill to the appropriate vehicle registration authority or tax authority, permitting payment to be collected during the vehicle registration renewal process or during the tax collection process.

Billing may occur at regular intervals, or when transactions meet a certain threshold, such as maximum interval of time or maximum dollar amount of outstanding toll charges and other fees. Owners may be able to aggregate billing for multiple vehicles by establishing an account with the computer 12.

The customer management module 26 can allow a user to interact with the toll management computer 12 over a communications channel such as a computer network (e.g., Internet, wired, wireless, etc.), a telephone connection, or other channel. The user can include a party associated with a vehicle 22 (e.g., owner of the vehicle), a public or private authority responsible for management of the facility 28, or other user. The customer management module 26 includes a combination of hardware and software module configured to handle customer interactions such as an account management module 26a, a dispute management module 26b and a payment processing module 26c. The module 26 employs secure access techniques such as encryption, firewalls, password or other techniques.

The account management module 26a allows users such as motorists to create an account with the system 10, associate multiple vehicles with that account, view transactions for the account, view images associated with those transactions, and make payments on the account. In one implementation, a user responsible for the facility can access billing and collection information associated with motorists that have used the facility.

The dispute management module 26b may permit customers to dispute specific transactions on their accounts and to resolve disputes using the computer 12 or third parties. Disputes may arise during billing situations. The module 26b may help resolve such disputes in an automated fashion. The module 26b can provide a customer to access an "eResolution" section of a controlling/billing authority website. Customers can file a dispute and download an image of their transaction, the one in question. If there is no match (i.e., the customers automobile is not the automobile in the photo frame), the bill can be forwarded for a third party evaluation such as arbitration. In the far more likely case, the photo will show that the customer's automobile was indeed billed correctly. Dispute management can use encrypted security in which all text and images are sent over a computer network (e.g., the Internet) using high strength encryption. Proof of presence images can be embedded into the dispute resolution communication as an electronic watermark.

The payment processing module 26c provides functionality for processing payments manually or electronically, depending on the remittance received. For example, if payment remittance is in the form of a paper check, then scanning devices could be used to convert the paper information into electronic format for further processing. On the other hand if electronic payment is employed, then standard electronic payment techniques can be used. The payment processing module 26c can support billing methods such as traditional mailing, electronic payment (e.g. using a credit card, debit card, smart card, or Automated Clearing House transaction), periodic billing (e.g., send the bill monthly, quarterly, upon reaching a threshold, or other). The payment processing module 26c can support discounts and surcharges based on frequency of usage, method of payment, or time of facility usage. The payment processing module 26c also can support payment collection methods such as traditional check processing, processing payment during renewal of a vehicle registration (with interest accrued), electronic payment, direct debit bank, credit cards, pre-payment, customer-initiated payments (as often as the customer desires), or provide discounts for different purposes.

The toll management computer 12 communicates with external systems 34 using one or more communications techniques compatible with the communications interfaces of the systems. For example, communications interfaces can include computer networks such as the Internet, electronic data interchange (EDI), batch data file transfers, messaging systems, or other interfaces. In one implementation, external systems 34 include law enforcement agencies 36, postal authorities 38, vehicle registration authorities 40, insurance companies 42, service providers 44, financial systems 46 and a homeland security agency 48. The external systems 34 can involve private or public organizations that span one or more geographic locations such as states, regions, countries, or other geographic locations.

The toll management computer 12 can interface and exchange information with law enforcement agencies 36. For example, as vehicles are identified, the computer can submit substantially real-time transactions to law enforcement systems, in formats defined by the law enforcement agencies. Transactions also can be submitted for vehicles carrying hazardous materials or violating traffic regulations (e.g. speeding, weight violations, missing plates), if the appropriate sensors are in place (e.g. laser/sonic/microwave detectors as described above, weight sensors, radiation detectors). Alternatively, vehicle records can be compiled and forwarded in batches, based on lists provided by law enforcement agencies.

The highlighted vehicle identifier database 20 can be used to store the lists provided by the law enforcement agencies. The term "highlighted" refers to the notion that the law enforcement agencies have provided a list of vehicle identifiers that the agencies have indicated (highlighted) they wish the toll facility to monitor. For example, when a motor vehicle is stolen and reported to police, the police can send a list of highlighted vehicle identifiers to the database 20. When the vehicle highlighted by the police travels through facility, the imaging processing module 24 determines a vehicle identifier associated with the vehicle and determines through certain interfaces that the particular vehicle is being sought by law enforcement. The law enforcement authorities may wish to be instantly notified of the location of the vehicle (and driver), the time it was detected at the location, and the direction it was headed. The computer 12 can notify in substantially real-time mobile units associated with law enforcement. In addition, law enforcement can automatically highlight vehicles based upon the expiration of a license, occurrence of a traffic court date, or other event. This could, in turn, help keep illegal drivers off the road and increase revenue to the state.

The toll management computer 12 can interface and exchange information with postal authorities 38. Since the disclosed techniques would require toll authorities to convert from receiving payment by drivers at the time of travel to receiving paying in arrears, it is important that bills be sent to the correct driver/vehicle owner. To minimize the possibility of sending the bill to the wrong person, the computer 12 supports address reconciliation. For example, before a bill is mailed, the computer 12 verifies that the address provided by a motor vehicle department matches the address provided by the postal authority. The motor vehicle database can then be updated with the most accurate address information related to the vehicle owner. Since this occurs before the bill is mailed, billing errors can be reduced.

The toll management computer 12 can interface and exchange information with vehicle registration authorities 40. The registration authorities 40 provide an interface to exchange information related to the owners of vehicles, the owners' addresses, characteristics of the vehicles, or other information. Alternatively, this information can be accessed through third-party data providers rather than through an interface to public motor vehicle records. The accuracy of records in the various databases used by the computer 12, including vehicle ownership and owner addresses, may be verified periodically against third-party databases or government records, including motor vehicle records and address records. This may help ensure the quality of ownership and address records, and reduce billing errors and returned correspondence.

The toll management computer 12 can interface and exchange information with insurance companies 42. Insurance companies could highlight vehicle identifiers in a manner similar to law enforcement authorities 36. For example, the highlighted vehicle identifiers database 20 can include license plate numbers of vehicles with an expired insurance indicating that such drives would be driving illegally. The computer could notify law enforcement as well as insurance companies whether the highlighted vehicle has been detected using a particular facility.

The toll management computer 12 can interface and exchange service providers 44. For example, the computer 12 can support batch or real-time interfaces for forwarding billing and payment collection functions to billing service providers or collection agencies.

The toll management computer 12 can interface and exchange information with financial systems 46. For example, to handle bill payment and collection, the computer 12 can interface to credit card processors, banks, and third-party electronic bill presentment systems. The computer 12 can also exchange information with accounting systems.

The toll management computer 12 can interface and exchange information with the homeland security agency 48. The office of homeland security can automatically provide a list of individuals for use in the highlighted vehicle identifier database 20. For example, registered drivers that are on a visa to this country can be automatically highlighted when that visa expires. The computer 12 would then notify the office of homeland security 48 that the highlighted vehicle identifier associated with the person has been detected driving in the country including the time and location information about the vehicle.

As described above, data captured from the toll site flows into the image database, and is retrieved from the image database by the billing engine. In another implementation, the toll computer detects, for each vehicle, an interaction between the vehicle and a toll facility, captures images and generates a data record. The data record can include date, time, and location of transaction, a reference to the image file, and any other data available from the sensors at the facility (e.g., speed, size). The image can be passed to the image-processing module 25, which can generate a vehicle identifier, a state, and a confidence factor for each vehicle. This information can be added to the data record. (This process my occur after transmission to the central facility.) The data record and image file can be sent to the central facility. The image can be stored in the image database, and referenced if (a) additional processing is required to identify the vehicle, or (b) someone wishes to verify the transaction. If the confidence level is adequate, the data record can be submitted to the billing engine, which can associate it with an account and store it in the billing database for later billing. If no account exists, the vehicle identifier is submitted to the appropriate state registration authority or a third-party service provider to determine the owner and establish an account. This process may be delayed until enough transactions are collected for the vehicle to justify issuing a bill. If confidence level is not adequate, additional processing may be performed as described elsewhere.

The techniques described above describe the flow of data based on a single transaction end-to-end, then looping back to the beginning. In another implementation, some of the functions described may be event-driven or scheduled, and may operate independently of one another. For example, there may be no flow of control from back-end processes to vehicle imaging. The imaging process may be initiated by an event, including the presence of a vehicle at the toll site.

In another implementation, the system may be used to monitor traffic and manage incidents. For example, if a drop in average vehicle speed is detected, the computer can send a message to a highway control facility alerting controllers to the possibility of an incident. Authorized controllers may communicate with the equipment at the toll site to view images from the cameras and determine if a response is required.

The operation of the toll management system 10 is explained with reference to FIGS. 2-5.

Figure 2:
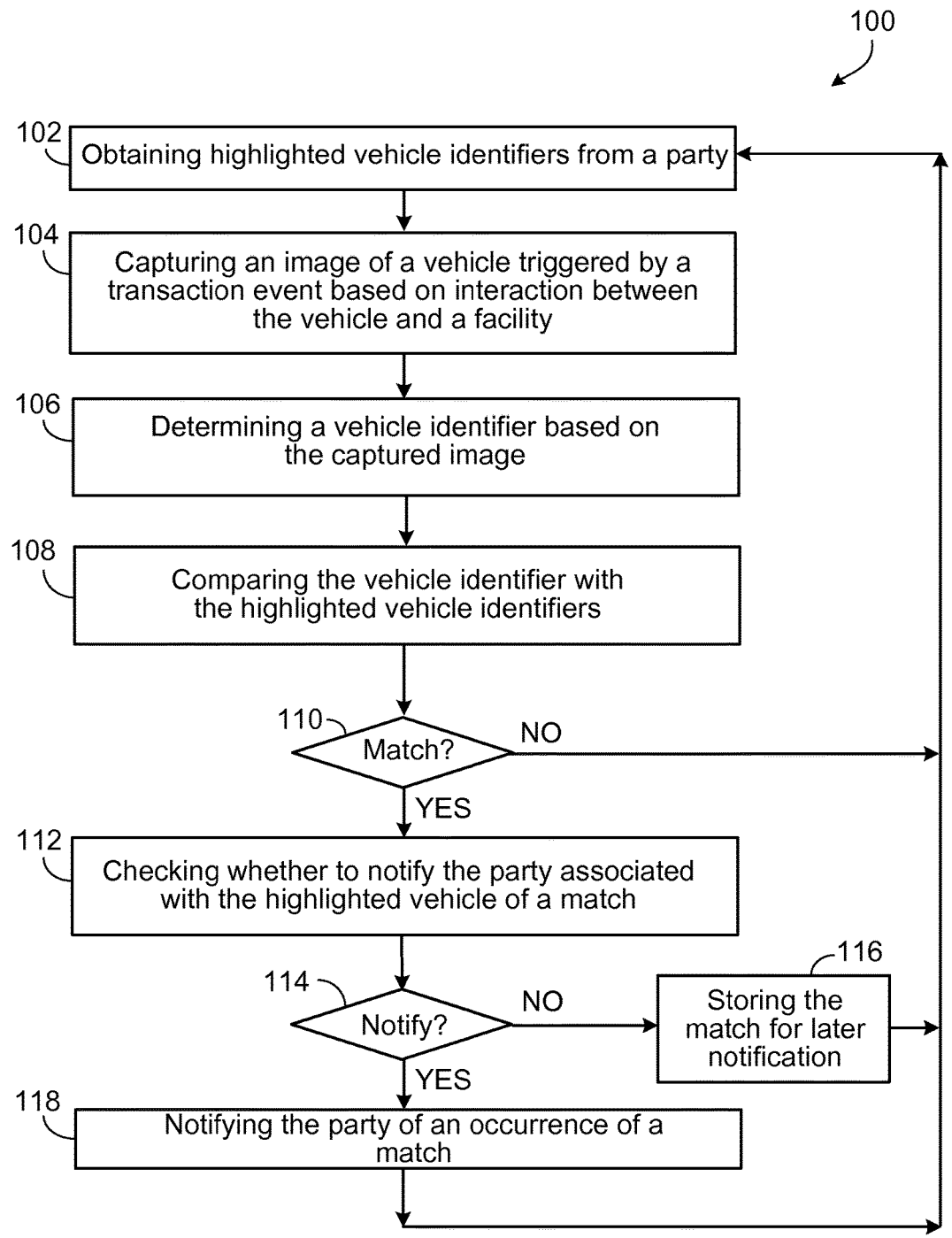
FIG. 2 is a flow chart of an implementation of an electronic toll management system related to highlighted vehicle identifier management.

FIG. 2 is a flow chart of an implementation of electronic toll management system related, particularly a process 100 for managing highlighted vehicle identifiers 20 provided by external systems 34. To illustrate, in one example, it is assumed that law enforcement agencies 36 generate a list of highlighted vehicle identifiers (e.g., license plate numbers) of drivers being sought by the agencies and that the agencies 36 wish to be notified when such vehicles have been identified using a toll facility 28.

The computer 12 obtains (block 102) highlighted vehicle identifiers from a party such as law enforcement agencies 36. In one implementation, these vehicle identifiers can be stored in the vehicle identifier database 20 for subsequent processing. The database 20 can be updated by the agencies with new as well as additional information in real-time and/or in batch mode. The law enforcement agencies accessed by the computer span across multiple jurisdictions such as cities, municipalities, states, regions, countries or other geographic designations. As a result, the computer 12 can process vehicle information across multiple jurisdictions and on a national scale.

The computer 12 captures (block 104) an image of a vehicle triggered by a transaction event based on an interaction between the vehicle 30 and the facility 28. For example, the image acquisition module 24 can be used to acquire one or more images of a vehicle as it travels through a facility such as a toll road. These images can be stored in the image database 14 for further processing by the image-processing module 25. Compression techniques can be applied to the captured images to help reduce the size of the database 14.

The computer 12 determines (block 106) a vehicle identifier based on the captured image. For example, as discussed previously, the image-processing module 25 can apply image analysis techniques to the raw images in the image database 14. These analysis techniques can extract a license number from one or more images of a license plate of the vehicle. The extracted vehicle identifiers can be stored in the vehicle identifier database 18 for further processing.

The computer 12 compares (block 108) a captured vehicle identifier with the highlighted vehicle identifier. For example, the computer 12 can compare a captured license plate number from the vehicle identifier database 18 with a license number from the highlighted vehicle identifier database 20. As discussed above, automatic as well as manual techniques can be applied to check for a match.

If the computer 12 detects a match (block 110) between the license numbers, then it checks (block 112) how the party associated with the highlighted vehicle identifiers wishes to be notified. This information can be stored in the vehicle identifier database 20 or other storage mechanism. On the other hand, if there is no match, the computer 12 resumes executing the process 100 beginning at block 102.

If the party indicates that it wishes to be notified immediately (block 114), then the computer notifies (block 118) the party upon the occurrence of a match. In this example, the computer can notify law enforcement of the match in substantially real-time using wireless communications techniques or over a computer network.

On the other hand, if the party does not wish to be notified immediately (block 114), then the computer 12 stores (block 116) the match for later notification upon satisfaction of predefined criteria. In one implementation, predefined criteria can include gathering a predefined number of matches and then sending the matches to law enforcement in batch mode.

Once the party has been notified (block 118) of a match or the match has been stored for later notification (block 116), the computer 12 resumes executing process 100 beginning at block 102.

Figure 3:
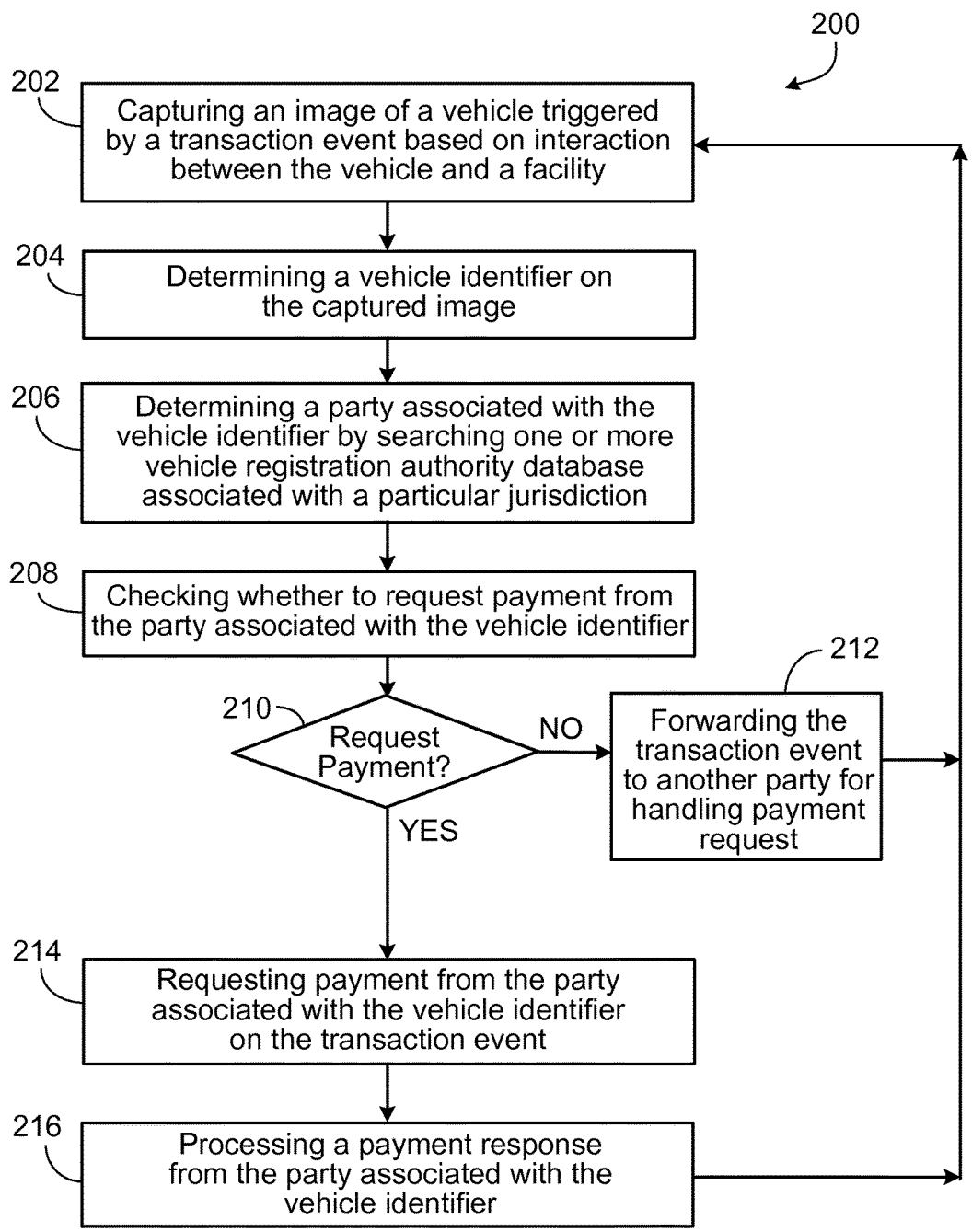
FIG. 3 is a flow chart of an implementation of an electronic toll management system related to payment management.

FIG. 3 is a flow chart of an implementation of electronic toll management system 10, particularly a process 200 for managing payment from a party associated with a vehicle that has interacted with a facility. To illustrate, in one example, it is assumed that a toll road authority decides to employ the disclosed techniques to handle payment processing including billing and collecting tolls from vehicles using its toll road.

The computer 12 captures (block 202) an image of a vehicle triggered by a transaction event based on an interaction between the vehicle and a facility. This function is similar to the process discussed above in reference to block 104 of FIG. 2. For example, the image acquisition module 24 can be used to acquire one or more images of a vehicle 30 as it travels through the toll road 28. These images can be stored in the image database 14 for further processing by the image-processing module 25.

The computer 12 determines (block 204) a vehicle identifier based on the captured image. This function is also similar to the process discussed above in reference to block 106 of FIG. 2. For example, the image-processing module 25 can be used to extract a license number from one or more images of a license plate of the vehicle. These vehicle identifiers can be stored in the vehicle identifier database 18 for further processing.

The computer 12 determines (block 206) a party associated with the vehicle identifier by searching a registration authority databases. For example, the computer 12 can use the vehicle identifier from the vehicle identifier database 18 to search a database of a vehicle registration authority 40 to determine the registered owner of the vehicle associated with the vehicle identifier. The computer 12 is capable of accessing vehicle information from one or more vehicle registration databases across multiple jurisdictions such as cities, municipalities, states, regions, countries or other geographic locations. In one implementation, the computer 12 can maintain a copy of registration information from multiple registration authorities for subsequent processing. Alternatively, the computer 12 can access multiple registration authorities and obtain registration information on a demand basis. In either case, these techniques allow the computer 12 to process vehicle information across multiple jurisdictions, and thus process vehicles on a national scale.

The computer 12 checks (block 208) whether to request payment from the party associated with the vehicle identifier. The request for payment can depend on payment processing information associated with the registered owner. For example, the registered owner may be sent a bill based on a periodic basis (e.g., monthly basis), when a predefined amount has been reached, or other arrangement.

If the computer 12 determines that payment is required (block 210), then it requests (block 214) payment from the party associated with the vehicle identifier based on the transaction event. As discussed above, a request for payment can be generated using traditional mail service techniques or electronic techniques such as electronic payment. The amount of the bill can depend on information from the transaction event such as the nature of the interaction between the vehicle and the facility. For example, the transaction event can indicate that the vehicle traveled a particular distance defined as a distance between a starting and ending point on the toll road. Accordingly, the amount of the payment requested from the registered owner can be based on the distance traveled.

On the other hand, if the computer 12 determines that payment is not required (block 210), then it forwards (block 212) the transaction event to another party to handle the payment request. For example, the toll authority may have decided that the computer 12 can handle image processing functions and that toll billing and collection should be handled by a third party such as external systems 34. In one implementation, the computer 12 can interface with service providers 44 and financial systems 48 to handle all or part of the billing and payment-processing functionality. Once the transaction event has been forwarded to a third party, the computer 12 resumes executing the functions of process 200 beginning at block 202.

If the computer handles payment processing, the computer 12 processes (block 216) a payment response from the party associated with the vehicle identifier. In one implementation, the billing database 16, in conjunction with the billing engine 22 and the customer management module 26, can be used to handle billing and collection functions. As discussed above, the payment processing module 26c can support electronic or manual payment processing depending on the remittance received. For example, the computer 12 can provide an account for handling electronic payment processing over a computer network such as the Internet. The computer can also handle traditional payment receipt such as a check.

Once a payment has been processed (block 216), the computer 12 resumes executing process 200 beginning at block 202.

Figure 4:
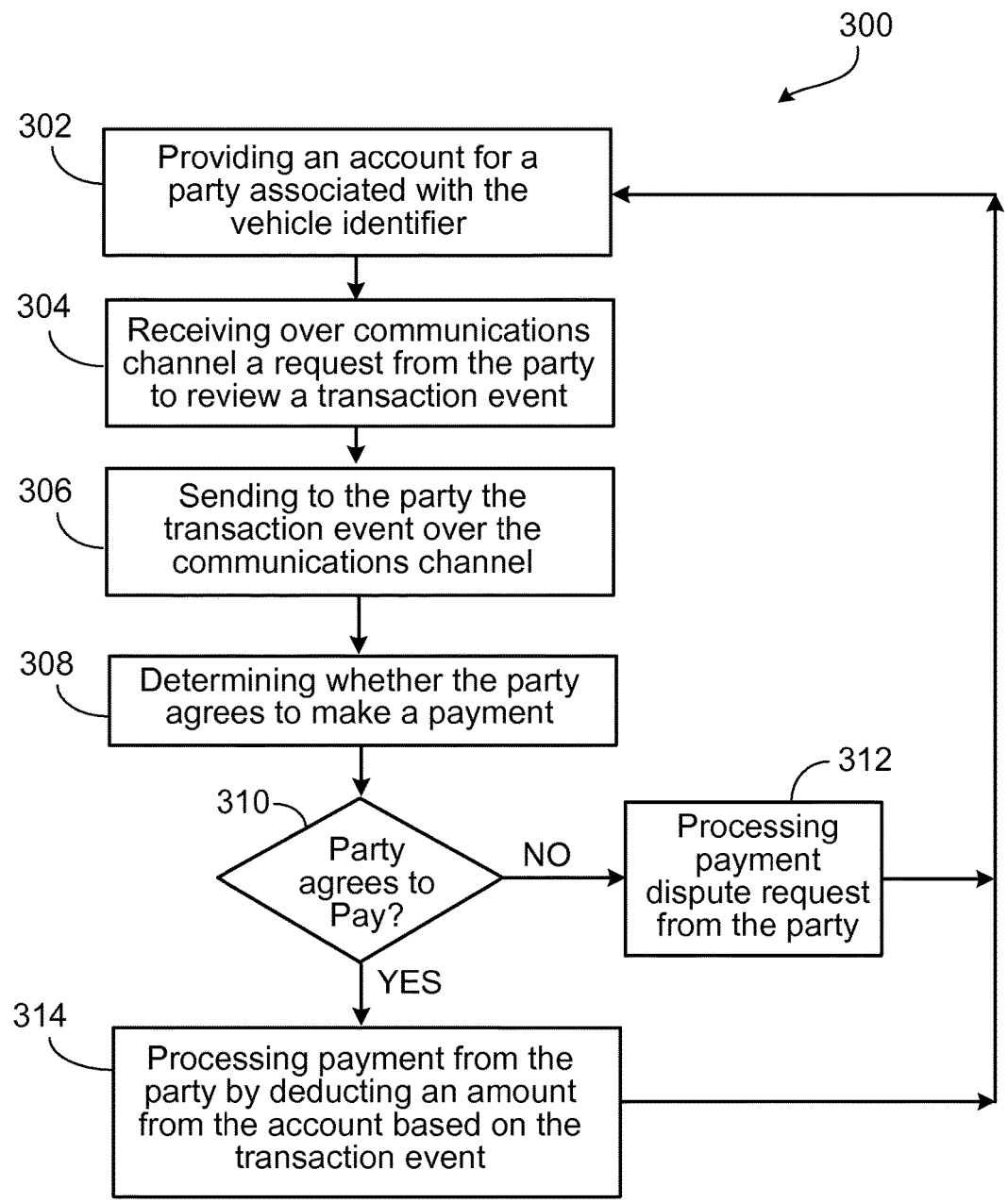
FIG. 4 is a flow chart of an implementation of an electronic toll management system related to payment management.

FIG. 4 is a flow chart of an implementation of electronic toll management system 10, particularly process 300 for managing payment over a communications channel from a party associated with a vehicle that has interacted with a facility. To illustrate, assume a toll authority responsible for a toll road employs the disclosed techniques and that a registered owner wishes to efficiently and automatically make payments for using the toll road.

The computer 12 provides (block 302) an account for a party associated with the vehicle identifier. In one embodiment, the computer 12 in conjunction with the account management module 26a can provide a website for customers to open an account for making electronic payment over a computer network such as the Internet. The website also can permit the customer to access and update account information such as payment history, payment amount due, preferred payment method, or other information.

The computer 12 receives (block 304) a request over a communications channel from the party to review a transaction event. For example, the account payment module 26a can handle this request by retrieving transaction event information associated with the customer's account from the billing database 16. The retrieved information can include image data of a particular transaction involving the customer's vehicle and the tollbooth.

The computer 12 sends (block 306) the transaction event to the party 32 over the communications channel. Information related to the transaction event can include images of the vehicle and the vehicle identifier (i.e., license plate). Such data can be encrypted to permit secure transmission over the Internet. Standard communications protocols such as hypertext markup language (HTML) can be used to transmit the information over the Internet.

The computer 12 determines (block 308) whether the party agrees to make payment. For example, once the customer receives the information related to the transaction event, the customer can review the information to determine whether to make payment based on whether the vehicle shown in the images is the customer's vehicle.

If the computer 12 determines (block 310) that the party agrees to pay, then it processes (block 314) payment from the party by deducting an amount from the account based on the transaction event. For example, if the image information indicates that the transaction event data is accurate, then the customer can authorize payment such as by submitting an electronic payment transaction.

On the other hand, if the computer 12 determines (block 310) that the party does not agrees to pay, then the computer 12 processes (block 312) a payment dispute request from the party. In one implementation, the dispute management module 26b can handle a dispute request submitted by the customer using online techniques. The module 26b can handle specific transactions related to the customer's account including involving a third party to resolve the dispute.

Once a payment has been processed (block 314) or a dispute resolved (block 312), the computer 12 resumes executing process 300 beginning at block 304.

Figure 5:
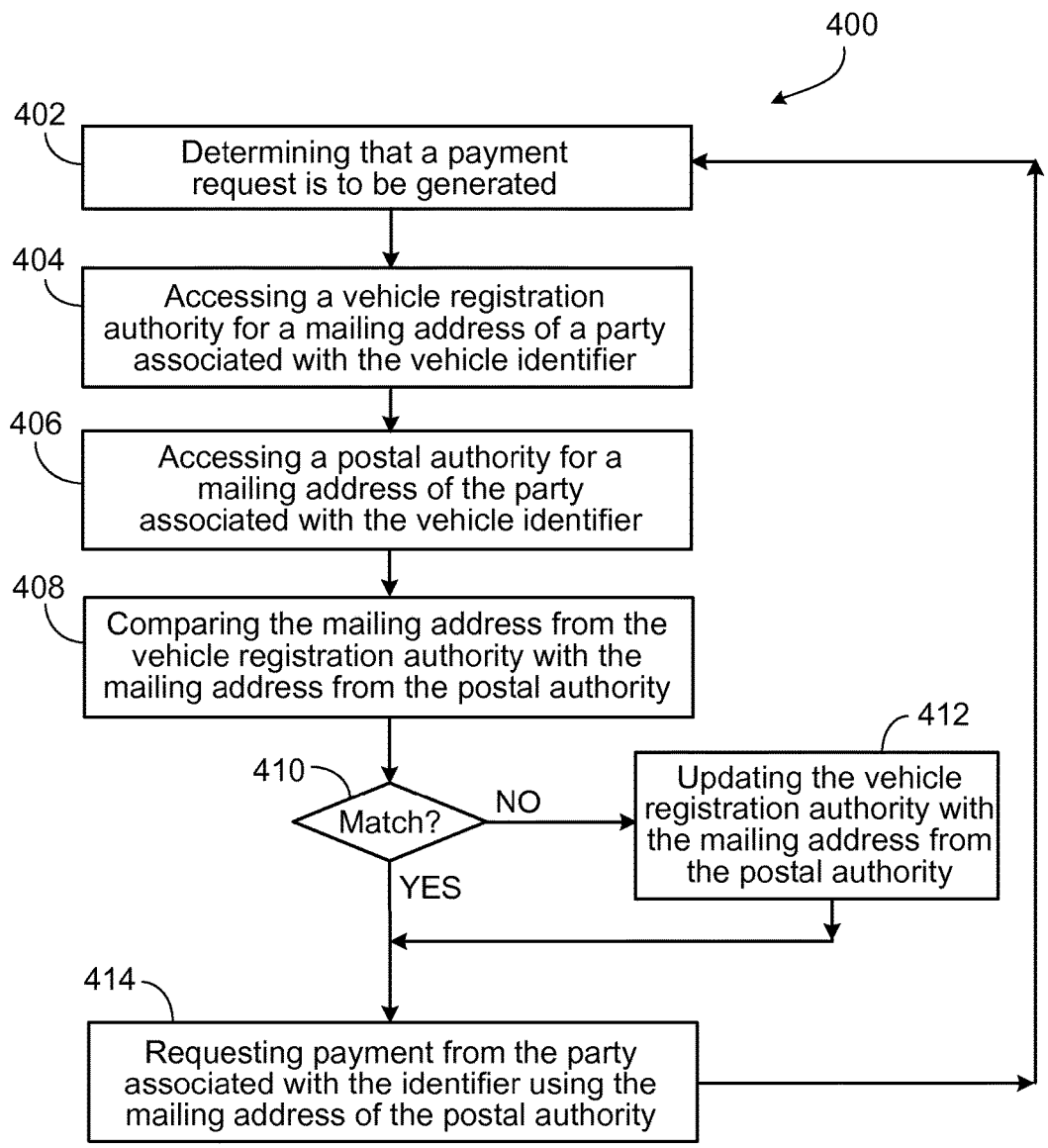
FIG. 5 is a flow chart of an implementation of an electronic toll management system related to mailing address verification.

FIG. 5 is a flow chart of an implementation of electronic toll management system, particularly a process 400 for reconciling mailing addresses from different sources. To illustrate, it is assumed that a toll authority has decided to employ the disclosed techniques for processing payment related to the use of toll facility. Since the disclosed techniques involve processing payment some time after the vehicle has traveled through the toll authority, these techniques help ensure that payment is sent to the correct address of the registered owner of the vehicle.

The computer 12 determines (block 402) that a payment request is to be sent to a party associated with a vehicle identifier. As explained above, for example, payment requests may be generated based on a periodic basis or on an amount threshold basis.

The computer 12 accesses (block 404) a vehicle registration authority for a mailing address of a party associated with the vehicle identifier. For example, the computer 12 may access one or more databases associated with vehicle registration authorities 40 to retrieve information such as the mailing address of the registered owner of the vehicle.

The computer 12 accesses (block 406) a postal authority for a mailing address of the party associated with the vehicle identifier. For example, the computer 12 may access one or more databases associated with postal authorities 38 to retrieve information such as the mailing address of the registered owner of the vehicle.

The computer 12 compares (block 408) the mailing address from the vehicle registration authority with the mailing address from the postal authority. For example, the computer compares the mailing addresses from the two authorities to determine if there is a discrepancy between the database information.

If the computer 12 determines (block 410) that the addresses match, then it requests (block 414) payment from the party associated with the vehicle identifier using the mailing address accessed from the postal authority. For example, the computer 12 can use the techniques discussed above to handle payment processing including billing and collecting payment from the registered owner.

On the other hand, if the computer 12 determines (block 410) that the addresses do not match, it then updates (block 412) the vehicle registration authority with the mailing address from the postal authority. For example, the computer 12 can update databases associated with vehicle registration authorities 40 with the correct mailing address retrieved from the postal authorities 38. Such techniques may help reduce the likelihood of mailing a bill to an incorrect mailing address resulting in an reducing time for payment remittance.

Once the vehicle registration authority has been updated (block 412) or payment requested (block 414), the computer 12 executes process 400 beginning at block 402 as explained above.

Figure 6:
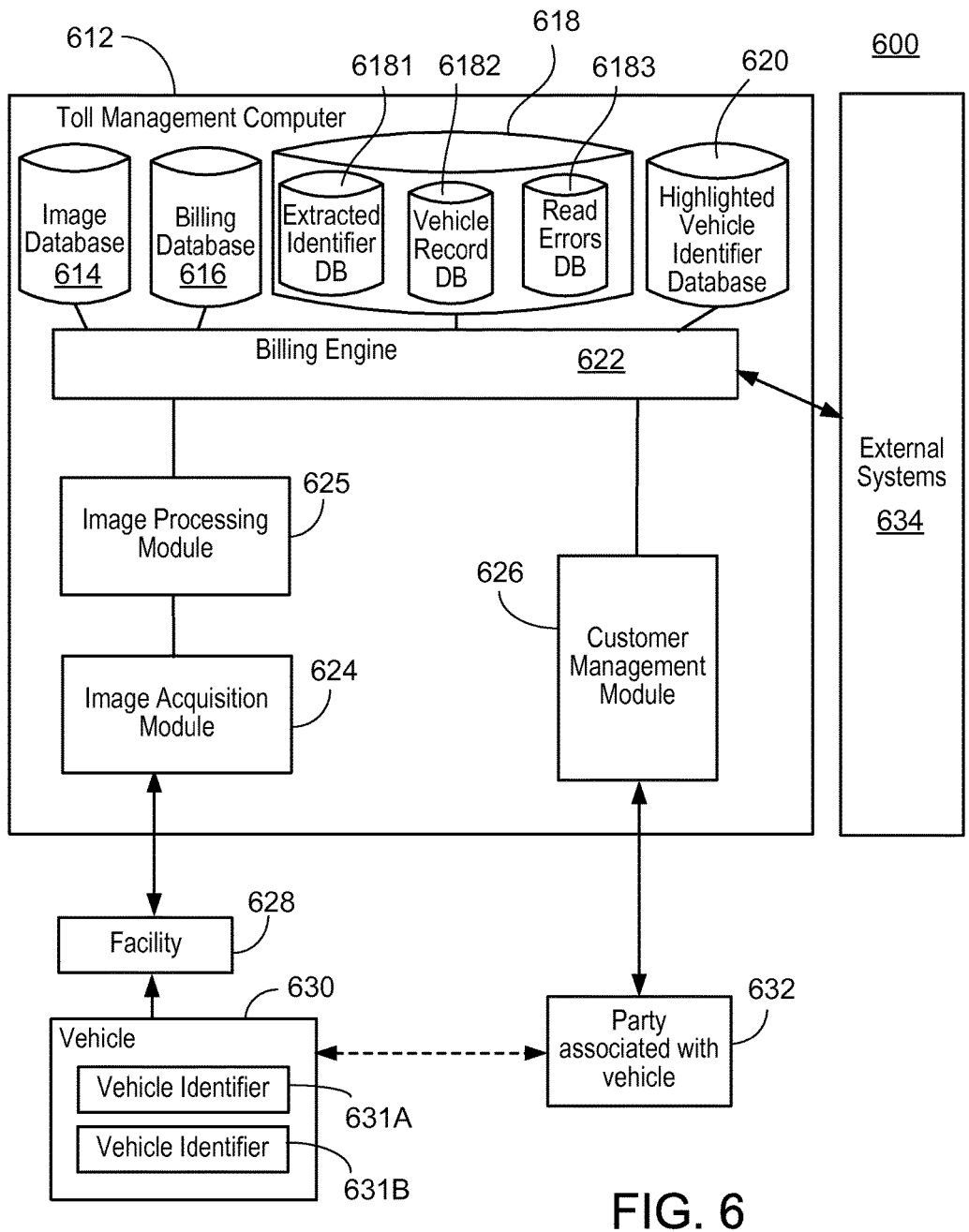
FIG. 6 is a block diagram of an implementation of an electronic toll management system.

FIG. 6 is a block diagram of an implementation of an electronic toll management system 600 that provides vehicle identification by extracting multiple vehicle identifiers for each vehicle that interacts with the toll facility. The toll management system 600 includes a toll management computer 612. The toll management computer includes an image database 614, a billing database 616, a vehicle identification database 618, a highlighted vehicle identifier database 620, a billing engine 622, an image acquisition module 624, an image processing module 625, and a customer management module 626. The toll management computer 612 communicates with or is integrated with a toll facility 628, which interacts with a vehicle 630 and a party associated with the vehicle 632. The toll management computer 612 also communicates with external systems 634.

Examples of each element within the toll management system 600 of FIG. 6 are described broadly above with respect to FIG. 1. In particular, the toll management computer 612, the image database 614, the billing database 616, the vehicle identification database 618, the highlighted vehicle identifier database 620, the billing engine 622, the image acquisition module 624, the image processing module 625, the customer management module 626, and the toll facility 628 typically have attributes comparable to and illustrate one possible implementation of the toll management computer 12, the image database 14, the billing database 16, the vehicle identification database 18, the highlighted vehicle identifier database 20, the billing engine 22, the image acquisition module 24, the image processing module 25, the customer management module 26, and the toll facility 28 of FIG. 1, respectively. Likewise, the vehicle 630, the party associated with the vehicle 632, and the external systems 634 typically have attributes comparable to the vehicle 30, the party associated with the vehicle 32, and the external systems 34 of FIG. 1.

The vehicle identification database 618 includes an extracted identifier database 6181, a vehicle record database 6182, and a read errors database 6183. The functions of the databases 6181-6183 are described in more detail below.

The system 600 is similar to system 10 and is configured to provide, for example, reduced vehicle identification error rates by identifying each vehicle through use of multiple vehicle identifiers. Two such identifiers are designated as 631A and 631B. A vehicle identifier is preferably an identifier that uniquely or substantially uniquely identifies the vehicle but may be an identifier that helps in the identification process by distinguishing the vehicle from other vehicles without necessarily uniquely identifying the vehicle. Identifiers 631A and 631B may be part of vehicle 630, as suggested by FIG. 6, but need not be. For example, identifiers 631A and/or 631B may be produced by image processing module 625 based on characteristics of the vehicle 630.

As described previously, one example of a vehicle identifier is license plate information of a vehicle, such as a license plate number and state. The image processing module 625 may determine the license plate information of a vehicle from an image of the license plate by using OCR, template matching, and other analysis techniques. A license plate number may include any character but is typically restricted to alphanumeric characters. License plate information typically may be used to uniquely identify the vehicle.

Another example of a vehicle identifier is a vehicle detection tag as described in U.S. Pat. No. 6,747,687, hereby incorporated by reference in its entirety for all purposes. The vehicle detection tag, hereinafter referred to as a vehicle fingerprint, is a distilled set of data artifacts that represent the visual signature of the vehicle. The image processing module 625 may generate a vehicle fingerprint by processing an image of the vehicle. To save on processing time and storage needs however, the generated vehicle fingerprint typically does not include the normal "picture" information that a human would recognize. Accordingly, it is usually not possible process the vehicle fingerprint to obtain the original vehicle image. Some vehicle fingerprints, however, may include normal picture information. A vehicle fingerprint typically may be used to uniquely identify the vehicle.

In one implementation, a camera in the image acquisition module 624 captures a single "still" image of the back of each vehicle that passes the toll facility 628. For each vehicle, the image processing module 625 recognizes the visual cues that are unique to the vehicle and reduces them into a vehicle fingerprint. Because a license plate is a very unique feature, the image processing module 625 typically maximizes the use of the license plate in creating the vehicle fingerprint. Notably, the vehicle fingerprint also includes other parts of the vehicle in addition to the license plate and, therefore, vehicle identification through matching of vehicle fingerprints is generally considered more accurate than vehicle identification through license plate information matching. The vehicle fingerprint may include, for example, portions of the vehicle around the license plate and/or parts of the bumper and the wheelbase.

Another example of a vehicle identifier is a vehicle signature generated using a laser scan (hereinafter referred to as a laser signature). The laser signature information that may be captured using a laser scan may include one or more of an overhead electronic profile of the vehicle, including the length, width, and height of the vehicle, an axle count of the vehicle, and a 3D image of the vehicle. In one implementation, the image acquisition module 624 includes two lasers for a given lane, one that is mounted over the lane and another that is mounted alongside of the lane. The laser mounted above the lane typically scans the vehicle to capture the overhead profile of the vehicle, and the laser mounted alongside or above of the lane typically scans the vehicle to capture the axle count of the vehicle. Together, both lasers are also able to generate a 3D image of the vehicle. A laser signature may be used to uniquely identify some vehicles. For example, vehicles that have been modified to have a distinctive shape may be uniquely identified by a laser signature.

Another example of a vehicle identifier is a vehicle signature generated using a magnetic scan (hereinafter referred to as an inductive signature). The inductive signature of a vehicle is a parameter that reflects the metal distribution across the vehicle and, therefore, may be used to classify the vehicle and, in some circumstances, to uniquely identify the vehicle (e.g., if the metal distribution of a particular vehicle is unique to that vehicle because of unique modifications to that vehicle). The inductive signature may include information that may be used to determine one or more of the axle count (and likely the number of tires) of the vehicle, the type of engine used in the vehicle, and the type or class of vehicle. In one implementation, the image acquisition module 624 includes a pair of vehicle detection loops, an axle detection loop, and a camera trigger loop in each lane.

Once the two or more vehicle identifiers are extracted by the image processing module 625, the image processing module 625 stores the extracted vehicle identifiers in the extracted vehicle identifier database 6181. Ideally, the computer 612 would then be able to uniquely identify the owner of the vehicle by choosing a vehicle identifier that uniquely identifies the vehicle (e.g., license plate information or vehicle fingerprint) and searching one or more internal or external vehicle record databases for a record containing a matching vehicle identifier. Unfortunately, extracting a vehicle identifier is an imperfect process. The extracted vehicle identifier may not correspond to the actual vehicle identifier, and therefore, may not uniquely identify the vehicle. An incorrectly or partially extracted vehicle identifier may not match the vehicle identifier of any vehicle, may match the vehicle identifier of the wrong vehicle, or may match the vehicle identifiers of more than one vehicle. To increase identification accuracy, the computer 612 of the system 600 implements a multi-tier identification process using two or more vehicle identifiers.

Figure 7:
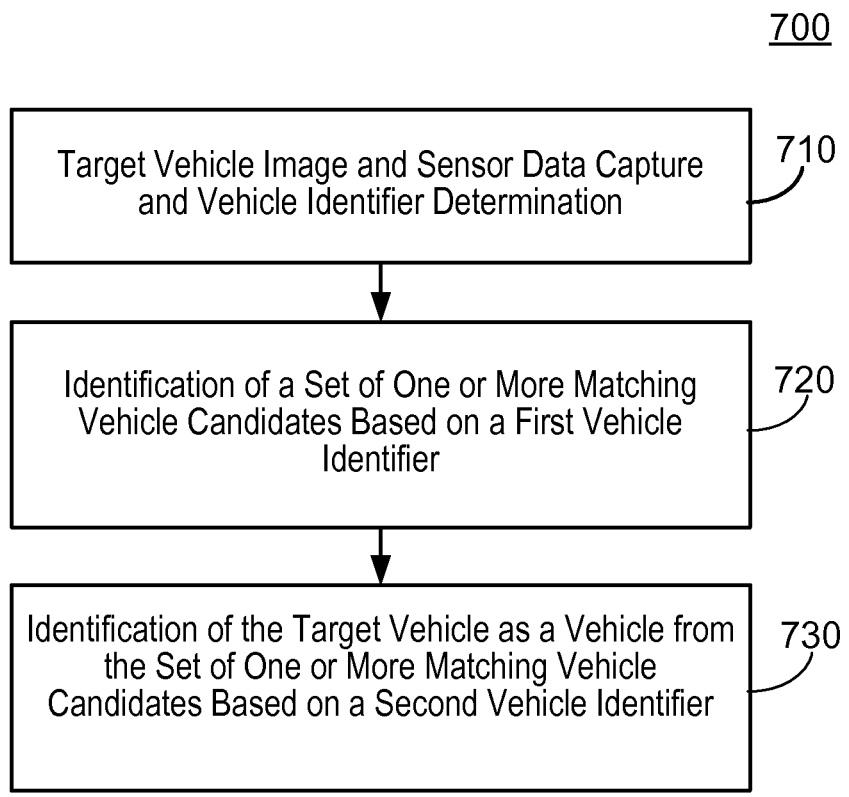
FIG. 7 is a flow chart of an implementation of an electronic toll management system related to vehicle identification.

FIG. 7 is a flow chart of an exemplary two-tier identification process 700 that may be implemented to increase the accuracy of vehicle identification. Image and/or sensor data is captured for a vehicle that interacts with a toll facility (hereinafter referred to as the "target vehicle") and two vehicle identifiers are extracted from the captured data (block 710). In one implementation, only image data is collected and the two vehicle identifiers extracted are a license plate number and a vehicle fingerprint. In another implementation, image data and inductive sensor data are collected and the vehicle identifiers extracted are the vehicle fingerprint and the inductive signature.

One of the two extracted vehicle identifiers is designated as the first vehicle identifier and used to identify a set of one or more matching vehicle candidates (block 720). Typically, the vehicle identifier that is deemed to be the least able to accurately and/or uniquely identify the target vehicle is designated as the first vehicle identifier. For example, if the two extracted vehicle identifiers were license plate number and vehicle fingerprint, the license plate number would be designated as the first vehicle identifier because of the lower expected accuracy of vehicle identification through license plate matching as compared to fingerprint matching. The one or more matching vehicle candidates may be determined, for example, by accessing a vehicle record database and finding records that contain vehicle identifiers that match or nearly match the first vehicle identifier.

Once the set of one or more matching vehicle candidates is determined, the target vehicle is identified from the set based on the second vehicle identifier (block 730). For example, if 12 vehicle candidates were identified as matching a partially extracted license plate number, the target vehicle is identified by accessing the vehicle fingerprints for each of the 12 vehicle candidates and determining which of the 12 vehicle fingerprints matches the extracted vehicle fingerprint. If no match is found within a predetermined confidence threshold, manual identification of the vehicle may be used. In another implementation, one or more larger sets (e.g., supersets) of matching vehicle candidates are determined successively or concurrently by changing (e.g., loosening) the criteria for matching and additional attempts are made to identify the target vehicle from each of the one or more larger sets prior to resorting to manual identification.

In some implementations, the toll management system may be purposefully designed to identify a larger set of matching vehicle candidates during operation 720 to, for example, ensure that the expected lesser accuracy of vehicle identification through the first identifier does not erroneously result in exclusion of the target vehicle from the set of matching vehicle candidates. For example, if the first vehicle identifier is a license plate number, the license plate reading algorithm may be intentionally modified in, for example, two ways: (1) the matching criteria of the license plate reading algorithm may be loosened to enable the algorithm to generate a larger set of matching vehicle candidates and (2) the license plate reading algorithm may be "detuned" by lowering the read confidence threshold used to determine whether a read result is included in the matching candidate set. For instance, the license plate reading algorithm may be loosened to only require a matching vehicle candidate to match a subset or lesser number of the characters in the license plate number extracted for the target vehicle. Additionally or alternatively, the read confidence threshold may be lowered to enable previously suspected incorrect reads (i.e., partial or low confidence reads) to be included in the matching vehicle candidate set.

The two-tier identification process 700 provides greater identification accuracy over a single-tier/single identifier identification system by requiring that two vehicle identifiers be successfully matched for successful vehicle identification. Moreover, the process 700 may provide greater identification speed by limiting the matching of the second vehicle identifier to only those vehicle candidates having records that successfully match the first vehicle identifier. This can provide increased speed if, for example, the extracted second vehicle identifier is time-consuming to match against other such identifiers or if a large number of other such identifiers exists (e.g., millions of identifiers for millions of vehicles in a vehicle database).

In another implementation, two or more second identifiers are used to identify the target vehicle from among the set of matching vehicle candidates. Each of the second identifiers must match the same candidate vehicle to within a predetermined confidence level for successful vehicle identification. Alternatively, the degree of matching of each of the two or more second identifiers may be weighted and a combined equivalent matching score may be generated. If the combined equivalent matching score is above a predetermined threshold, the identification is deemed successful.

In one implementation, each second vehicle identifier is assigned a match confidence level number that ranges from 1 to 10, where 1 corresponds to no match and 10 corresponds to an exact match. Each vehicle identifier is also assigned a weight value from 1 to 10, with greater weight values being assigned to vehicle identifiers that are considered more accurate in uniquely identifying vehicles. If, for example, the second vehicle identifiers are a laser signature and license plate information, a weighting of 6 may be assigned to the laser signature and a greater weighting of 9 may be assigned to the license plate information. If a combined equivalent matching score of 100 is necessary for an identification to be deemed successful and the license plate information matches to a confidence level of 7 and the laser signature also matches to a confidence level of 7, the combined equivalent matching score would be 7*6+ 7*9=105 and the identification would be considered successful.

In another implementation, two or more first vehicle identifiers are used to identify vehicles in the set of matching vehicle candidates. Each of the first vehicle identifiers for a possible candidate vehicle must match the target vehicle to within a predetermined confidence level for the possible candidate vehicle to be included in the set of matching vehicle candidates. Alternatively, the degree of matching of each of the two or more first identifiers may be weighted and a combined equivalent matching score may be generated. If the combined equivalent matching score is above a predetermined threshold, the possible candidate vehicle is included in the set of matching vehicle candidates.

In another implementation, the second identifier is not used to uniquely identify the target vehicle from among the vehicles in the set of matching vehicle candidates. Rather, the second identifier is used to generate a new and smaller set of matching vehicle candidates as a subset of the set determined using the first identifier, and a third identifier is then used to uniquely identify the target vehicle from this subset of matching vehicle candidates. In yet another implementation, multiple vehicle identifiers are used to successively reduce the set of matching vehicle candidates and the target vehicle is uniquely identified from the successively reduced subset through use of one or more final vehicle identifiers. In yet another implementation, each of the multiple vehicle identifiers is used to generate its own set of matching vehicle candidates through matching and near matching techniques and the reduced set is the intersection of all of the determined sets. In yet another implementation, the reduced set is determined using a combination of the above-described techniques.

Figure 8:
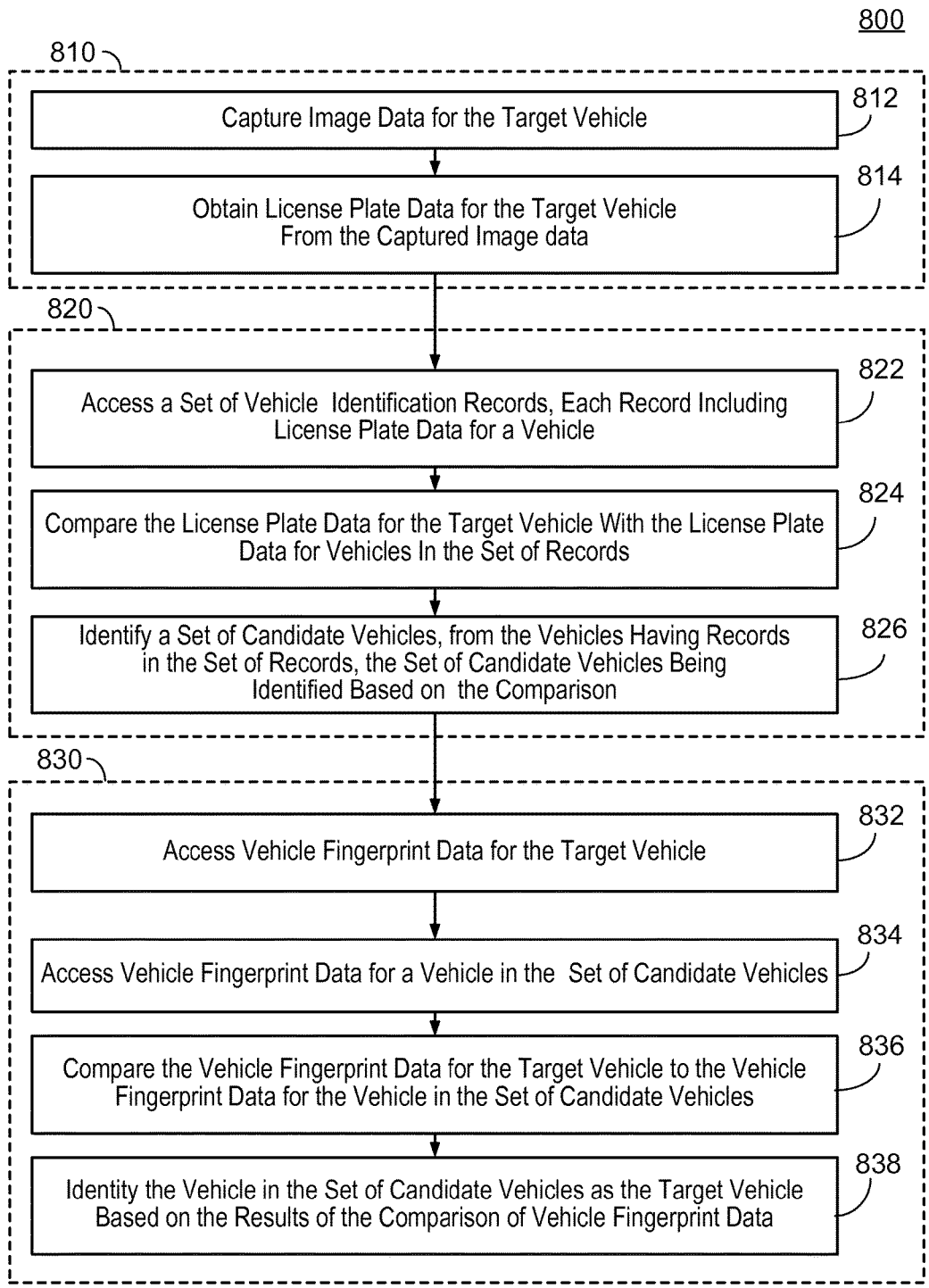
FIG. 8. is a flow chart of an implementation of an electronic toll management system related to vehicle identification.

FIG. 8 is a flow chart of an exemplary two-tier identification process 800 that may be implemented to increase the accuracy and/or automation of vehicle identification. Process 800 is an implementation of process 700 wherein the first identifier is a license plate number and the second identifier is a vehicle fingerprint. In particular, process 800 includes operations 810-830, and associated sub-operations, that correspond to and illustrate one possible implementation of operations 710-730, respectively. For convenience, particular components described with respect to FIG. 6 are referenced as performing the process 800. However, similar methodologies may be applied in other implementations where different components are used to define the structure of the system, or where the functionality is distributed differently among the components shown by FIG. 6.

The image acquisition module 624 captures image data for the target vehicle based on an interaction between the target vehicle and the toll facility 628 (block 812). In another implementation, the image acquisition module 624 additionally or alternatively captures sensor data including, for example, laser scanning and/or loop sensor data. The image processing module 625 obtains license plate data, including, for example, a complete or partial license plate number and state, for the target vehicle from the captured image data (block 814). Optionally, the image processing module 625 also may determine a vehicle fingerprint for the target vehicle from the image data. In another implementation, the image processing module 625 may determine other vehicle signature data, such as, for example, laser and/or inductive signature data, from the image data and/or sensor data.

The computer 612 stores the captured image data in the image database 614 and stores the extracted license plate data in the extracted identifier database 6181. If applicable, the toll management computer 612 also stores the extracted vehicle fingerprint and other signature data, such as, for example, the inductive signature and/or laser signature, in the extracted identifier database 6181.

The computer 612 accesses a set of vehicle identification records from the vehicle record database 6182 (block 822). Each of the vehicle identification records associates an owner/driver of a vehicle with vehicle identifier data. The computer 612 compares the extracted license plate data with the license plate data in the set of vehicle identification records (block 824) and identifies a set of candidate vehicles from the vehicles having records in the set of records (block 826). The comparison may be done using matching or near matching techniques.

The computer 612 accesses extracted vehicle fingerprint data for the target vehicle (block 832). If the vehicle fingerprint has not already been determined/extracted from the captured image data, the computer 612 calculates the vehicle fingerprint and stores the vehicle fingerprint in the extracted vehicle identifier database 6181.

The computer 612 accesses vehicle fingerprint data for a vehicle in the set of candidate vehicles by accessing the corresponding vehicle identification record (block 834) and compares the vehicle fingerprint data for the target vehicle to the vehicle fingerprint data for the candidate vehicle (block 836). The computer 612 identifies the candidate vehicle as the target vehicle based on the results of the comparison of the vehicle fingerprint data (block 838). If the vehicle fingerprint data matches within a predetermined confidence threshold, the candidate vehicle is deemed to be the target vehicle, and the owner/driver of the candidate vehicle is deemed to be the owner/driver of the target vehicle.

Figure 9A:
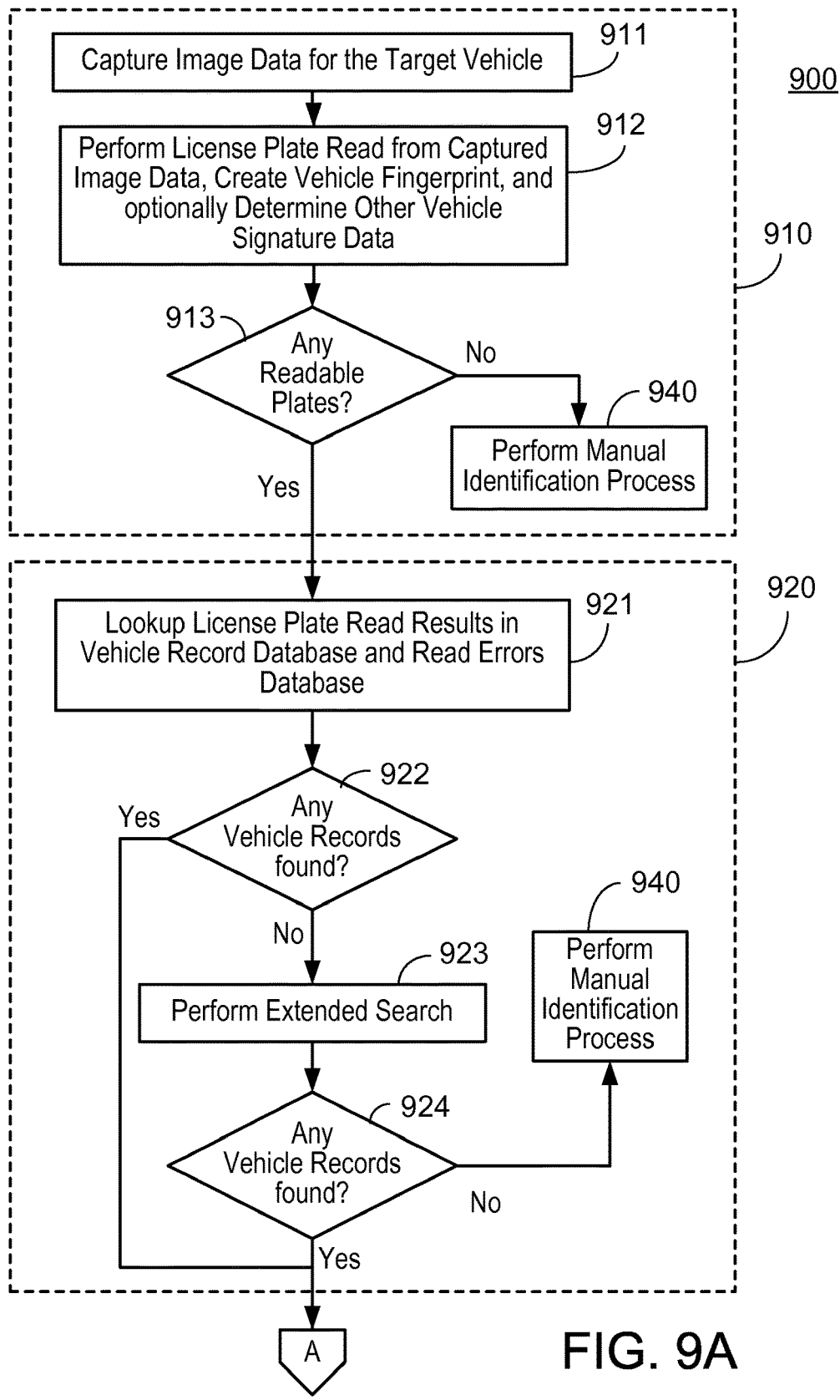
FIGS. 9A-9C are a flow chart of an implementation of an electronic toll management system related to vehicle identification.
Figure 9B:
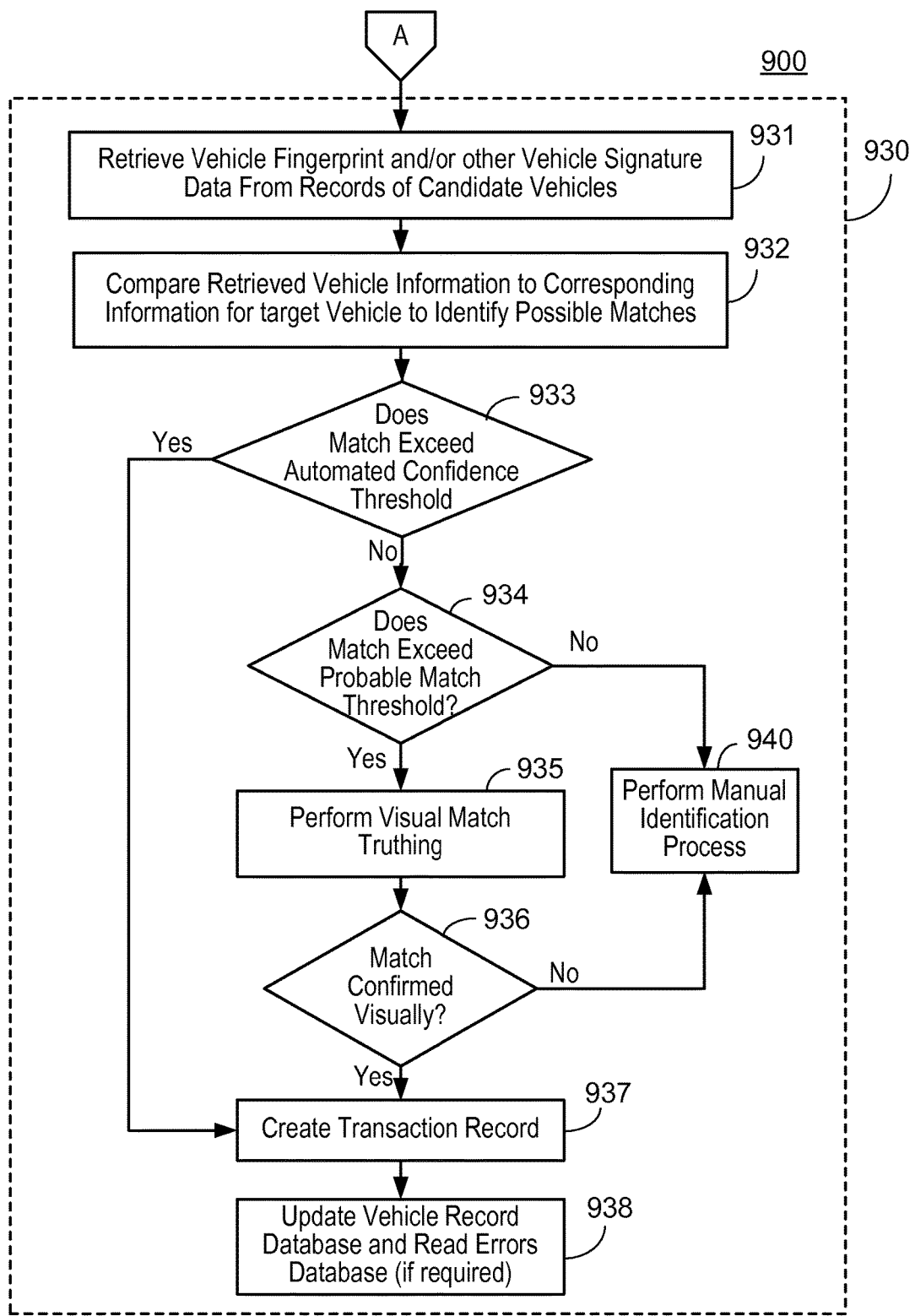
Figure 9C:
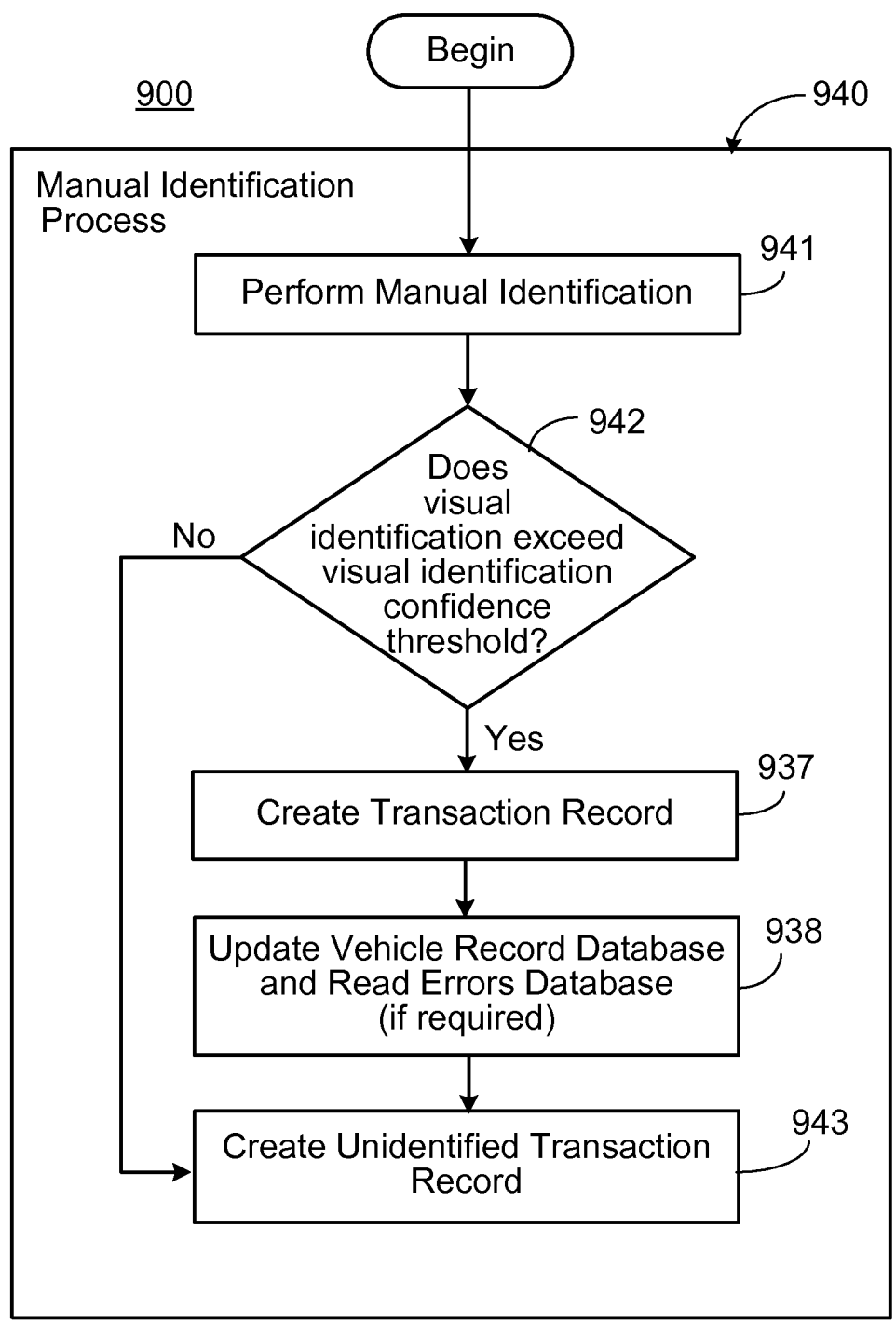

FIGS. 9A-9C are a flow chart of an exemplary two-tier identification process 900 that may be implemented to increase the accuracy of vehicle identification while minimizing the need for manual identification of vehicles. Process 900 is another implementation of process 700 wherein the first identifier is a license plate number and the second identifier is a vehicle fingerprint. In particular, process 900 includes operations 910-930, and associated sub-operations, that correspond to and illustrate one possible implementation of operations 710-730, respectively. For convenience, particular components described with respect to FIG. 6 are referenced as performing the process 800. However, similar methodologies may be applied in other implementations where different components are used to define the structure of the system, or where the functionality is distributed differently among the components shown by FIG. 6.

The image acquisition module 624 captures image and sensor data for the target vehicle (block 911). Roadside sensors, for example, trigger cameras that capture front and rear images of the target vehicle. Other sensors may capture additional data used for classification/identification of the vehicle. For example, a laser scan may be used to determine laser signature data including the height, width, length, axle count, and vehicle dimensional profile. Sensors also may be used to determine data related to the transaction between the target vehicle and the toll facility 628 such as, for example, the weight of the vehicle, the speed of the vehicle, and transponder data associated with the vehicle.

The image processing module 625 performs a license plate read on the captured image data, creates a vehicle fingerprint from the captured image data, and optionally determines other vehicle signature/classification data from the captured sensor data (block 912). For example, the image processing module 625 may use an automated license plate read algorithm to read one or more of the captured images. The license plate read algorithm may read the captured images, for example, in a prioritized order based on visibility of the plate and its location in the image. The license plate read results may include one or more of a license plate number, a license plate state, a license plate style, a read confidence score, a plate location in the image, and a plate size. The image processing module 625 also may apply a visual signature extraction algorithm to generate the vehicle fingerprint for the target vehicle. The visual signature extraction algorithm may be similar to that developed by JAI-PULNiX Inc. of San Jose, Calif. and described in U.S. Pat. No. 6,747,687. The computer 612 stores the captured images in the image database 614 and stores the license plate read results, vehicle fingerprint, and other vehicle signature/classification data in the extracted vehicle identifier database 6181.

The image processing module 625 determines whether the captured images have provided any partial or complete read results for the license plate number and state of the target vehicle (block 913). If no partial or complete read results were provided by the captured images, process 900 proceeds to operation 941 of the manual identification process 940.

If partial or complete read results for the license plate number and state of the target vehicle were provided by the captured images, computer 612 searches the vehicle record database 6182 and read errors database 6183 for the exact (either partial or complete) license plate number (as read by the license plate reader) (block 921).

The vehicle record database 6182 includes records for all vehicles previously recognized and potentially includes records for vehicles that are anticipated to be seen. The vehicle record database 6182 is typically populated through a registration process during which a driver/owner of a vehicle signs the vehicle up for automated toll payment handling. The driver/owner of a vehicle may sign a vehicle up for automated toll payment handling by driving the vehicle through a special registration lane in the toll facility 628 and providing a customer service representative at the facility 628 with his or her identity and other contact information. The image acquisition module 624 and the image processing module 625 capture the license plate number, the fingerprint, and other identification/classification data (e.g., the vehicle dimensions) of the user's vehicle while the vehicle traverses the facility 628. The vehicle and owner identification data is stored in a new vehicle identification record associated with the newly registered vehicle and owner/driver.

Alternatively, a driver/owner may register a vehicle for automatic toll payment handling by simply driving through the facility 628, without stopping. The computer 612 captures image data and sensor data for the vehicle and attempts to identify the driver/owner by reading the license plate image and looking up the read results in a database of an external system 634 (e.g., vehicle registration authorities). If an owner/driver is identified, the computer 612 bills the owner/driver. Once a billing relationship has been successfully setup, the computer 612 officially registers the vehicle, generates as necessary the vehicle fingerprint data and other signature/classification data from the captured image and sensor data, and stores these in a vehicle identification record associated with the identified owner/driver.

In another implementation, the computer 612 is configured to obtain greater accuracy in identifying an unregistered driver/owner by looking up the license plate read results in a database of a vehicle registration authority (or other external system) and requesting a corresponding vehicle identification number (VIN) from the vehicle registration authority (or other external system). The computer 612 uses the VIN to determine the make, model, and year of the vehicle. The make, model, and year of the vehicle may be used to determine the length, width, and height of the vehicle. The computer 612 may then determine a successful match of the target vehicle with a vehicle registered with the vehicle registration authority not only by comparing license plate data but also by comparing vehicle dimensions (as captured, for example, in a laser signature and/or an inductive signature). Typically, the computer 612 will consider a match successful if the license plate read results for the target vehicle match the license plate data for the vehicle registered with the vehicle registration authority to within a predetermined threshold and the vehicle dimensions of both vehicles match within a given tolerance.

The make, model, and year of a vehicle may be used, for example, to determine the length, width, and height of the vehicle by either accessing this information from a public database or from a $3^{rd}$ party database or, additionally or alternatively, by accessing the vehicle records database 6182 to retrieve the length, width, and height data from one or more vehicle identification records corresponding to vehicles having the same make, model, and year as the target vehicle. Given that a vehicle's dimensions may change if the vehicle has been modified, the length, width, and height accessed from the vehicle identification records may vary by vehicle. Accordingly, the computer 612 may need to statistically determine the appropriate dimensions for comparison by, for example, taking the average or median length, width, and height dimensions.

In one implementation, the computer 612 identifies a vehicle in part through use of an electronic signature that includes a laser signature and/or an inductive (i.e., magnetic) signature. When a vehicle transacts with the toll system, an electronic signature is captured for the vehicle. The image and measurements of the vehicle created by the laser (i.e., the laser signature) and/or the magnetic scan (i.e., the inductive signature) are compared against known dimensions and images of vehicles based on vehicle identification number (VIN) that were, for example, previously captured by the toll system or by an external system. By comparing the electronic signature image and dimensions to known dimensions of vehicles based on VIN, the search for a matching vehicle and associated VIN may be narrowed. If, for example, an LPR for the vehicle has a low confidence level, but the electronic signature of the vehicle has been captured, the toll system may access a database, as described above, of known dimensions and images for vehicles and associated VINs and cross reference the electronic signature dimensions and images against the database to identify the matching vehicle VIN or identify potential matching vehicle candidates/VINs. The read errors database 6183 links previous incorrect read results to correct vehicle identification records. For example, when automated vehicle identification fails but manual vehicle identification succeeds, the captured vehicle identification data (e.g., the license plate read result) that led to an "error" (i.e., an identification failure) by the automated system is stored in an error record in the read errors database 6183 that is linked to the vehicle identification record that was manually identified for the vehicle. Thus, when the same vehicle identification data is captured again at a later date, the computer 612 may successfully identify the vehicle automatically by accessing the error record in the read errors database 6183, which identifies the correct vehicle identification record for the vehicle, without requiring another manual identification of the vehicle.

An error record also may be generated and stored in the read errors database 6183 when automated identification of the vehicle succeeds based on a near match of an incorrect license plate read result. For example, if the license plate number "ABC123" is read as "ABC128" and the identified candidate match set is "ABC128," "ABC123," "ABG128" and "ABC128" which in turn yields the correct match of "ABC123," an error record may be created that automatically links a license plate read result of "ABC128" to the vehicle having the license plate number "ABC123."

The computer 612 determines whether any vehicle identification records correspond to the license plate read results for the target vehicle (block 922). If no vehicle identification records correspond to the read results, the computer 612 performs an extended search (block 923).

The computer 612 performs an extended search by changing or loosening the criteria for a successful match or detuning the license plate read algorithm. For example, the computer 612 may perform an extended search by one or more of the following: (1) comparing a subset of the license plate number read result with the characters of the license plate numbers stored in the vehicle record database 6182 (e.g., the last two characters of the license plate number may be omitted such that if the license plate number is "ABC123," any vehicles having license plate numbers "ABC1**" are deemed matching candidates, wherein "*" is a variable); (2) comparing a subset of the license plate number read result in reverse order with the characters of the license plate numbers stored in the vehicle record database 6182 in reverse order (e.g., the last two characters of the license plate number in reverse order may be omitted such that if the license plate number is "ABC123", which is "321CBA" in reverse order, any vehicles having license plate numbers in reverse order of "321C**" are deemed matching candidates, wherein "*" is a variable); and (3) other near match techniques including comparing modified versions of the license plate read result and license plate numbers stored in the vehicle record database 6182 in which some of either or both are substituted and/or removed to reduce the impact of misread characters. For example, if the OCR algorithm does not indicate a confidence level above a predetermined threshold in a read result of a character on the license plate, that character may be ignored. Additionally or alternatively, if the OCR algorithm indicates that a character on the license plate may be one of two possible different characters, both alternative characters may be used in the extended search.

The computer 612 determines whether any vehicle identification records correspond to the read results for the target vehicle after performing the extended search (block 924). If no vehicle identification records are found, process 900 proceeds to operation 941 of the manual identification process 940 (block 924).

Referring to FIG. 9B, if either the search or the extended search lead to identification of one or more vehicle identification records, the computer 612 retrieves vehicle fingerprint and optionally other vehicle signature/classification data from the identified vehicle identification records (block 931). The computer 612 compares the retrieved vehicle fingerprint and optionally other vehicle signature/classification data for each matching vehicle candidate with the corresponding data associated with the target vehicle to identify one or more possible matches (block 932). The vehicle fingerprint comparison may be performed with a comparison algorithm identical or similar to the one developed by JAI-PULNiX Inc. of San Jose, Calif. and described in U.S. Pat. No. 6,747,687.

A possible match may be defined, for example, as a vehicle fingerprint match with a confidence score greater than or equal to a predefined threshold and all or some of the other classification/signature data falling within tolerances defined for each data type. For example, if the fingerprint matching algorithm generates a score of 1 to 1000, where 1 is no match and 1000 is a perfect match, then a score greater than or equal to 900 may be required for a successful match. Additionally, if the other classification/signature data includes target vehicle height, width, and length, then the height, width, and length of the vehicle candidate may be required to be within plus or minus four inches of the extracted height, width, and length of the target vehicle for a successful match. One or more vehicle identification records may be deemed to correspond to vehicles that possibly match the target vehicle.

The computer 612 determines whether a possible match is sufficient to automatically identify the vehicle without human intervention by determining a combined equivalent matching score for each possible match and comparing the result to a predetermined automated confidence threshold (block 933). The computer 612 may, for example, determine a combined equivalent matching score for each possible match in a manner similar to that described previously with respect to process 700. Specifically, the computer 612 may assign a match confidence level number to the fingerprint matching and, optionally, to the classification/signature data matching, assign a weight to each data type, and calculate a combined equivalent matching score by combining the weighted match confidence level numbers. If the combined equivalent matching score exceeds a predetermined automated confidence threshold, the computer 612 deems the target vehicle successfully identified and process 900 proceeds to operation 937 for recording the transaction event between the identified vehicle and the facility 628. If more than one possible match exceeds the automated confidence threshold, the automated identification process may be faulty, and process 900 may optionally proceed (not shown) to operation 941 of the manual identification process 940.

If no possible match is deemed sufficient to automatically identify the vehicle without human intervention, the computer 612 determines whether one or more possible matches satisfy a lower probable match threshold (block 934). The computer 612 may, for example, determine that a possible match satisfies the probable match threshold if the combined equivalent matching score of the possible match is higher than the probable match threshold but lower than the automated confidence threshold.

If at least one possible match satisfies the probable match threshold, the computer 612 enables an operator to perform visual match truthing (block 935). Visual match truthing is a process in which the computer 612 presents one or more of the images of the target vehicle to the operator along with one or more of the reference images associated with the vehicle or vehicles that probably match the target vehicle. The operator quickly confirms or rejects each probable match with a simple yes or no indication by, for example, selecting the appropriate buttons on a user interface (block 936). The operator also may optionally provide a detailed explanation to support his or her response.

If the match exceeds the automated confidence threshold or is visually confirmed by the operator through visual match truthing, the computer 612 creates a record of the event (i.e., a record of the interaction between the positively identified target vehicle and the facility 628) as, for example, a billable or non-revenue transaction (block 937). If the match was confirmed through visual match truthing, the computer 612 may optionally update the read errors database 6183 to include the extracted vehicle identification data and a link that associates the extracted vehicle identification data with the correct vehicle identification record (block 938).

Referring also to FIG. 9C, the computer 612 is configured to enable an operator to manually identify the target vehicle (block 941) under the following circumstances: (1) the captured images of the target vehicle do not provide any partial or complete read results for the license plate number and state of the target vehicle (block 913); (2) no vehicle identification records are found that correspond to the license plate read results for the target vehicle after performing an extended search (block 924); (3) one or more possible matches are found but the confidence level in the one or more possible matches, as reflected by combined equivalent matching scores, fall below both the automated confidence threshold and the probable match threshold (block 934); and (4) one or more probable matches are found but a human operator rejects the one or more probable matches through visual match truthing (block 936).

The human operator attempts to manually identify the vehicle by (1) reading the license plate(s), and (2) observing vehicle details captured by the image acquisition module 624, and (3) comparing the license plate data and vehicle details with data available from the vehicle records database 6182, read errors database 6183, and/or databases of external systems 634. License plates read by a human operator may be confirmed by comparison with automated license plate reader results and/or multiple entry by multiple human operators.

The manual identification may be deemed successful if the manually collected data, weighed against definable criteria for a positive vehicle match, exceeds a predetermined identification confidence threshold (block 942). This determination may be done by the computer 612, the operator that provided the manual data, and/or a more qualified operator.

In one implementation, if a vehicle cannot be positively identified automatically and no near matches are found, one or more images of the vehicle are displayed to a first human reviewer. The first human reviewer inspects the images and manually specifies the license plate number that the first reviewer believes corresponds to the vehicle based on the images. Because this manual review by the first human reviewer is also subject to error (e.g., perceptual or typographical error), the license plate read by the first human reviewer is compared to an LPR database to determine whether the license plate number specified by the first human reviewer exists. Additionally, if a database record having fingerprint data corresponding to the license plate read exists, a fingerprint comparison also may be performed. If the first human reviewer read result does not match any known LPR result or vehicle, the one or more images of the vehicle may be displayed to a second human reviewer. The second human reviewer inspects the images and manually specifies the license plate number that the second human reviewer believes corresponds to the vehicle based on the images. If the read result by the second human reviewer is different than the read result by the first human reviewer, a read by a third human reviewer, who is typically a more qualified reviewer, may be necessary. In sum, the first human reviewer read is effectively a jumping off point to re-attempt an automated match. If the automated match still fails, multiple human reviewers must show agreement in reading the license plate for the read to be deemed accurate.

If the vehicle is not successfully identified, the computer 612 creates a record of the event as an unidentified or unassigned transaction (block 943). If the vehicle is successfully identified, the computer 612 creates a record of the event as, for example, a billable or non-revenue transaction (block 937). If the vehicle had never been previously identified, the computer 612 may create a new vehicle identification record for the vehicle and its owner/driver in the vehicle record database 6182. The computer 612 also may update the read errors database 6183 to include the extracted vehicle identification data and a link that associates the extracted vehicle identification data with the correct vehicle identification record (block 938).

Figure 10:
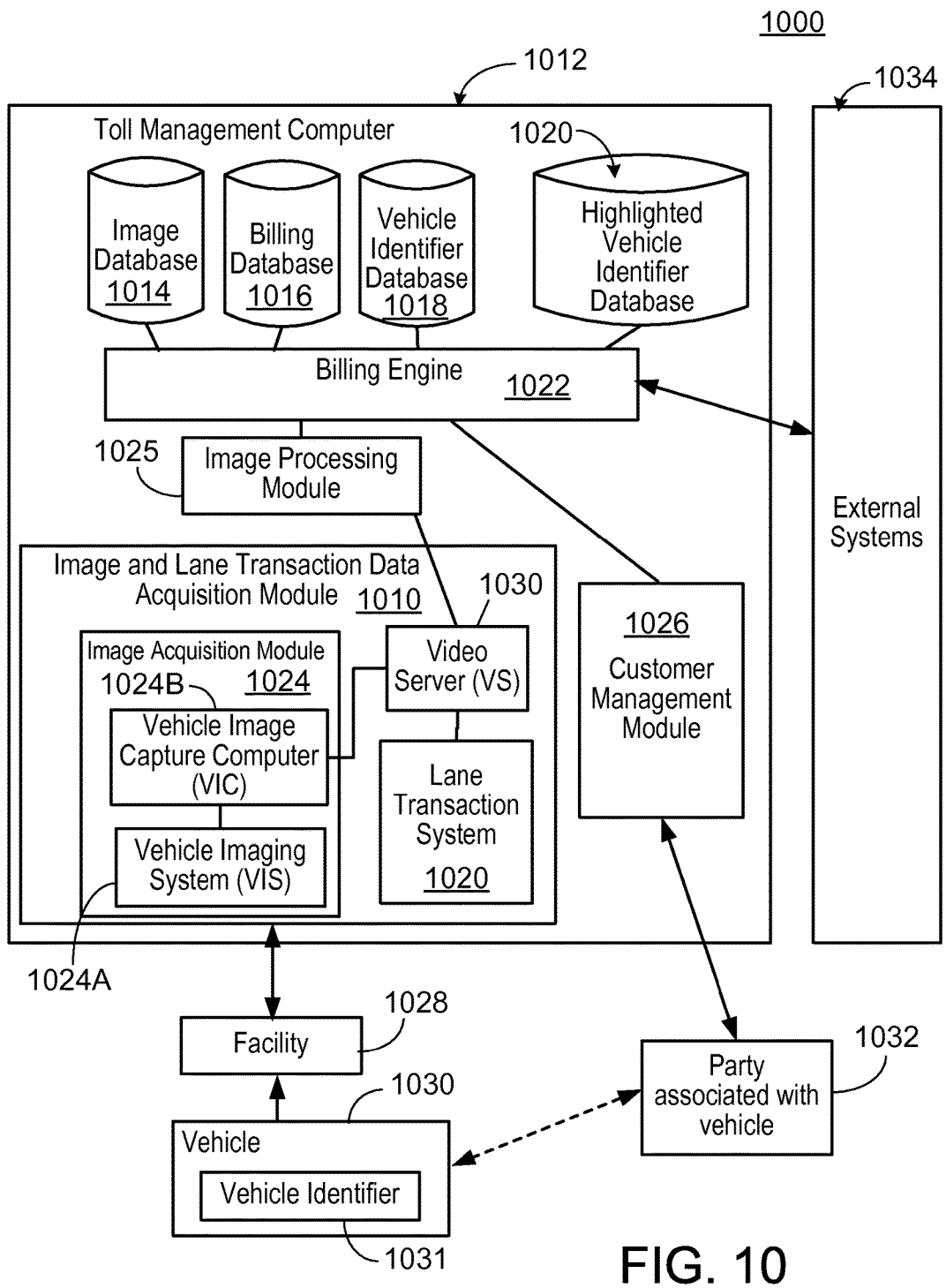
FIG. 10 is a block diagram of an implementation of an electronic toll management system.

FIG. 10 is a block diagram of an electronic toll management system 1000 that enables electronic handling of payment of tolls by vehicles passing a toll facility without requiring direct communication between the system's lane transaction system and the system's imaging system. The electronic toll management system 1000 is merely one implementation and various other implementations are either described below or are apparent to one of ordinary skill. The toll management system 1000 includes a toll management computer 1012. The toll management computer 1012 includes an image database 1014, a billing database 1016, a vehicle identification database 1018, a highlighted vehicle identifier database 1020, a billing engine 1022, an image and lane transaction data acquisition module (ILDM) 1010, an image processing module 1025, and a customer management module 1026. The toll management computer 1012 communicates with or is integrated with a toll facility 1028, which interacts with a vehicle 1030 and a party associated with the vehicle 1032. The toll management computer 1012 also communicates with external systems 1034.

Examples of each element within the toll management system 1000 of FIG. 10 are described broadly above with respect to FIG. 1. In particular, the toll management computer 1012, the image database 1014, the billing database 1016, the vehicle identification database 1018, the highlighted vehicle identifier database 1020, the billing engine 1022, the image processing module 1025, the customer management module 1026, and the toll facility 1028 typically have attributes comparable to and illustrate one possible implementation of the toll management computer 12, the image database 14, the billing database 16, the vehicle identification database 18, the highlighted vehicle identifier database 20, the billing engine 22, the image processing module 25, the customer management module 26, and the toll facility 28 of FIG. 1, respectively. Likewise, the vehicle 1030, the party associated with the vehicle 1032, and the external systems 1034 typically have attributes comparable to the vehicle 30, the party associated with the vehicle 32, and the external systems 34 of FIG. 1.

The ILDM 1010 includes a lane transaction system 1020, an image acquisition module 1024, and a video server 1030. The image acquisition module 1024 typically has attributes comparable to and illustrates one possible implementation of the image acquisition module 24 of FIG. 1. The image acquisition module 1024 includes a vehicle imaging system (VIS) 1024A and a vehicle image capture computer (VIC) 1024B.

The toll management system 1000 may be configured to automatically identify only transponderless vehicles that are deemed "violators". A violator is a vehicle that does not provide for payment for transacting with the toll facility 1028 at the time of the transaction. For example, a violator may be a transponderless vehicle that runs through a toll facility 1028 without providing for payment of the toll fare by, for example, stopping to pay cash at the toll facility or by having an active financial account that is accessible by the toll facility and that may be debited by the toll facility. The toll management system 1000 is, nevertheless, still distinct from a conventional toll system in that the lane transaction system 1020 and the image acquisition module 1024 need not directly communicate with each other to enable identification of violators. Rather, the video server 1030 is configured to match each violation transaction identified by the lane transaction system 1020 with a violation image captured by the image acquisition module 1024 through use of the matching process described in detail below.

The lane transaction system 1020 is a system that includes one or more computers and sensors configured to capture transaction related data for each vehicle 1030 that passes through the toll facility 1028. The transaction related data includes any data relevant to the transaction between the vehicle 1030 and the toll facility 1028, such as, for example, the identifier for the lane used by the vehicle, the type of transaction, the time of the transaction (e.g., the transaction time stamp), vehicle classification data (e.g. the number of axles of the vehicle), the transponder information, if applicable, of the vehicle, the fare charged, and an indication of whether or not the vehicle has committed a violation.

The lane transaction system 1020 is configured to periodically send a lane activity report or file to the video server 1030. The lane activity report includes a chronologically sequential list of data entries or transaction entries. Each transaction entry includes transaction related data for a transaction between the facility 1028 and a single vehicle. In one implementation, the lane transaction system 1020 sends the lane activity report to the video server once a day or multiple times a day as a flat file that is attached to an e-mail.

FIG. 11 shows an extract of an exemplary lane activity report 1100 generated by lane transaction system 1020. The extract 1100 includes a group of ten chronologically sequential lane transaction entries, each entry corresponding to a vehicle transaction with the toll facility 1028. The first and last entries (i.e., entries 1110 and 1130) in the group of transaction entries are "landmark transaction" entries. Landmark transactions and landmark transaction entries are discussed in further detail below.

Entry 1110 is an exemplary entry corresponding to a successful transaction (i.e., a non-violating transaction). The entry 1110 includes various data fields that include transaction-related data. The data fields include: (1) a transaction type data field 1110a, which indicates the disposition of a transaction or a lane action (e.g., a violation transaction, a paid transaction, and an unpaid transaction that is, nevertheless, not deemed a violating transaction because, for example, the vehicle is a government car); (2) a location data field 1110b, which identifies the location where the lane transaction took place (e.g., an identifying number corresponding to a particular toll plaza where the toll transaction took place); (3) a transaction date data field 1110c, which identifies the date at which the transaction took place; (4) a time data field 1110d, which identifies the time at which the transaction took place; (5) a vehicle classification data field 1110e, which identifies the class of the vehicle, number of axles, and/or dimensions of the vehicle; (6) a fare due data field 1110f, which indicates the amount that was charged by the toll facility for the transaction; (7) a fare paid data field 1110g, which indicates the amount paid by the vehicle for transacting with the toll facility; (8) a payment method data field 1110h, which indicates the method used by the vehicle to pay the fare (e.g., cash payment, credit card payment, and transponder payment); (9) an account issuer data field 1110i, which indicates the entity that issued the financial account from which the fare may be withdrawn (e.g., a bank account issuer such as "Bank of America", a credit card issuer such as "Visa", a transponder account issuer such as a "Virginia" transponder issuing authority); and (10) an account identifier field 1110j, which identifies the financial account from which the fare may be withdrawn (e.g., a credit card number or a transponder number). Entry 1120 is an exemplary entry corresponding to a violation transaction.

Referring back to FIG. 10, the VIS 1024A of the image acquisition module 1024 is a system that includes both computers and sensors configured to capture image data and optionally sensor data for each vehicle that passes through or transacts with the toll facility 1028. The VIS 1024A may include any and/or all of the sensors and image capture devices described previously with respect to the image acquisition modules 24, 624. The VIS 1024A is configured to send captured vehicle image and sensor data to the VIC 1024B. The vehicle image and sensor data typically includes time stamps (time and date information) indicating when the data was captured by the VIS 1024A.

In one implementation, the VIS 1024A includes cameras, light sensors, and lasers. The light sensors continuously monitor ambient lighting and update the cameras multiple times every second to ensure that the cameras optimize picture quality by regularly adjusting as necessary to any changes in ambient light. The lasers detect vehicles as they pass through each lane and trigger the cameras as the vehicles exit the lane. Each lane may have one camera that takes one or more images of the rear of the vehicle as the vehicle passes.

The VIC 1024B is a computer system configured to receive vehicle image data and, optionally, sensor data from the VIS 1024A, to compress the images and sensor data to minimize storage needs, and to store the image and sensor data in image/sensor files having associated data. The data may include, for example, a unique image/sensor file identifier, a time stamp indicating when the image and sensor data was captured and a location indicating where the image and sensor data was captured (e.g., a lane identifier).

After receiving image and sensor data for a passing vehicle and storing it in an image/sensor file, the VIC 1024B may send a message to the video server 1030 informing it that the file is available for delivery. The VIC 1024B may send the captured image/sensor file to the video server 1030 in response to a request received from the video server 1030. After the video server 1030 indicates that it has safely stored the requested image/sensor file, the VIC 1024B may optionally delete the image/sensor file from its data stores.

Figure 12:
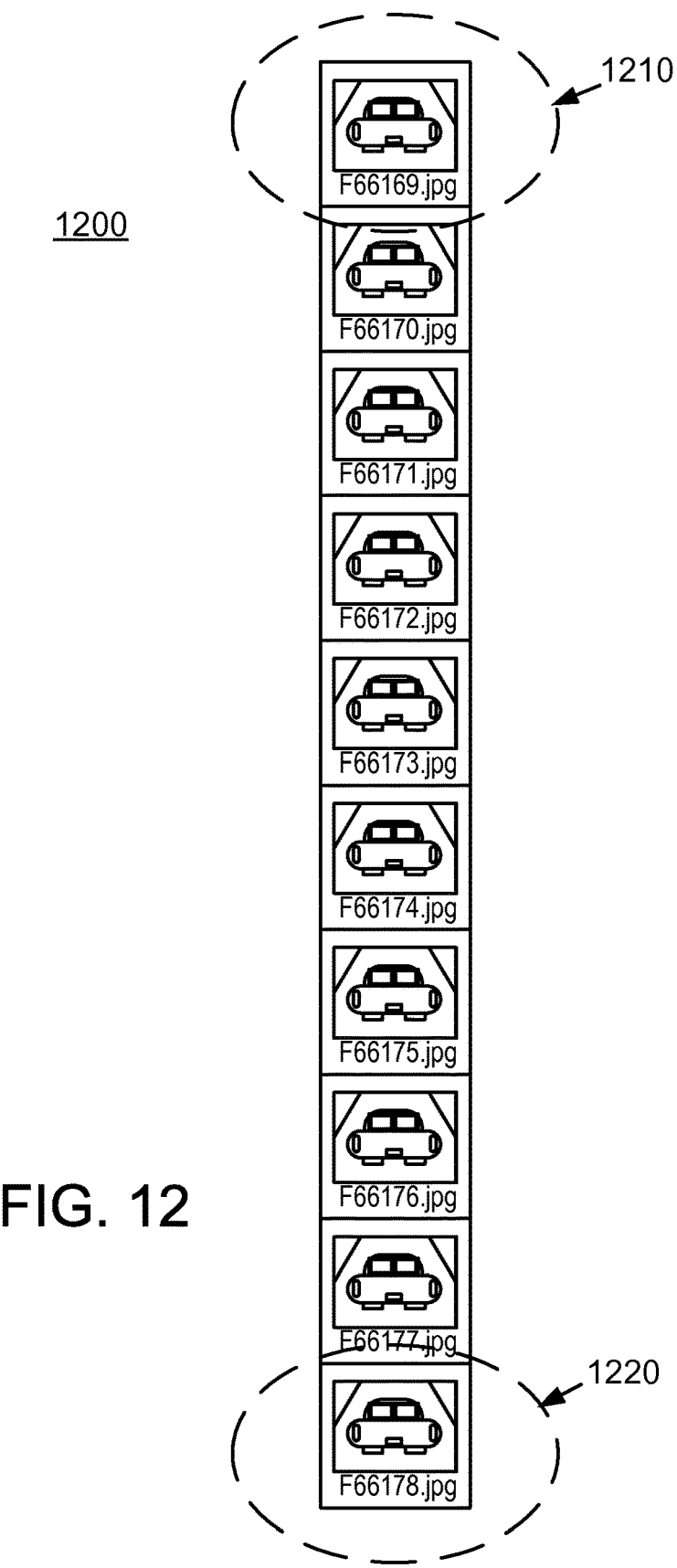
FIG. 12 is an illustration of a group of image/sensor files.

FIG. 12 shows an exemplary set of image/sensor files 1200 containing image data received by the video server 1030 from the VIC 1024B. The set of image/sensor files 1200 includes ten files, each of which is represented in FIG. 12 as a thumbnail of the stored image with an associated unique file name. Each image/sensor file of the set of image/sensor files 1200 corresponds to a single lane transaction entry of the lane activity report extract 1100. For example, the image/sensor file 1210 corresponds to the landmark transaction entry 1110, and the image/sensor file 1220 corresponds to the landmark transaction entry 1130.

The VIC 1024B also is configured both to send messages to and to receive messages from, the video server 1030. In particular, the VIC 1024B may send status messages to the video server 1030 that indicate the status of the VIC 1024B and/or the various components of the VIS 1024A. The VIC 1024B may receive management messages from the video server 1030 that enable administrators interacting with the video server 1030 to configure or otherwise control the operation of the VIC 1024B. The VIC 1024B also may receive clock synchronization messages from the video server 1030 that instruct the VIC 1024B to reset its internal clock.

As described in more detail below, the synchronization or matching of image/sensor data with transaction entries is based in part on the time entries associated with the image/sensor data and the transaction entries. Accordingly, synchronization of the internal clock of the VIC 1024B, which assigns a time to the image/sensor data, with the internal clock of the lane transaction system 1020, which assigns a time to each transaction is desirable. By periodically resetting the internal clock of the VIC 1024B to coincide with the setting of a network clock (not shown) known to be synchronized with the internal clock of the lane transaction system 1020, the video server 1030 is able to minimize the clock offsets between the image time stamps generated by the VIC 1024B and the transaction time stamps generated by the lane transaction system 1020.

The video server 1030 is typically a computer system that is configured to receive a lane activity report from the lane transaction system 1020 and to receive image/sensor files from the VIC 1024B of the image acquisition module 1024. In another implementation, the video server 1030 is configured to receive lane activity reports from more than one lane transaction system and/or receive image/sensor files from more than one VIC.

The video server 1030 is typically configured to process the lane activity report by parsing it and assigning unique transaction identifiers to each transaction entry in the report. After the transaction identifiers have been assigned, the video server 1030 typically synchronizes or matches an image/sensor file with each transaction entry in the lane activity report.

Figure 13:
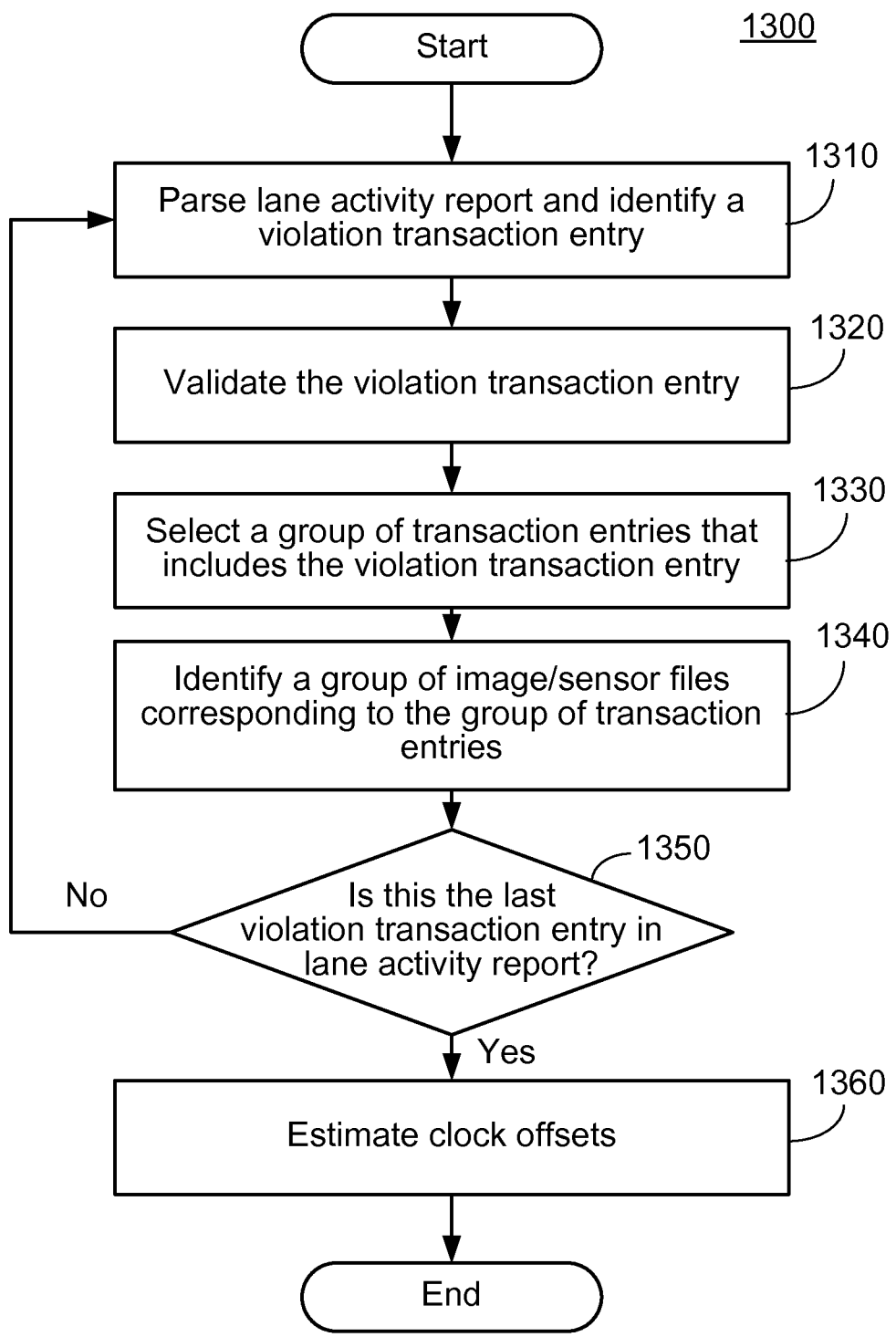
FIG. 13 is a flow chart of an implementation of an electronic toll management system related to selecting groups of transaction entries and corresponding groups of image/sensor files.
Figure 14:
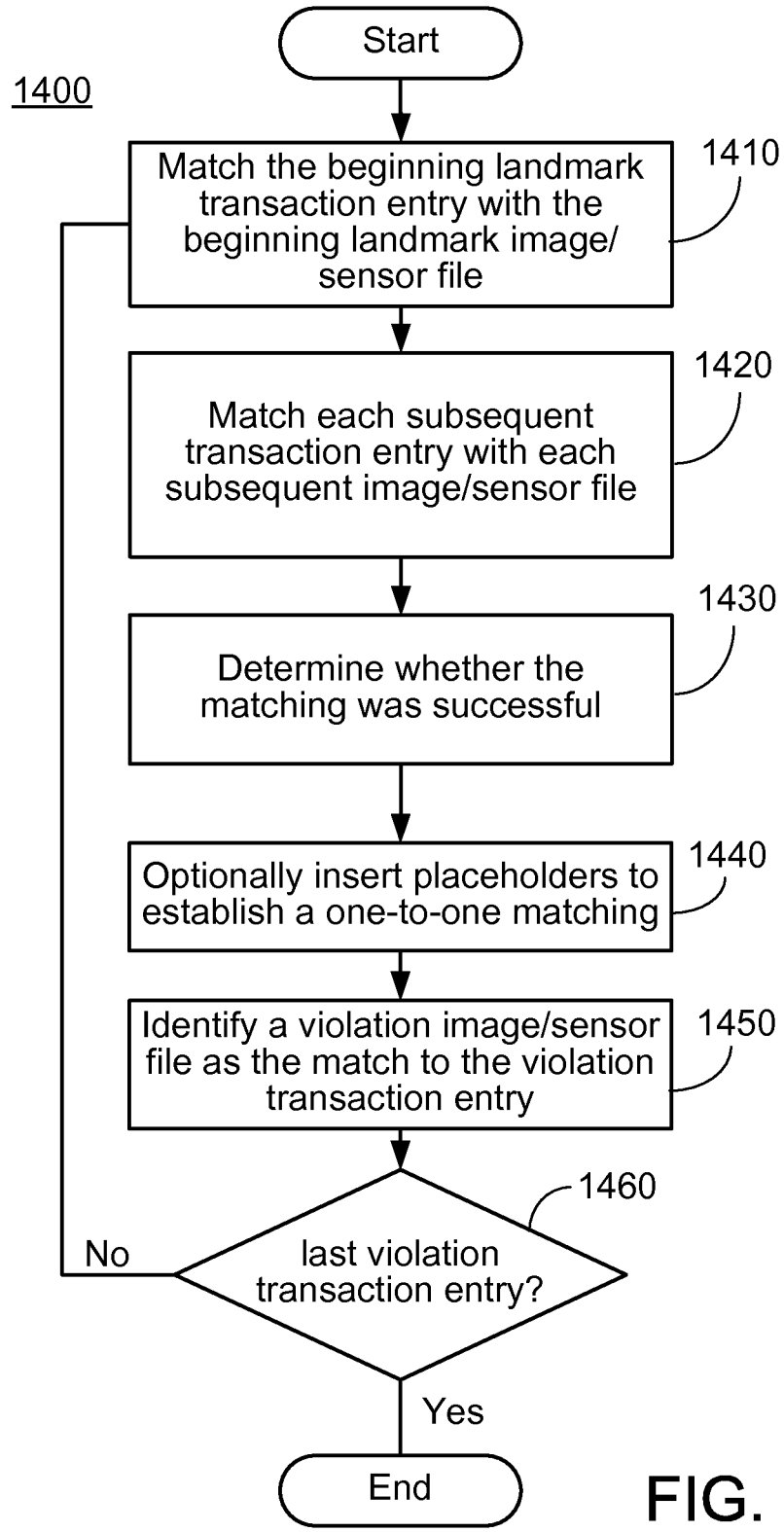
FIG. 14 is a flow chart of an implementation of an electronic toll management system related to identifying an image/sensor file for each violation transaction entry.

FIGS. 13 and 14 illustrate operations performed by, for example, the video server 1030 to match transaction entries with image/sensor files. In particular, FIG. 13 illustrates a process 1300 for selecting groups of transaction entries and corresponding groups of image/sensor files for each violation transaction entry, and FIG. 14 illustrates a process 1400 for identifying a violation image/sensor file for each violation transaction entry.

Referring to FIG. 13, the video server 1030 identifies the transaction entries in the lane activity report that correspond to violation transactions ("violation transaction entries") (1310). The video server 1030 may identify the violation transaction entries as the transaction entries in the lane activity report that meet a predetermined set of criteria.

For example, a transaction entry in the lane activity report may be identified as a violation transaction entry if it satisfies a set of validation criteria. Notably, multiple sets of different criteria may be concurrently used to define a violation transaction entry.

After one or more violation transaction entries have been identified based on the set(s) of criteria, the video server 1030 may validate each identified violation transaction entry by (1) reviewing the purported violation transaction entry for anomalies and (2) by examining for anomalies the transaction entries corresponding to transactions that occurred within a configurable window of time preceding and/or following the purported violation transaction (1320). If any anomalies are found, the purported violation transaction entry may not be valid (i.e., it may be an error).

The video server 1030 may review all or a subset of the data fields of a purported violation transaction entry to determine, for example, whether a lane of the lane transaction system 1020 may be unhealthy and, therefore, may be deeming non-violating vehicles as violators. An unhealthy lane may, for example, generate conflicting data regarding a transaction such as, for example, a detection of a different number of axles during vehicle entry into the lane as that detected during vehicle exit from the lane, or as that indicated by transponder information. Nevertheless, in another implementation, violation transaction entries may be identified simply as transaction entries having violation disposition data fields 1120$n$ set to indicate a violation. If such anomalies are found, the purported violation transaction is likely an error, and the video server 1030 may reject the purported violation transaction as not valid.

The video server 1030 also may examine for anomalies the transaction entries corresponding to transactions that occurred within a time window (e.g., 5 minutes) preceding the purported violation transaction. For example, one of the preceding transaction entries may indicate that an early read occurred within the five minutes immediately prior to the purported violation. The video server 1030 may reject the purported violation transaction entry as not valid because an early read indicates that a transponder read may have been misassociated with a vehicle.

The video server 1030 also may examine for anomalies the transaction entries corresponding to transactions that occurred within a time window (e.g., 5 minutes) following the purported violation transaction. For example, one of the following transaction entries may indicate that a lane has reset itself so as to minimize cascades of anomalies.

After successfully validating the one or more violation transaction entries, the video server 1030 selects a group of chronologically sequential transaction entries for each validated violation transaction entry (1330). The selected group of transaction entries includes transaction entries corresponding to transactions that both precede and follow the violation transaction, and thereby, enables the violation transaction to be placed in its proper context. Through a matching process discussed later, the selected group of transaction entries may be used to achieve greater accuracy in identifying the image/sensor file that corresponds to or matches the validated violation transaction entry.

The group of transaction entries, for a validated violation transaction entry, may be selected as all transaction entries starting from the first transaction entry corresponding to a "landmark transaction" (i.e., a landmark transaction entry) that occurred before the validated violation transaction entry and ending at the first landmark transaction entry that occurred after the validated violation transaction entry. Accordingly, the group of transaction entries selected for each validated violation transaction entry typically includes the validated violation transaction entry, two landmark transaction entries, and one or more other transaction entries, where the two landmark transaction entries surround or bracket the validated violation transaction entry and the one or more other transaction entries in the group. FIG. 11 shows an exemplary group of transaction entries 1100 that includes two landmark transaction entries 1110 and 1130 that bracket or surround the rest of the transaction entries in the group, including the violation transaction entry 1120.

A landmark transaction is a transaction corresponding to a transaction entry that is easily matched or synchronized with an associated image/sensor file. A landmark transaction, for example, may be a transaction that follows a predetermined amount of time during which no transaction occurs (i.e., a "dead" time). For example, if no transaction occurs between a vehicle and the toll facility 1028 for 10 seconds, the transaction that occurs right after the 10 second interval is a landmark transaction because its transaction entry is easily matched with its corresponding image/sensor file. The landmark transaction is easily matched with its corresponding image/sensor file because both are easily identifiable as the first transaction entry and image/sensor file to be captured following a lengthy 10 second "dead" time. Similarly, the transaction that precedes the lengthy 10 second dead time is also a landmark transaction because its transaction entry and image/sensor file are also similarly easily identifiable as the last transaction entry and image/sensor file preceding the lengthy 10 second "dead" time. Referring to FIG. 11, entry 1110 may be, for example, a landmark transaction because it follows 10 second "dead" time, and entry 1130 may be, for example, a landmark transaction because it precedes a 10 second "dead" time.

Other examples of landmark transactions include transactions that involve visually unique vehicles or vehicles that have been positively identified. For example, a transaction involving a multi-axle vehicle (i.e., a vehicle having 3 or more axles), such as a truck, may be a landmark transaction if the majority of vehicles passing through the toll facility are cars having only 2 axles. By searching for an image of a truck from among all of the car images, the image/sensor file having an image that matches the multi-axle transaction entry is easily found. Similarly, a transaction involving a vehicle having a transponder also may be a landmark transaction if the transponder information captured in the transaction entry may be used to identify the vehicle's license plate number. If the vehicle's license plate number is successfully identified from the transponder data, the corresponding image and, therefore, image/sensor file may then be positively identified through use of LPR.

Notably, the video server 1030 may not designate a transaction as a landmark transaction if it is preceded by or followed by a violation transaction or another unusual type of transaction (e.g. a lane reset or any transaction that does not meet validation criteria). If two or more validated violation transaction entries occur within a time window defined by a single pair of landmark transaction entries, the video server 1030 may use the same group of transaction entries for matching purposes for both of the validated violation transaction entries.

In some implementations, the video server 1030 may limit the size of the groups of transaction entries by imposing configurable limits on the number of transaction entries and/or the maximum time interval preceding and/or following the validated violation transaction entry. For example, the number of transaction entries may be limited to twenty or one hundred transactions and/or the maximum time interval following the validated violation transaction entry may be limited to one minute or five minutes. If only one landmark transaction occurs within this configurable limit or time interval, then only that landmark transaction is used in the matching process. If no landmark transaction occurs within this configurable limit or time interval, then no landmark transactions are used in the matching process. If no landmark transactions are used in the matching process, then the matching process is accomplished manually by looking for time patterns or identifying info in the images to make a positive associated with the corresponding transactions (e.g., transponder information in the transaction entries may be matched with expected license plate numbers as shown in the images).

In one implementation, the group of transaction entries for a validated violation transaction entry includes all entries corresponding to transactions immediately following the last 6-10 second gap preceding the violation transaction and all entries corresponding to transactions that occurred up until one minute after the violation transaction. In this implementation, only the beginning transaction entry in the group is a landmark transaction entry (i.e., the entry corresponding to the first transaction after the 6-10 second gap).

After a group of transaction entries has been identified for each validated violation transaction entry, the video server 1030 uses the landmark transaction entries of each group of transaction entries to identify corresponding groups of chronologically sequential image/sensor files (1340 and 1350). The group of image/sensor files for a validated violation transaction typically includes all image/sensor files having time stamps between that of the image/sensor file having a landmark transaction image preceding the violation transaction (i.e., the image corresponding to the landmark transaction preceding the violation transaction) and that of the image/sensor file having a landmark transaction image following the violation transaction (i.e., the image corresponding to the landmark transaction following the violation transaction). Accordingly, the group of image/sensor files for a validated violation transaction is typically a group of image/sensor files surrounded by or bracketed by two image/sensor files having landmark transaction images. Absent any errors, the image/sensor file group includes an image/sensor file having an image corresponding to the validated violation transaction (i.e., a "violation image/sensor file").

In the previously described implementation having only one landmark transaction entry, the corresponding group of image/sensor files may be determined as all image/sensor files having time stamps that fall within the window of time between the time stamp of the image/sensor file corresponding to the landmark transaction entry and a time that is approximately one minute after the time stamp of the image/sensor file corresponding to the landmark transaction entry. The video server 1030 may adjust the landmark transaction "time" and/or the one minute duration to take into account any clock drift or offset (see below) between the clock of the image acquisition module 1024 and the clock of the lane transaction system 1020.

As an example of a result of operation 1340, FIGS. 11 and 12 show a group of transaction entries 1100 and a corresponding group of image/sensor files 1200, respectively. The group of transaction entries 1100 include transaction entries bracketed by, that is, surrounded by, landmark transaction entries 1110 and 1130. Similarly, the group of image/sensor files 1200 include image/sensor files bracketed by or surrounded by image/sensor files 1210 and 1220 having landmark transaction images corresponding to the landmark transaction entries 1110 and 1130, respectively.

After all pairs of groups have been identified, the video server 1030 may optionally estimate the clock offsets between the internal clock of the lane transaction system 1020 and the internal clock of the image acquisition module 1024 for each group pairing (1360). The video server 1030 may estimate the clock offset for a group pairing, for example, as the difference between the time stamp of a landmark transaction entry and the time stamp of the image/sensor file having a corresponding landmark transaction image. If the groups each include two landmark transactions, the clock offset for the group pairing may be determined, for example, by calculating the average of the differences between the image acquisition module 1024 and lane transaction system 1020 time stamps corresponding to each landmark transaction. Determining the clock offsets is useful for determining a one-to-one matching between the lane transaction entries and the image/sensor files as described next. A clock drift also may be calculated by estimating the rate of change in clock offsets based on differences in landmark transaction/image times at either end of a significant interval (e.g., hours, rather than the minute or so within a single group).

Referring to FIG. 14, once the groups of image/sensor files have been identified, the video server 1030 may be configured to identify a violation image/sensor file corresponding to each validated violation transaction through a matching process 1400. The matching process 1400 identifies the violation image/sensor file by establishing a one-to-one correspondence between each image/sensor file in an image/sensor file group and each transaction entry in a corresponding group of transaction entries. Notably, by using information contained in transaction entries both before and after the violation transaction entry in the matching process, the process 1400 may be able to identify a violation image/sensor file that matches the violation transaction entry with greater accuracy than is possible through simple time stamp comparisons (i.e., through simply designating an image/sensor file as a violation image/sensor file if its image time stamp is the same or substantially the same as the time stamp of the violation transaction entry).

Specifically, as shown in FIG. 14, a process to identify a violation image/sensor file for a validated violation transaction entry typically begins by matching the beginning landmark transaction entry in the group of transaction entries with the beginning landmark image/sensor file in the corresponding group of image/sensor files (1410). For example, if the group of landmark transaction entries is the group 1100 of ten entries shown in FIG. 11 and the group of image/sensor files is the group 1200 of ten files shown in FIG. 12, the landmark transaction entry 1110 would be matched with the landmark image/sensor file 1210.

Using the beginning landmark transaction as a reference point, the video server 1030 establishes a one-to-one correspondence between each subsequent transaction entry in the group of landmark transactions and each subsequent image/sensor file in the corresponding group of image/sensor files (1420). For example, the video server 1030 matches the second landmark transaction entry (i.e., the first entry recorded after the landmark transaction entry) in the group 1100 with the second image/sensor file (i.e, the first image/sensor file having data captured after the landmark image/sensor file) in the group 1200, the third landmark transaction entry in the group 1100 with the third image/sensor file in the group 1200, and so forth.

Figure 15:
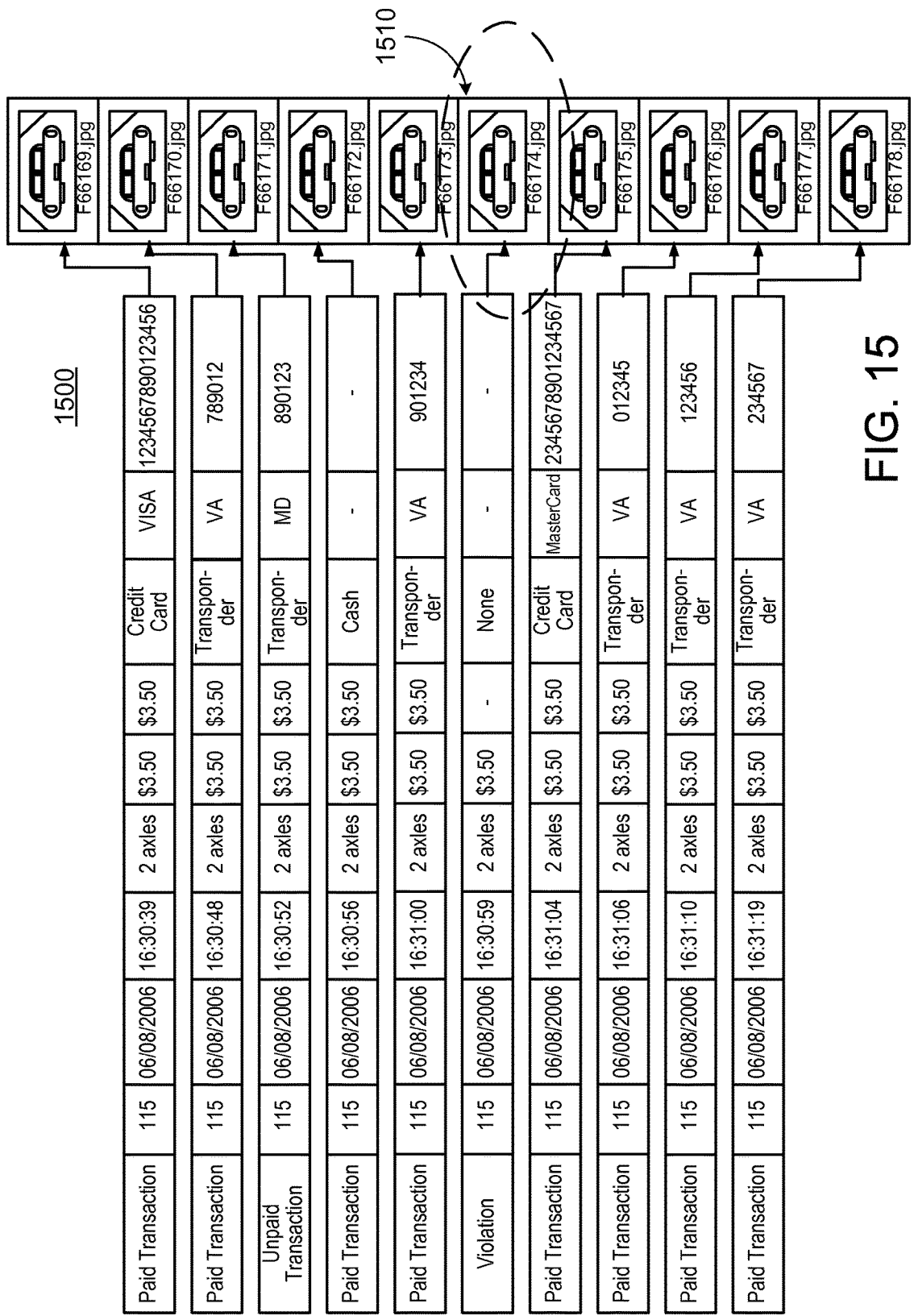
FIG. 15 is an illustration of the group of transaction entries of FIG. 11 matched on a one-to-one basis with the group of sensor/files of FIG. 12.

If the matching process is successful, the result of the matching process is a one-to-one match between each transaction entry in the group of transaction entries and each image/sensor file in the group of images/sensor files. FIG. 15 shows an example of a matched group pairing 1600. A matched pair is illustrated in the figure by the lines connecting or matching a transaction entry with an image/sensor file.

As each transaction entry is matched to an image/sensor file, the video server 1030 updates a data record associated with the violation transaction to indicate a match between the given transaction entry and the image/sensor file. If the video server 1030 identifies one or more anomalous transaction entries and/or image/sensor files in the groups, the video server 1030 may update the data record to flag the corresponding entries as anomalous and to indicate why the entries or image/sensor files have been deemed anomalous.

The video server 1030 may be configured to confirm whether the matching process was successful (1430) by determining, for example, whether the following criteria are met: (1) the number of transaction entries in the group of transaction entries is equal to the number of image/sensor files in the group of image/sensor files; (2) each transaction entry in the group of transaction entries is matched with each image/sensor file in the corresponding group of image/sensor files; (3) the offset-adjusted time stamp for each transaction entry falls within an expected deviation from the time stamp of the corresponding matched image/sensor file; and (4) the interval of time between transactions as reflected by the time stamps of the transaction entries is within an expected deviation from the interval of time between transactions as reflected by the time stamps of the image/sensor files. Each of these is explained below.

The video server 1030 may count the number of image/sensor files and landmark transaction entries in the groups to determine that they are equal in number. If the video server 1030 determines that the number of image/sensor files is different than the number of transaction entries, the video server 1030 may insert one or more transaction entry placeholders and/or image/sensor file placeholders as necessary to equalize the number of transaction entries with the number of image/sensor files (1440). The video server 1030 may insert the placeholders in the groups at a location in time that minimizes deviation between the expected intervals of time between transactions and the expected differences between the image/sensor file time stamps and the transaction entry time stamps. The video server also may determine which image likely does not correspond to a lane transaction by using LPR to obtain license plate data for the vehicles in the images. An image with no license plate present may be assigned a transaction placeholder, rather than associated with a lane transaction. The number of transaction entries may differ from the number of image/sensor files due to, for example, a false triggering of the cameras of the VIS 1024A. Such a false triggering may cause an additional image/sensor file to be created that has an image, for example, of a lane with no vehicle present. If the video server 1030 deems it necessary to add placeholders to the groups associated with a violation transaction, the video server 1030 typically modifies the data record associated with the violation to indicate that placeholders were inserted and to identify the inserted placeholders.

The video server 1030 also may determine the deviation between the time stamps of each transaction entry and the time stamps of each corresponding image/sensor file. Because the internal clocks of the lane transaction system 1020 and the image acquisition module 1024 are independent, the clocks, and thus the time stamps generated by the clocks, often indicate different times (e.g., due to a difference in clock resolution, a difference in clock drift, and/or a fixed difference in clock setting). The difference in time between the clocks may be represented as a fixed offset between the clocks and a variable drift. In one implementation, the video server 1030 may estimate the fixed offset, for example, based on the difference in time stamps of the landmark transaction entry and the corresponding landmark image/sensor file. After estimating the offset between the two clocks, the video server 1030 may adjust each transaction entry time stamp (or image/sensor file time stamp) by the offset prior to comparing it to the corresponding image/sensor file time stamp (or transaction entry time stamp).

If the offset-compensated transaction entry time stamp (or image/sensor file time stamp) is significantly different from the image/sensor file time stamp (or transaction entry time stamp), the video server 1030 may modify the data record associated with the violation to indicate that the transaction entry and corresponding image/sensor file are anomalous and that the matching process was not deemed successful. For example, if the offset-adjusted time stamp of a transaction entry is different than the time stamp of the matching image/sensor file by one second or more, the video server 1030 may flag the transaction entry and the corresponding image/sensor file as failing to have matching time stamps and may add a note to the data record associated with the violation indicating why the matching process was not successful.

The video server 1030 also may determine the deviation between the interval of time between transactions as reflected by the time stamps of the transaction entries and the interval of time between transactions as reflected by the time stamps of the image/sensor files. For example, if the interval of time between a first transaction and a second transaction as reflected by the time stamps of the corresponding transaction entries is eleven seconds and the corresponding interval of time between the same transactions as reflected by the time stamps of the matching image/sensor files is five seconds, the deviation between the intervals of time is six seconds. If the video server 1030 is configured to indicate a matching failure if transaction intervals differ by more than four seconds, the video server 1030 may flag both transaction entries and corresponding image/sensor files as failing to provide a consistent interval of time between transactions and may add a note to the data record associated with the violation indicating why the matching process was not successful. Such a difference in intervals of time between transactions may indicate that one or both of the transaction entries (or image/sensor files) is not correctly matched to an image sensor file (or transaction entry).

After the matching process is completed, the video server 1030 is able to identify the violation image/sensor file as the image/sensor file that was matched with the violation transaction entry during the matching process (1450). FIG. 15 shows the violation image/sensor file 1510 matched with the violation transaction entry 1120 of FIG. 11. The video server 1030 may repeat operations 1410-1450 to identify the violation image/sensor file for each valid violation transaction entry and associated group of transaction entries and corresponding group of image/sensor files (1460).

In another implementation, the video server 1030 is configured to match each transaction identified by the lane transaction system 1020 with other sensor data (e.g., magnetic signature data and laser signature data), instead of with image data. In this implementation the video server 1030 may identify landmark transaction sensor data that corresponds to landmark transaction entries rather than identify landmark transaction images. The landmark transaction sensor data may be matched with corresponding landmark transaction entries to synchronize the sensor data with transaction entries as described previously. In another implementation, the video server 1030 may match each transaction identified by the lane transaction system 1020 based on a combination of landmark sensor data and landmark transaction images.

After the matching process is completed and each violation transaction entry or transaction entry has been associated with a corresponding image/sensor file, the video server typically stores the identified groups of transactions and corresponding groups of image/sensor files, the identified violation or transaction image sensor/files, and the associated lane transaction data in violation records or in transaction records and sends the violation or transaction records to the image processing module 1025 for vehicle identification and processing. The video server 1030 typically performs all or most of the above-described functions (e.g., the parsing, the violation entry identification and validation, the grouping, and the matching functions) using a batch application.

The video server 1030 also may be configured to perform various other functions, including: receiving status messages from the VIC 1024A (and, in some implementations, from other VICs) and forwarding the status messages to the appropriate monitoring system (not shown); providing a web-based interface that allows administrators to create messages and send them to the VIC 1024B (and, in some implementations, to other VICs); synchronizing its internal clock to a network time server and periodically setting the internal clock of the VIC 1024B (and, in some implementations, the internal clock of other VICs) through an automatically generated management message.

Figure 16:
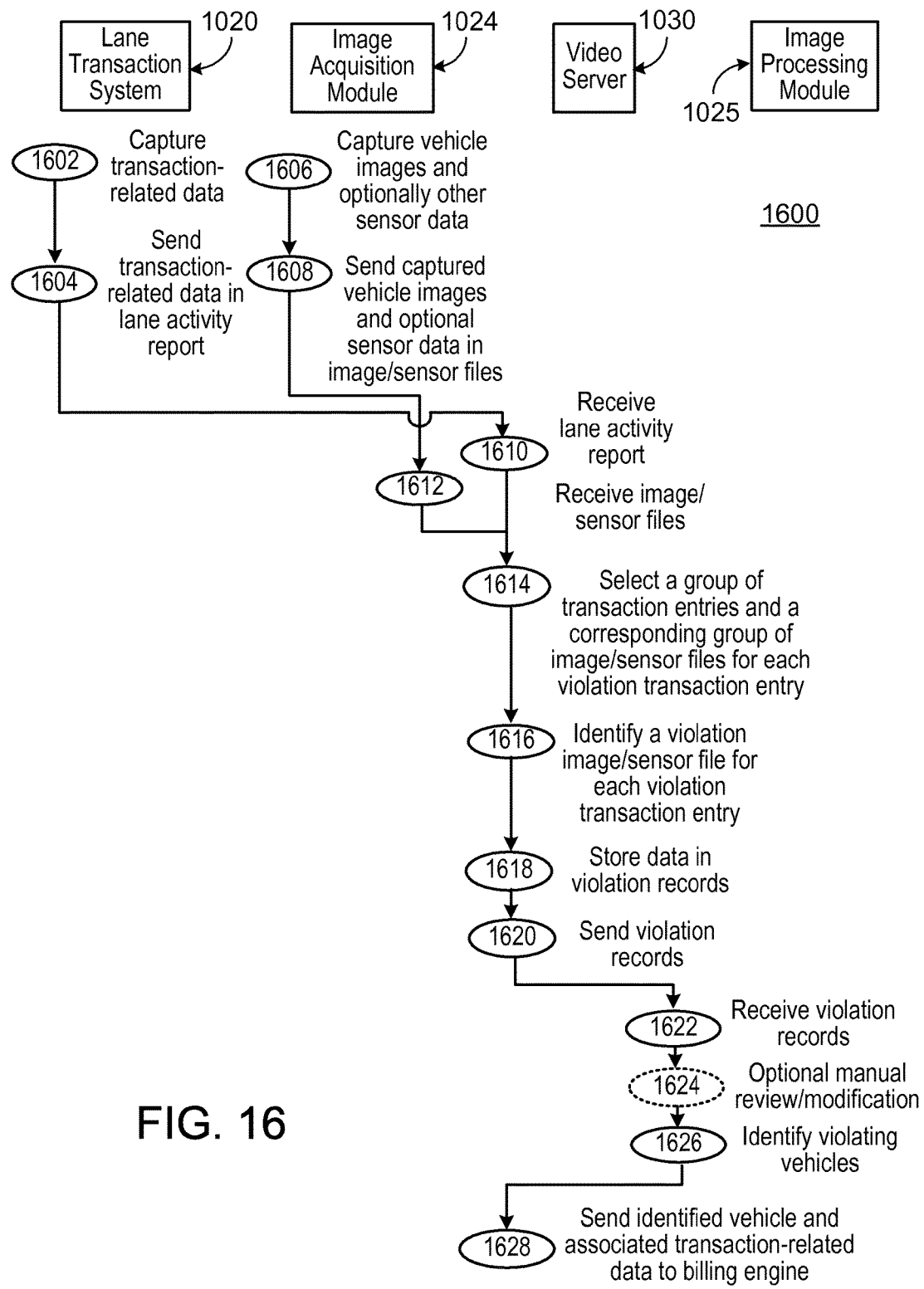
FIG. 16 is a flow chart of an implementation of an electronic toll management system.

FIG. 16 is a flow chart of an exemplary process 1600 that identifies and charges violating vehicles for incurred toll fees without requiring the toll system's lane transaction system to directly communicate with the toll system's imaging system. For convenience, particular components described with respect to FIG. 10 are referenced as performing the process 1300. However, similar methodologies may be applied in other implementations where different components are used to define the structure of the system, or where the functionality is distributed differently among the components shown by FIG. 10. In one implementation, the process 1300 is implemented by the toll management system 1000.

The lane transaction system 1020 captures transaction-related data for each vehicle that transacts with the facility 1028 (1602). The lane transaction system 1020 records the transaction-related data in a lane activity report and sends to the video server 1030 or otherwise enables the video server 1030 to access the lane activity report at periodic intervals (e.g., once a day)(1604).

The image acquisition module 1024 captures vehicle images and optionally other sensor data and stores the image/sensor data in image/sensor files (1606). The image acquisition module 1024 sends to the video server 1030 or otherwise enables the video server 1030 to access the image/sensor files at periodic intervals and/or as the image/sensor data is captured (1608).

The video server 1030 receives or accesses the lane activity report (1610) and receives or accesses the image/sensor files (1612). The video server 1030 processes the received lane activity report and image/sensor files to select a group of transaction entries and a corresponding group of image/sensor files for each violation transaction entry in the lane activity report (1614). FIG. 13 illustrates an exemplary process 1300 that may be used by video server 1030 to perform operation 1614.

After a group of transaction entries and a corresponding group of image/sensor files have been identified for one or more of the validated violation transactions, the video server 1030 identifies a violation image/sensor file for each validated violation transaction entry by performing a transaction entry and image/sensor file matching process for each group pairing (1616). FIG. 14 illustrates an exemplary process 1400 that may be used by video server 1030 to perform operation 1616.

For each validated violation transaction entry, the video server 1030 is configured to save one or more of the following in a data record (i.e., "a violation record") (1618): (1) the group of transaction entries that correspond to and include the validated violation transaction entry; (2) the corresponding group of image/sensor files that include the identified violation image/sensor file; (3) the matching data identifying the matched pairs of transaction entries and image/sensor files; (4) the flags and notes indicating anomalous transaction entries and/or image/sensor files and explaining why they are anomalous; and (5) data indicating whether and why the matching process was determined to be successful or unsuccessful.

The video server 1030 is configured to send to the image processing module 1025 or enable the image processing module 1025 to access the one or more violation records (1620). The image processing module 1025 receives or accesses the one or more violation records (1622) and, optionally, may present the information in the violation records to a user for manual confirmation of the matching process and the identified violation image/sensor file (1624).

The image processing module 1025 may include a violation review application that allows a user to perform the following tasks: (1) check the association or matching between lane transaction entries and image/sensor files; (2) adjust the matching as necessary (including manually inserting placeholders as necessary); (3) confirm the correct matching of lane transaction entries and image/sensor files based on timing and image content; (4) manually specify a violation image/sensor file; (5) input identifying information for a violating vehicle or owner or entity associated with the violating vehicle; and (6) specify the disposition of a violation transaction and a reason for the disposition.

Figure 17:
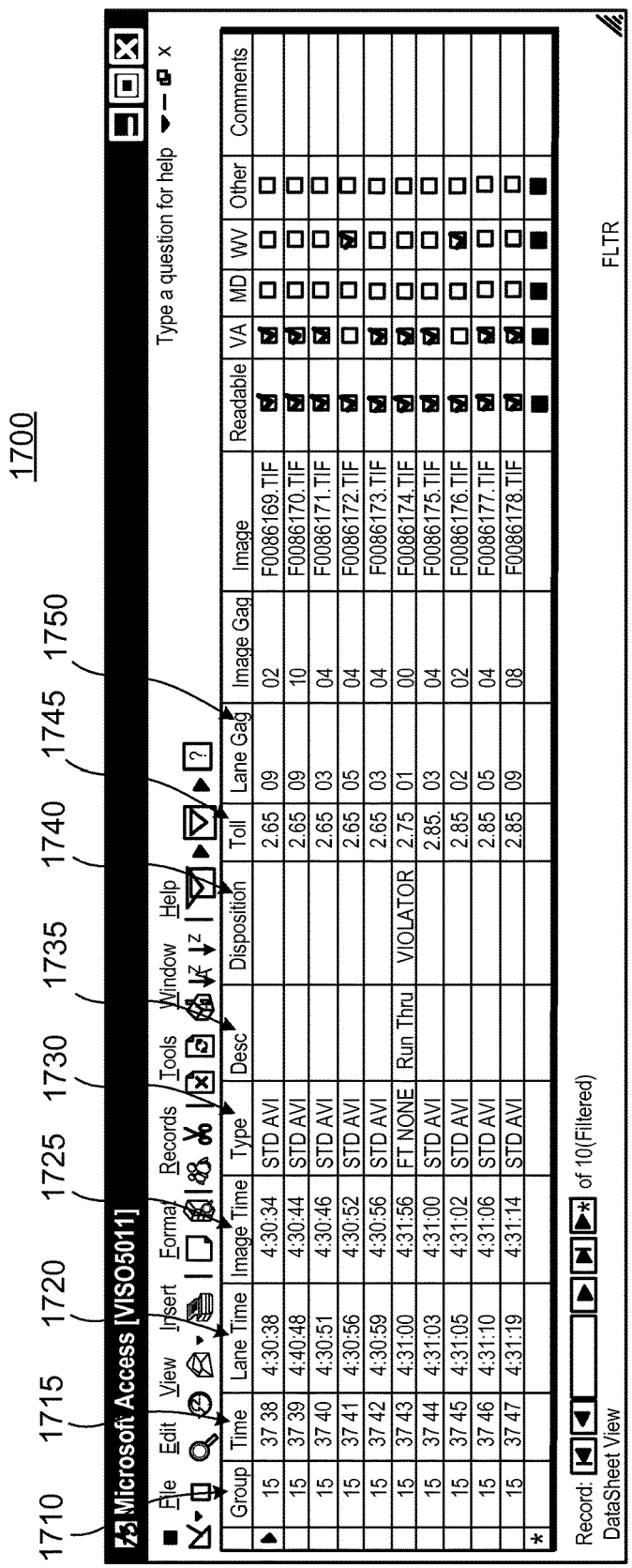
FIG. 17 is an exemplary user interface.

FIG. 17 shows an exemplary user interface 1700 that lists matched transaction entries for the ten transactions corresponding to the transaction entries of FIG. 11 and the image/sensor files of FIG. 12. The user interface 1700 includes a matched transaction entry for each matched transaction entry-image/sensor file pair.

An exemplary matched transaction entry 1710 includes a lane identifier 1715 (e.g., "15 3738"), a lane transaction time stamp 1720 (e.g., "4:30:39"), a matching image time stamp 1725 (e.g., "4:30:34"), a transaction type 1730 (e.g., "STD AVI"), a transaction description 1735 (e.g., blank if the transaction is not a violation); a transaction disposition 1740 (e.g., blank if the transaction is not a violation); an interval of time between the last transaction and the current transaction according to the lane transaction time stamps 1745 (e.g., "2" seconds), and an interval of time between the last transaction and the current transaction according to the matching image time stamps 1750 (e.g., "2" seconds).

Figure 18:
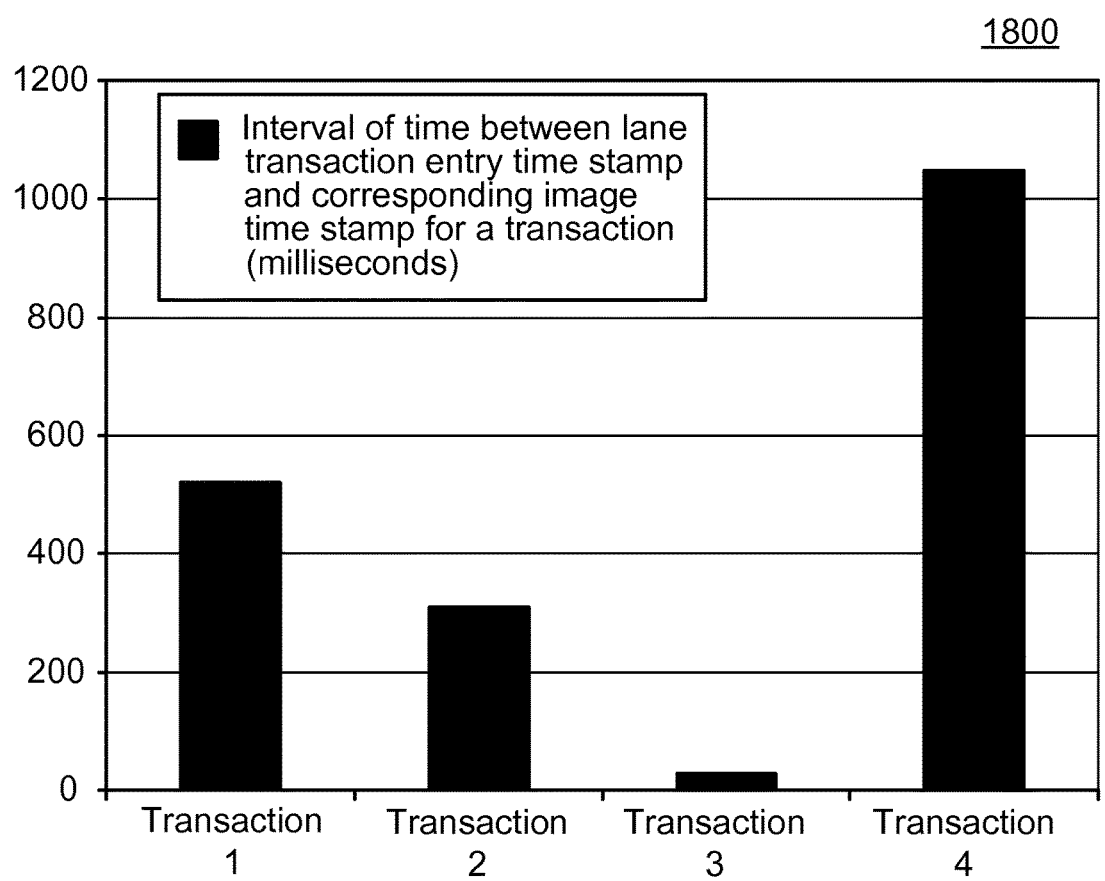
FIG. 18 is a bar graph showing the interval of time between a lane transaction entry time stamp and a corresponding image time stamp for a transaction.

The user interface 1700 may be configured to include a button, icon, or other interface element (not shown) selectable to generate a graph that shows the time stamp deviation between the image/sensor file time stamp and the transaction entry time stamp for one or more matched pairs. For example, FIG. 18 shows an example 1800 of a bar graph configured to indicate the difference in time between the lane transaction time stamp for a transaction and the time stamp of the corresponding image/sensor file for the same transaction. If the difference in time is above a predetermined threshold, such as, for example, one second, the transaction may be considered poorly matched, problematic, and/or anomalous. The bar graph 1800 shows that the transaction labeled "transaction 4" has a time stamp difference greater than one second, and, therefore, may be deemed anomalous.

Bar graphs, like the bar graph 1800, are particularly useful in that they allow a user to quickly, at a glance, determine the accuracy of the matching process and focus on poorly matched, problematic, and/or anomalous transactions. In some implementations, the graph reflects time differences after compensating for the offsets between the internal clock of the image acquisition module 1024 and the internal clock of the lane transaction system 1020.

Figure 19:
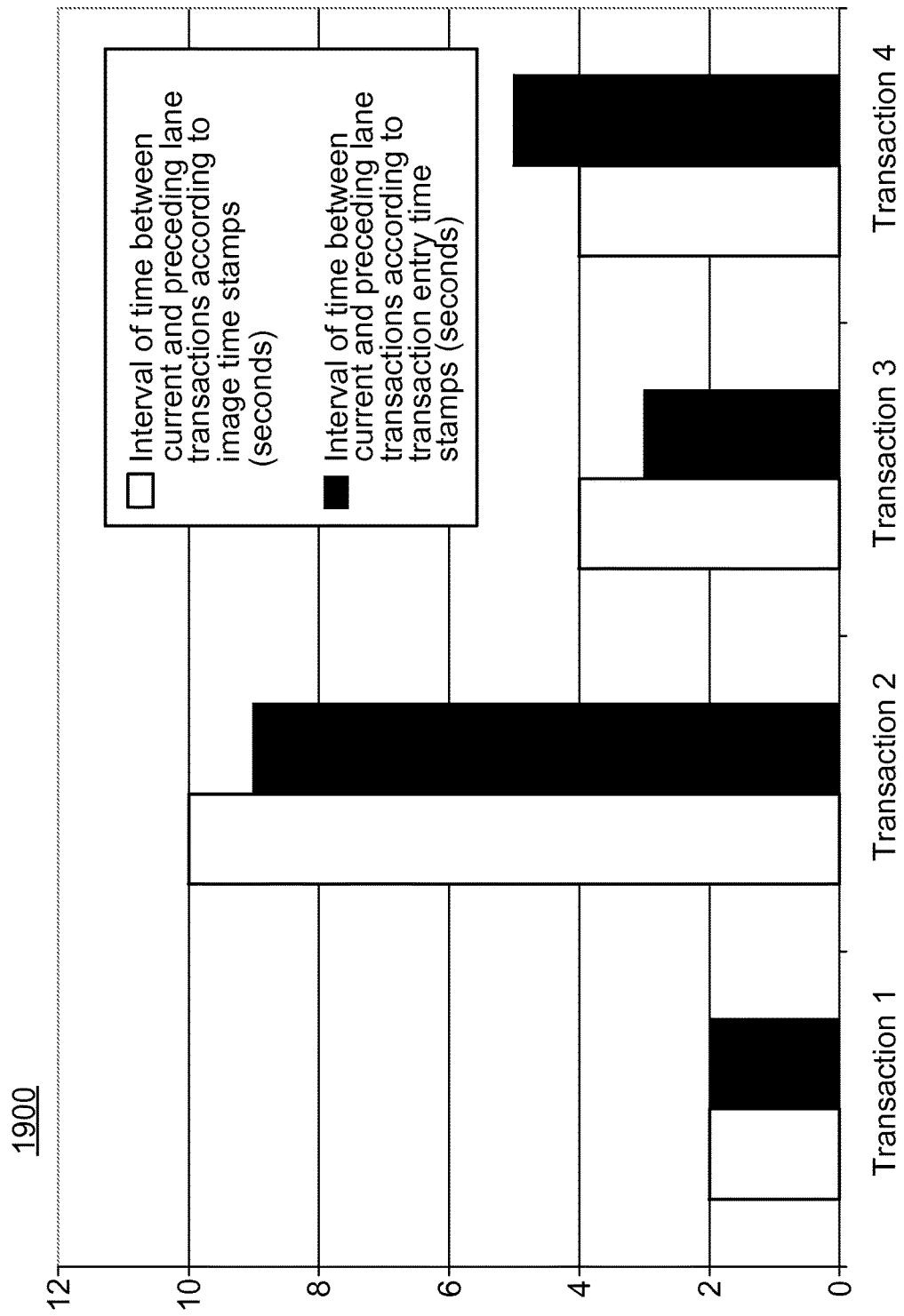
FIG. 19 is a bar graph showing the interval of time between current and preceding lane transactions according to image time stamps and according to transaction entry time stamps.

The user interface 1700 also may be configured to include a button, icon, or other interface element selectable to generate a graph that shows the intervals of time between current and preceding transactions as reflected by image/sensor file time stamps and the intervals of time between current and preceding transactions as reflected by transaction entry time stamps. For example, FIG. 19 shows an example 1900 of a bar graph that assigns to each transaction a pair of bars, one having a height reflecting the interval of time between the current and preceding transactions as determined from lane transaction entry time stamps and the other having a height reflecting the interval of time between the current and preceding transactions as determined from image/sensor file time stamps.

If the difference in the heights of the two bar graphs associated with the same transaction indicates a difference in time above a predetermined threshold, such as, for example, four seconds, the transaction may be considered poorly matched, problematic, and/or anomalous. The bar graph 1900 does not show any transaction associated with two bars that differ in height by four or more seconds. Rather, it shows differences of 0 seconds, 1 second, 1 second, and 1 second, respectively, for transactions 1 through 4. Accordingly, bar graph 1900 indicates that all four transactions are properly matched with respect to this criterion. Like the bar graph 1800, the bar graph 1900 enables a user to quickly, at a glance, determine the accuracy of the matching process and focus on poorly matched, problematic, and/or anomalous transactions.

Referring back to FIG. 16, the image processing module 1025 identifies the violating vehicles from the violation image/sensor files and, optionally, from the transaction-related data in the violation transaction entry (1626). The image processing module 1024 may perform this identification using any or all of the methods described previously. Once a violating vehicle has been identified for each violation transaction, the image processing module 1025 sends the identified vehicle and associated transaction-related data to the billing engine 1022 for processing as described elsewhere (e.g., with respect to FIGS. 3 and 4)(1628).

The above applications represent illustrative examples and the disclosed techniques disclosed can be employed in other applications. Further, the various aspects and disclosed techniques (including systems and processes) can be modified, combined in whole or in part with each other, supplemented, or deleted to produce additional implementations.

The systems and techniques described here can be implemented in digital electronic circuitry, or in computer hardware, firmware, software, or in combinations of them. The systems and techniques described here can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the systems and techniques described here can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The typical elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are within the scope of the following claims.

What is claimed is:

1. A computer-implemented method comprising:
   generating, using a first clock that is an internal clock of a lane transaction system and in response to detection of respective transponders of transacting vehicles by a sensor of the late transaction system, transaction time stamps of a set of lane transaction entities;
   generating, using a second clock that is an internal clock of an image acquisition system and that is different than the first clock, and in response to separate detection of the transacting vehicles by a sensor that is different from the sensor of the lane transaction system, picture time stamps of a series of lane transaction pictures;
   accessing the set of lane transaction entries, each entry in the set designating a toll transaction between a vehicle and a toll system and including a transaction descriptor and one of the transaction time stamps generated by the first clock;
   accessing the series of lane transaction pictures, the series including a plurality of pictures, each of which is associated one of the picture time stamps generated by the second clock;
   identifying, using a computer processor, a lane transaction entry from the set as a violation transaction entry based on the transaction descriptor;
   selecting a group of lane transaction entries from among the set of lane transaction entries based on the time stamp of the violation transaction entry;
   selecting a group of lane transaction pictures from the series of lane transaction pictures based on the selected group of lane transaction entries and at least one of the time stamps of the series of lane transaction pictures; and
   identifying a lane transaction picture from the group of lane transaction pictures as a violation picture corresponding to the violation transaction entry by associating the group of lane transaction entries with the group of lane transaction pictures.

2. The method of claim 1, wherein associating the group of lane transaction entries with the group of lane transaction pictures comprises:
   matching a first picture of the group of lane transaction pictures with a first lane transaction entry of the group of lane transaction entries; and matching a second picture of the group of lane transaction pictures with a second lane transaction entry of the group of lane transaction entries.

3. The method of claim 2, wherein the first picture is a picture of a first transaction between a first vehicle and the toll system in a lane of the toll system and the second picture is a picture of a second transaction between a second vehicle and the toll system in the lane of the toll system, the second transaction occurring after the first transaction.

4. The method of claim 1, wherein:
selecting a group of lane transaction entries from among the set of lane transaction entries based on the time stamp of the violation transaction entry comprises:
determining a landmark transaction entry from among the set of lane transaction entries; and
selecting a sequence of lane transaction entries that comprises two or more sequential transaction entries for a particular lane in the toll system without any intervening entries that are not in the sequence of lane transaction entries, the landmark transaction entry being at a beginning of the sequence or an end of the sequence and the sequence including the violation transaction entry; and
selecting a group of lane transaction pictures from the series of lane transaction pictures based on the selected group of toll transaction entries and at least one of the time stamps of the series of lane transaction pictures comprises:
determining a time stamp of the landmark transaction entry; and
selecting a sequence of lane transaction pictures from the series of lane transaction pictures using the time stamp of the landmark transaction entry, the series of lane transaction pictures comprising a sequence of pictures for the particular lane in the toll system without any intervening pictures that are not in the sequence of lane transaction pictures.

5. The method of claim 4, wherein selecting the sequence of lane transaction pictures from the series of lane transaction pictures using the time stamp of the landmark transaction entry comprises selecting the sequence of lane transaction pictures from the series of lane transaction pictures such that a time stamp for a first picture or a last picture in the sequence is within a predetermined period of time from the time stamp of the landmark transaction entry.

6. The method of claim 4, wherein determining the landmark transaction entry from among the set of lane transaction entries comprises determining a particular transaction entry from among the set of lane transaction entries for a vehicle with three or more axles using data for the particular transaction entry that identifies a number of axles for the vehicle.

7. The method of claim 4, wherein determining the landmark transaction entry from among the set of lane transaction entries comprises determining a particular transaction entry from among the set of lane transaction entries for a vehicle that has a transponder using data for the particular transaction entry.

8. The method of claim 7, wherein determining the particular transaction entry for a vehicle that has a transponder using the data for the particular transaction entry comprises determining, using data for the particular transaction entry, the particular transaction entry for the vehicle that paid for a transaction with the toll system using the transponder.

9. The method of claim 4, wherein determining the landmark transaction entry from among the set of lane transaction entries comprises:
determining a pair of transaction entries from among the set of lane transaction entries that have a time gap between the pair of transaction entries during which no transaction occurred for the particular lane; and
selecting one of the pair of transaction entries as the landmark transaction entry.

10. The method of claim 4, comprising:
determining a second landmark transaction entry from among the set of lane transaction entries, wherein:
selecting the sequence of lane transaction entries that comprises two or more sequential transaction entries for a particular lane in the toll system comprises selecting the sequence of lane transaction entries with the landmark transaction entry at the beginning of the sequence and the second landmark transaction entry being at the end of the sequence, the sequence comprising all transaction entries for the particular lane between the landmark transaction entry and the second landmark transaction entry; and
selecting the sequence of lane transaction pictures from the series of lane transaction pictures using the time stamp of the landmark transaction entry comprises
determining a time stamp of the second landmark transaction entry; and
selecting the sequence of lane transaction pictures from the series of lane transaction pictures using a timestamp of the landmark transaction entry to determine a first picture in the sequence and the timestamp of the second landmark transaction entry to determine a second picture in the sequence, the sequence including all pictures for the particular lane between the first picture and the second picture.

11. The method of claim 4, wherein:
determining the landmark transaction entry from among the set of lane transaction entries comprises:
determining whether a particular transaction entry for the particular lane and from among the set of lane transaction entries is adjacent to a violation transaction entry for the particular lane; and
selecting the particular transaction entry as the landmark transaction entry in response to determining that the particular transaction entry for the particular lane is not adjacent to a violation transaction entry for the particular lane; and
selecting the sequence of lane transaction entries that comprises two or more sequential transaction entries for the particular lane in the toll system without any intervening entries that are not in the sequence of lane transaction entries comprises selecting the sequence of lane transaction entries that comprises three or more sequential transaction entries for the particular lane in the toll system.

12. The method of claim 4, comprising:
determining a time interval that includes the landmark transaction entry and the violation transaction entry; and
determining that the time interval does not include another landmark transaction entry, wherein selecting the sequence of lane transaction entries that comprises two or more sequential transaction entries for the particular lane in the toll system without any intervening entries that are not in the sequence of lane transaction entries comprises selecting the sequence of lane transaction entries that includes only the landmark transaction entry and does not include a second landmark transaction entry.

13. A system comprising:
a lane transaction entry data store configured to store lane transaction entries that each designate a toll transaction between a vehicle and a toll system, include a transaction descriptor, and are associated with transaction time stamps generated by a first clock that is an internal clock of a lane transaction system for the toll transactions between the vehicles and the toll system;
a vehicle image data store configured to store lane transaction pictures that are associated with picture time stamps generated by a second clock that is an internal clock of an image acquisition system that is different from the first clock of the lane transaction system; and
a processing device configured to:
generate, using the first clock and in response to detection of respective transponders of transacting vehicles by a sensor of the late transaction system, transaction time stamps of a group of lane transaction entities;
generate, using the second clock and in response to separate detection of the transacting vehicles by a sensor that is different from the sensor of the lane transaction system, picture time stamps of a group of lane transaction pictures;
identify a violation transaction entry from the lane transaction entry data store using the transaction descriptor included in the violation transaction entry;
select the group of lane transaction entries from the lane transaction entry data store using the time stamp of the violation transaction entry, the group of lane transaction entries including the violation transaction entry;
select the group of lane transaction pictures from the vehicle image data store based on the selected group of toll transaction entries and at least one of the time stamps of the lane transaction entries in the group of lane transaction entries; and
identify a lane transaction picture from the group of lane transaction pictures as a violation picture corresponding to the violation transaction entry by associating the group of lane transaction entries with the group of lane transaction pictures.

14. The system of claim 13, wherein associating the group of lane transaction entries with the group of lane transaction pictures comprises:
matching a first picture of the group of lane transaction pictures with a first lane transaction entry of the group of lane transaction entries; and
matching a second picture of the group of lane transaction pictures with a second lane transaction entry of the group of lane transaction entries.

15. The system of claim 14, wherein the first picture is a picture of a first transaction between a first vehicle and the toll system in a lane of the toll system and the second picture is a picture of a second transaction between a second vehicle and the toll system in the lane of the toll system, the second transaction occurring after the first transaction.

16. The system of claim 13, wherein the processing device is configured to:
select a group of lane transaction entries from the lane transaction entry data store using the time stamp of the violation transaction entry by:
determining a landmark transaction entry from the lane transaction entry data store; and
selecting a sequence of lane transaction entries that comprises two or more sequential transaction entries for a particular lane in the toll system without any intervening entries that are not in the sequence of lane transaction entries, the landmark transaction entry being at a beginning of the sequence or an end of the sequence and the sequence including the violation transaction entry; and
select a group of lane transaction pictures from the vehicle image data store based on the selected group of toll transaction entries and at least one of the time stamps of the lane transaction entries in the group of lane transaction entries by:
determining a time stamp of the landmark transaction entry; and
selecting a sequence of lane transaction pictures from the vehicle image data store using the time stamp of the landmark transaction entry, the sequence of lane transaction pictures comprising a sequence of pictures for the particular lane in the toll system without any intervening pictures that are not in the sequence of lane transaction pictures.

17. A non-transitory computer readable storage medium storing instructions executable by a data processing apparatus and upon such execution cause the data processing apparatus to perform operations comprising:
generating, using a first clock that is an internal clock of a lane transaction system and in response to detection of respective transponders of transacting vehicles by a sensor of the late transaction system, transaction time stamps of a set of lane transaction entities;
generating, using a second clock that is an internal clock of an image acquisition system and that is different than the first clock, and in response to separate detection of the transacting vehicles by a sensor that is different from the sensor of the lane transaction system, picture time stamps of a series of lane transaction pictures;
accessing the set of lane transaction entries, each entry in the set designating a toll transaction between a vehicle and a toll system and including a transaction descriptor and one of the transaction time stamps generated by the first clock;
accessing the series of lane transaction pictures, the series including a plurality of pictures, each of which is associated with a one of the picture time stamps generated by the second clock;
identifying, using a computer processor, a lane transaction entry from the set as a violation transaction entry based on the transaction descriptor;
selecting a group of lane transaction entries from among the set of lane transaction entries based on the time stamp of the violation transaction entry;
selecting a group of lane transaction pictures from the series of lane transaction pictures based on the selected group of lane transaction entries and at least one of the time stamps of the series of lane transaction pictures; and
identifying a lane transaction picture from the group of lane transaction pictures as a violation picture corresponding to the violation transaction entry by associating the group of lane transaction entries with the group of lane transaction pictures.

18. The computer readable storage medium of claim 17, wherein associating the group of lane transaction entries with the group of lane transaction pictures comprises:

matching a first picture of the group of lane transaction pictures with a first lane transaction entry of the group of lane transaction entries; and matching a second picture of the group of lane transaction pictures with a second lane transaction entry of the group of lane transaction entries.

\* \* \* \* \*

UNITED STATES PATENT AND TRADEMARK OFFICE
CERTIFICATE OF CORRECTION

PATENT NO. : 10,115,242 B2
APPLICATION NO. : 14/925102
DATED : October 30, 2018
INVENTOR(S) : Jay E. Hedley and Neal Patrick Thornburg It is certified that error appears in the above-identified patent and that said Letters Patent is hereby corrected as shown below:

In the Claims

In Claim 4, Column 45, Line 22, after "or" insert -- at --.

In Claim 16, Column 48, Line 6, after "or" insert -- at --.

Signed and Sealed this
Ninth Day of April, 2019

Andrei Iancu
*Director of the United States Patent and Trademark Office*